United States Patent [19]
Laliotis

[11] 4,173,788
[45] Nov. 6, 1979

[54] METHOD AND APPARATUS FOR MEASURING DIMENSIONS

[75] Inventor: Theodore A. Laliotis, Los Altos, Calif.

[73] Assignee: Atmospheric Sciences, Inc., Sunnyvale, Calif.

[21] Appl. No.: 836,615

[22] Filed: Sep. 26, 1977

Related U.S. Application Data

[63] Continuation-in-part of Ser. No. 727,042, Sep. 27, 1976.

[51] Int. Cl.[2] ........................ G01B 11/10; G06F 15/20

[52] U.S. Cl. .................................... 364/560; 250/560; 356/380; 356/387

[58] Field of Search ................................ 364/560-564; 250/560, 223 R, 561, 224; 356/108, 156, 157, 158, 160, 161, 168, 163, 164; 358/107

[56] References Cited

U.S. PATENT DOCUMENTS

| | | | |
|---|---|---|---|
| 3,513,321 | 5/1970 | Sherman | 356/160 X |
| 3,588,480 | 6/1971 | Unger et al. | 364/564 |
| 3,724,958 | 4/1973 | Callan | 356/160 |
| 3,737,856 | 6/1973 | Lehrer et al. | 250/560 X |
| 3,787,700 | 1/1974 | Chasson | 250/560 |
| 3,806,253 | 4/1974 | Denton | 250/560 X |
| 3,897,156 | 7/1975 | Chasson | 250/560 X |

*Primary Examiner*—Edward J. Wise
*Attorney, Agent, or Firm*—Alan H. MacPherson

[57] ABSTRACT

An array of photosensitive imaging sensors connected to a digital computer is utilized to measure selected dimensions of objects upon which the photosensitive array is focused. Two sets of information in the form of analog signals generated by the photosensitive array, both with and without an object in view, are converted to digital form and stored in a memory. The two sets of information contained in the memory are compared to thereby create digital signals indicative of the dimensions of the object. These digital signals are converted to dimensional form and displayed.

10 Claims, 65 Drawing Figures

SYSTEM BLOCK DIAGRAM OF SCANNER 100

FIGURE A-1
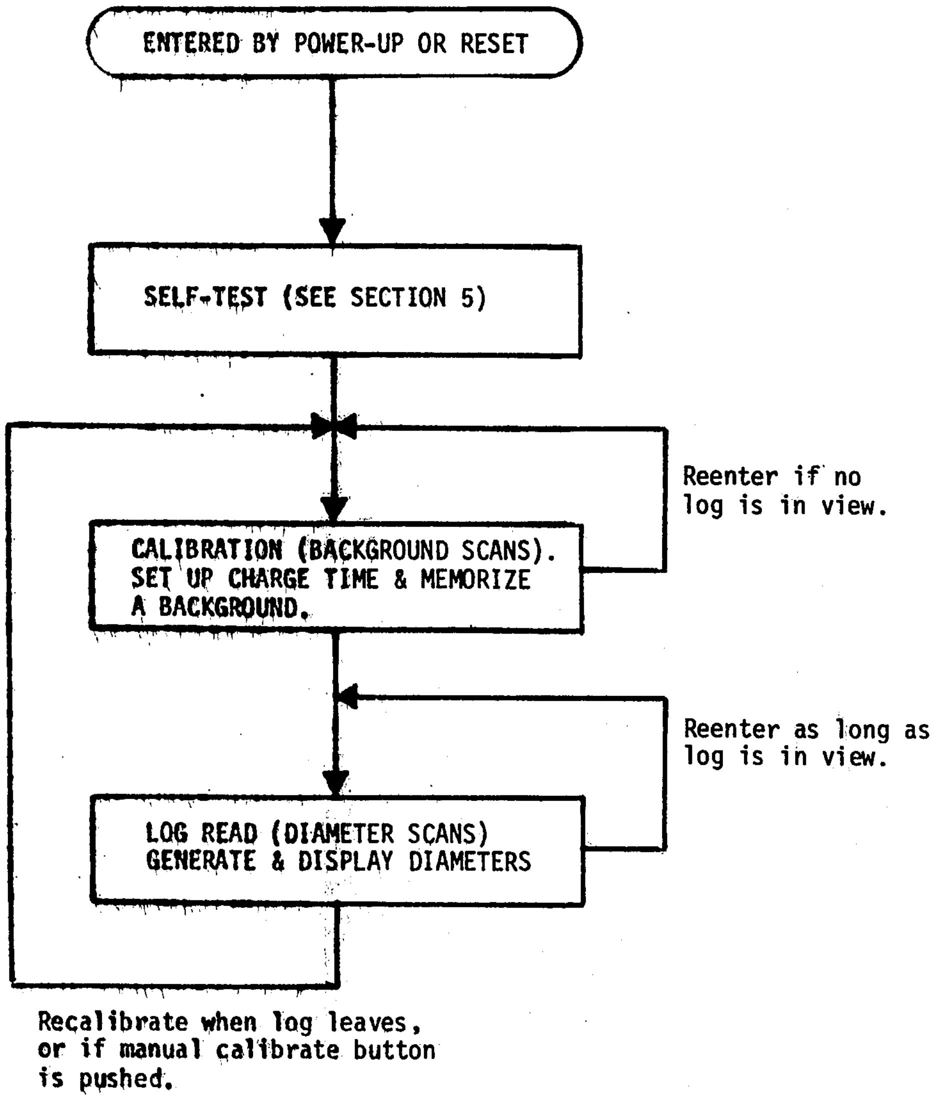

Port: 00
Board: CPU 600
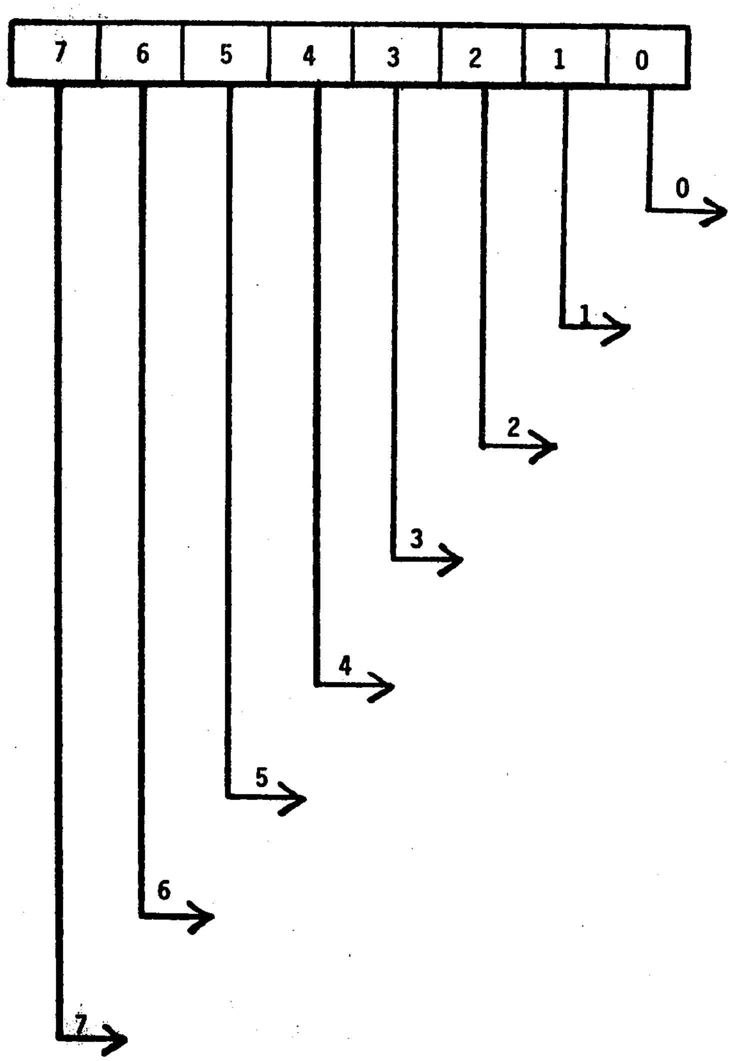
FIG. A-2

Port: 01
Board: CPU
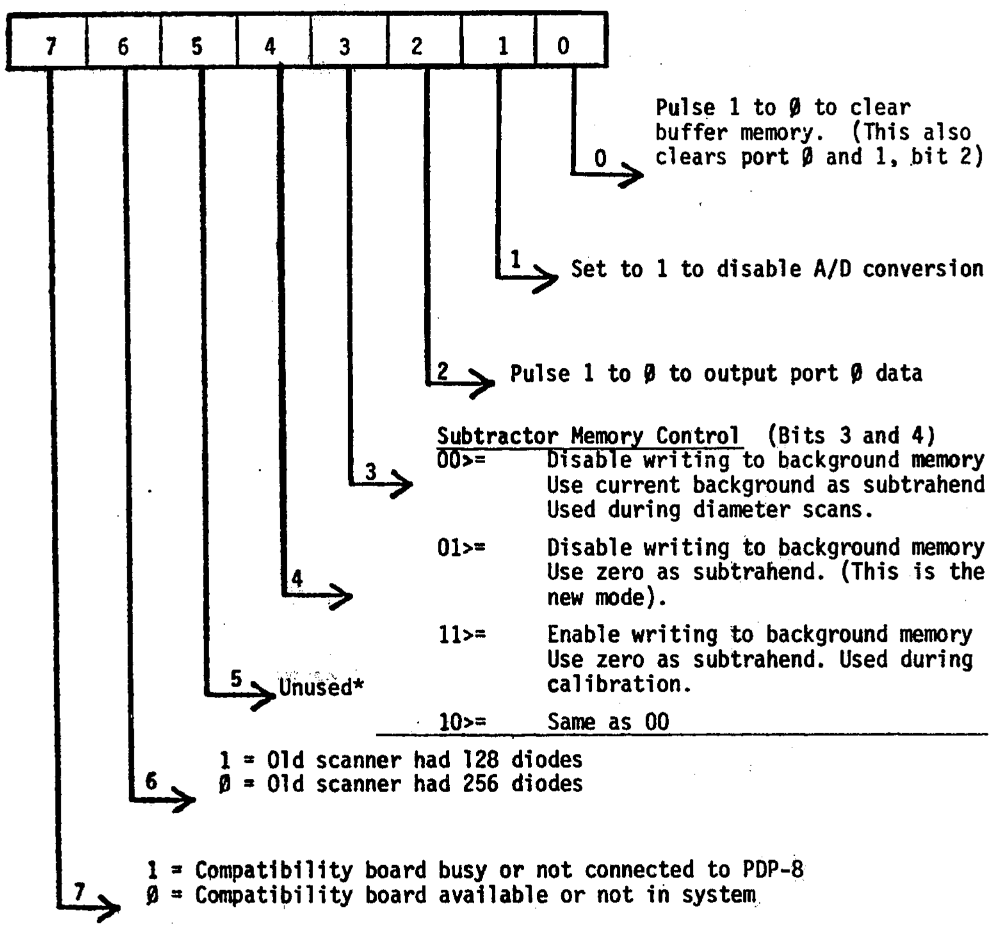
Comments:
Bit 7: Wait no longer than 124 μs for this bit to clear. If it is still a 1 then it can be assumed that this scanner is not connected to a remote PDP-8.
Bit 1: This bit can be used to interlock the contents of the buffer memory. It must not be changed during a conversion cycle.
* Bit 5: Unused. This is reserved for future detection of a saturation condition.
FIG. A-3

Port: 04
Board: CPU
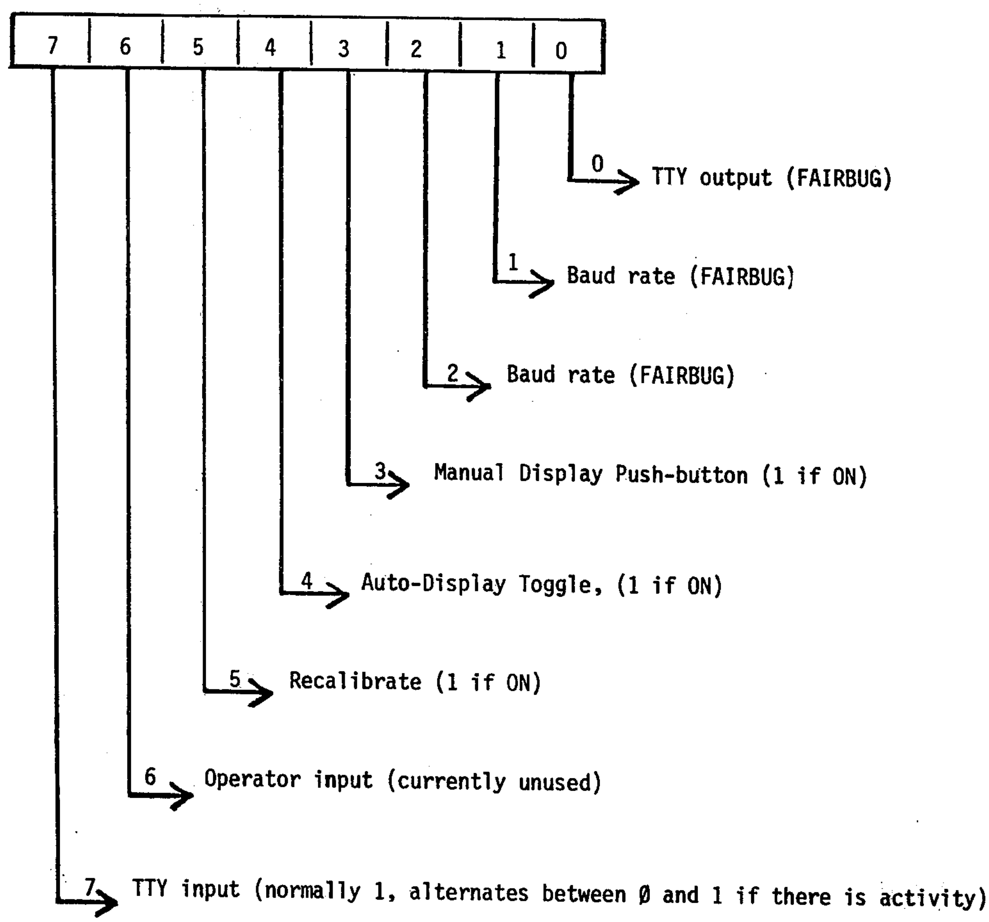
Comments:
NOTE: Ports Ø4, Ø5, Ø6, Ø7 are used by FAIRBUG
Bit 1 & 2: 00 = 110 Baud
01 = 300 Baud
10 = Parallel loader input
11 = Baud delay in memory (at BEF)
H'06' = 110 Baud, H'A3' = 300 Baud, H'E3' = 2400 Baud
Bit 5: Can be tied into interrupt line. Interrupts use ports 06 and 07 and automatically go to addresses H'20' and H'A0'.
FIG. A-4

Port: 05
Board: CPU

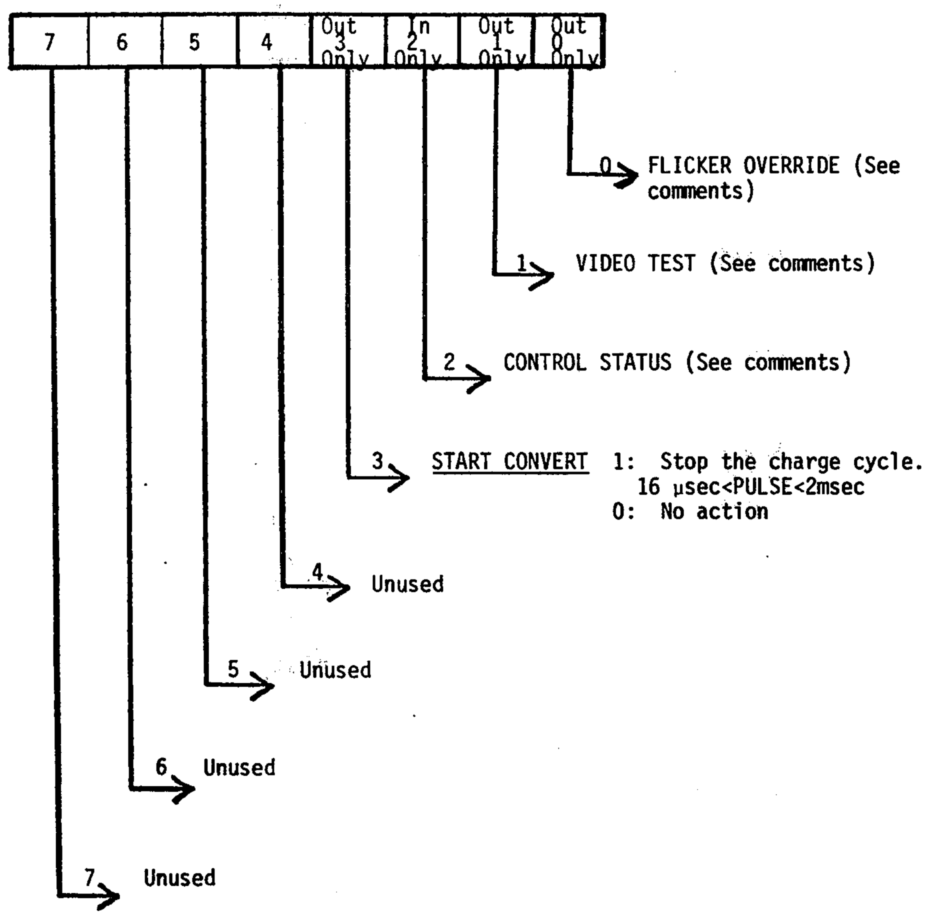

Comments:
FLICKER OVERRIDE - 1 = Defeat the fluorescent light flicker sync feature
0 = Allow it.

VIDEO TEST - 1 = Prevent transfer from the photo array to the shift register and instead inject a fixed reference voltage through the video components to check linearity of the front-end.
0 = Normal operation CONTROL STATUS - 1 = Charge cycle
0 = Transfer or conversion cycle (PORT MUST BE SET TO ZERO INITIALLY)

FIG. A-5

Port: 03
Board: Display Driver Board

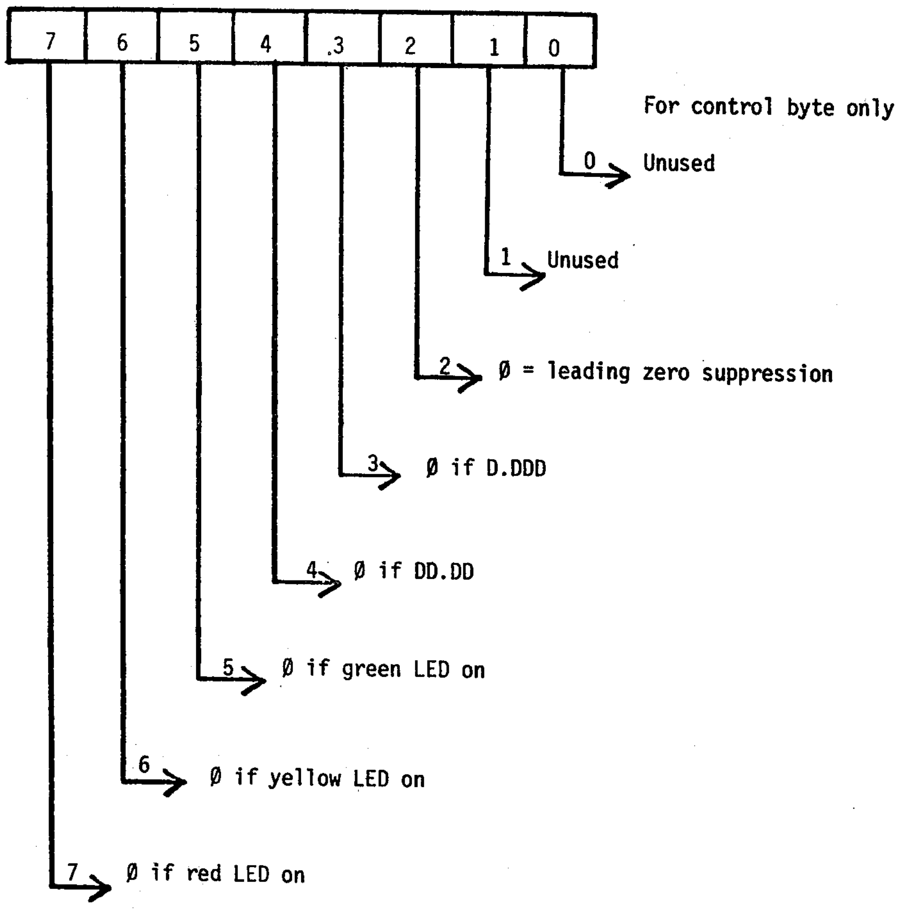

Comments:

On output:
Send out 5 bytes for each display -
1) H'33' (Sync byte)
2) H'33' (Sync byte)
3) Low-order digits (in one's complement form)
4) High-order digits (in one's complement form)
5) Control byte (described above)

On input:
Data is from the hex switches (see description on following page). Data is received in true form. Refer to port Ø9 for gate enabling information.

FIG. A-6a

The four hex switches are inside the J-Box.* Each switch provides four bits of information.

This information is interpreted as follows:

HIGH-ORDER SWITCHES

| Averaging Control | | | | Diagnostics | | Unassigned** | |
|---|---|---|---|---|---|---|---|
| 15 | 14 | 13 | 12 | 11 | 10 | 9 | 8 |

- Bits 15–13: "n" for display flicker control: (values of 0-7)
- Bit 12: 1 if no averaging to PDP-8
- Bits 11–10: ØØ=halt on any failure; 01=override RAM & checksum; 10=override "log in view"; 11=override all

LOW-ORDER SWITCHES

| Calibration Control | | | | | Significant Difference | | |
|---|---|---|---|---|---|---|---|
| 7 | 6 | 5 | 4 | 3 | 2 | 1 | Ø |

- Bits 7–6: Table Number (Ø-3)
- Bits 5–3: Index into Table (Ø-7)
- Bit 2: Table Number (Ø-1)
- Bits 1–Ø: Index into Table (Ø-3)

Table Ø =1/4,1/2,3/4,1
Table 1 =1-1/2,2,2-1/2 3V.

Table ØØ = "Light Level Table" (Auto-calibrate)
Values correspond to 1, 2, 3, 4, 5, 6, 7, 8 volts.

Tables 1-3 are actual integration times
Table 1 = 1/4 ms to 2 ms in 1/4 ms increments
Table 2 = 4 ms to 18 ms in 2 ms increments
Table 3 = 24 ms to 80 ms in 8 ms increments

* The J-Box is the junction box (of a type well known in the digital design arts) containing the A.C. to D.C. power converter which powers the scanner 100 and a universal asynchronous receiver-transmitter for transmitting the signals representing measurements produced by the scanner 100 to a remotely located operator and also for transmitting certain control signals from the operator to the scanner 100. The J-Box also contains an I/O port for specifying whether the scanner 100 is to operate in the fixed integration time mode or the automatic light level seeking mode.

** One of the unassigned switches is reserved for future "light level lowering" routines.

FIG. A-6b

Port: 09
Board: Display Driver
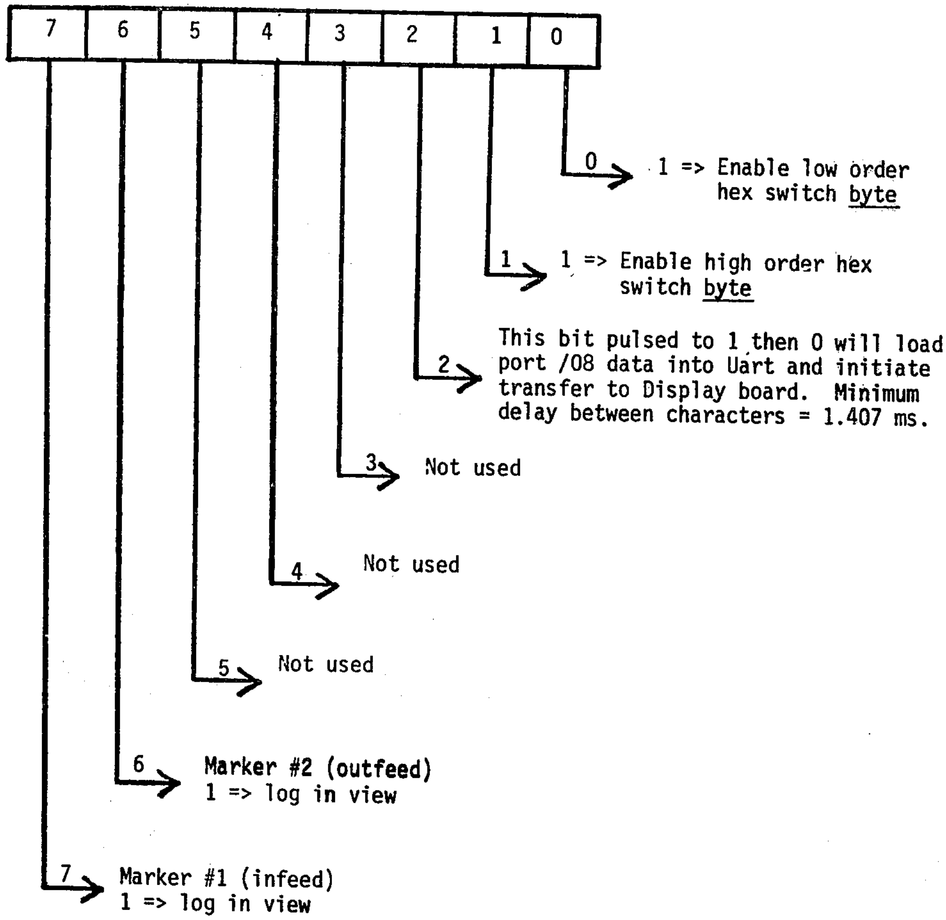
Comments:
This port should be initialized to zeroes at system start-up time to avoid hex switch circuit conflicts.
FIG. A-7

Port: OC, OD, OE, OF
Board: CPU (3853 SMI)
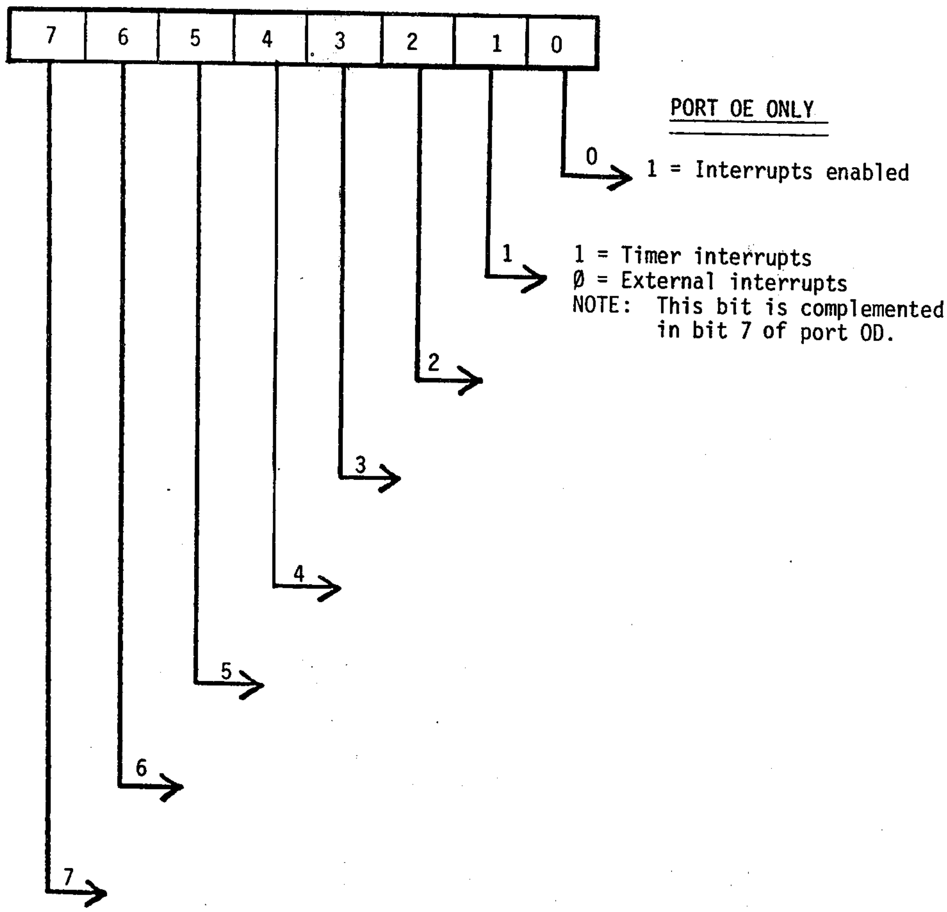
Comments:
Port OC - High order byte of interrupt vector
Port OD - Low order byte of interrupt vector (Bit 7 = 1 if external Ø if timer)
Port OE - Only Bits Ø and 1 have meaning as described above
Port OF - Timer constant. H'FF' stops timer, any other value corresponds to an interval from approximately 16 μs to 4 ms. (See Appendix C - F8 User's Manual)
FIG. A-8

Board: Compatibility Board
Port: 14, 15
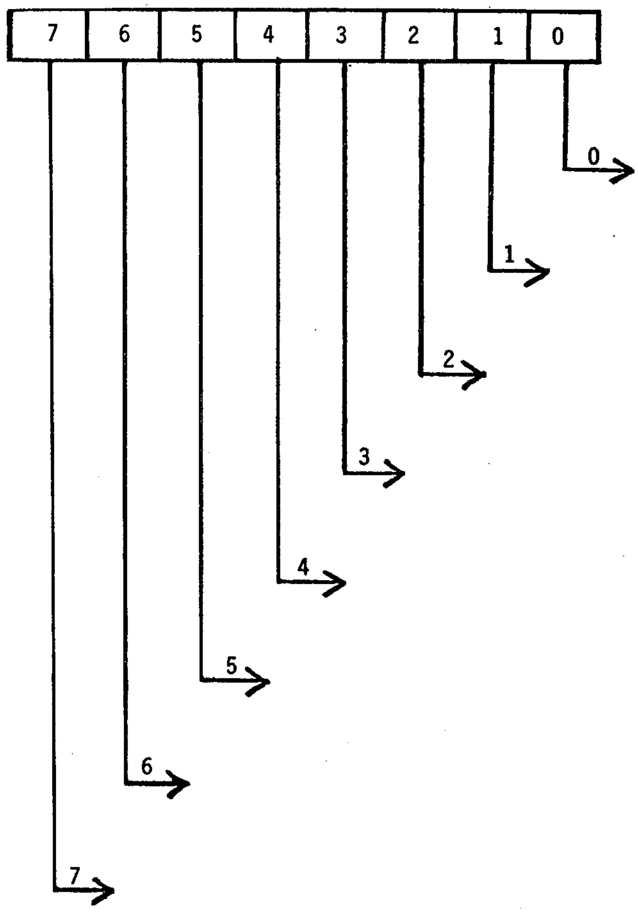
Comments:
Port 14 = Edge Count (always out of 128)
Port 15 = Diameter (out of 128 or 256 - see port 1, bit 6)
On input, bit 4 will always be a 1.
Only store to ports 14 or 15 if bit 7 of port 1 is zero.
(See comment on port 1 writeup)
FIG. A-9

Timer Logic
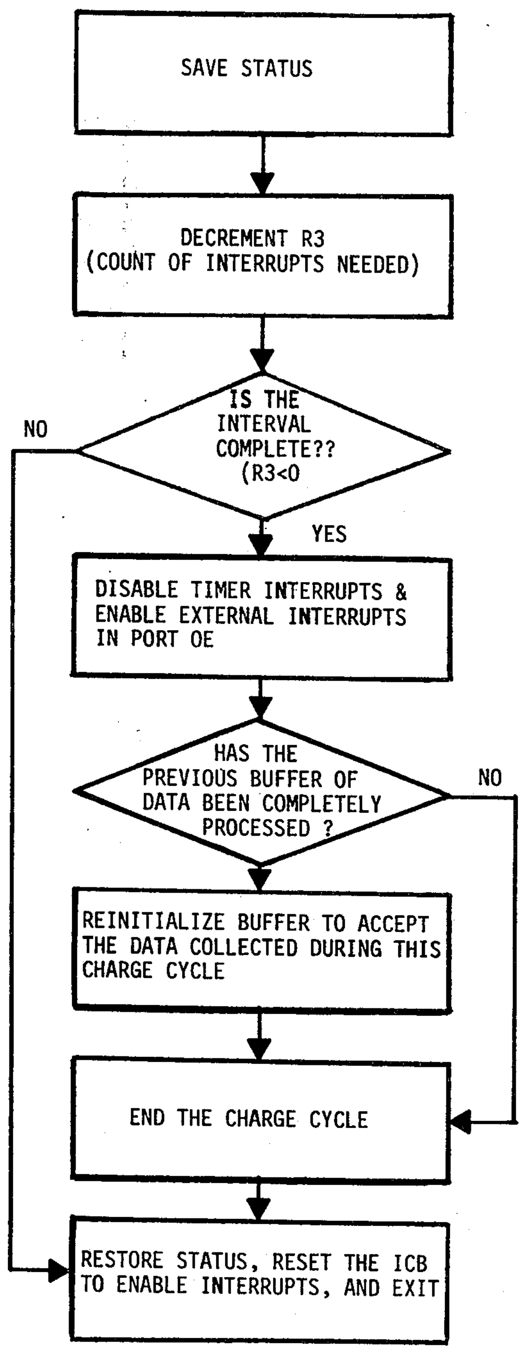
TIMER LOGIC
FIG. A-10

External Interrupt Logic
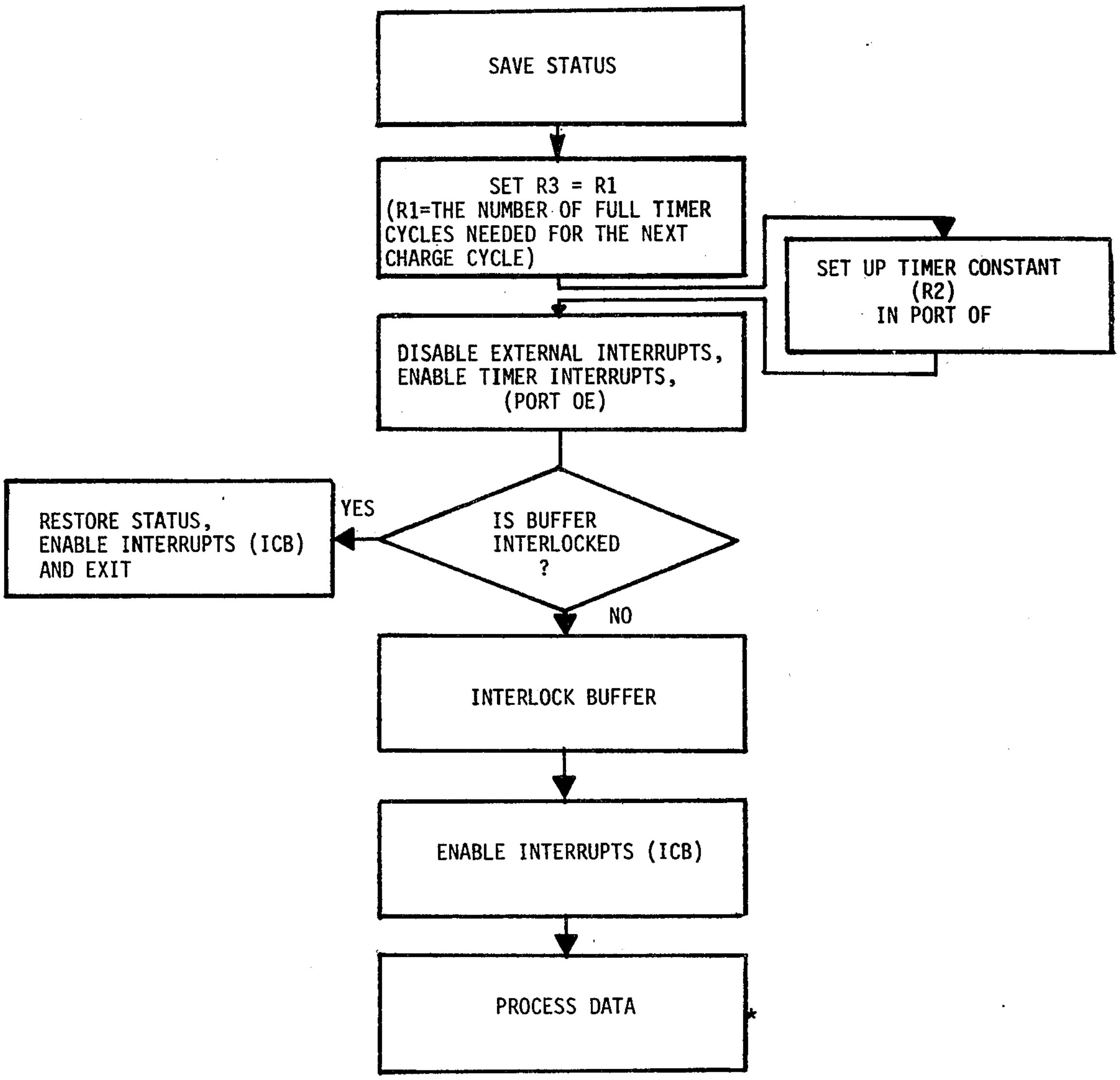
FIG. A-11

Precalibration Logic
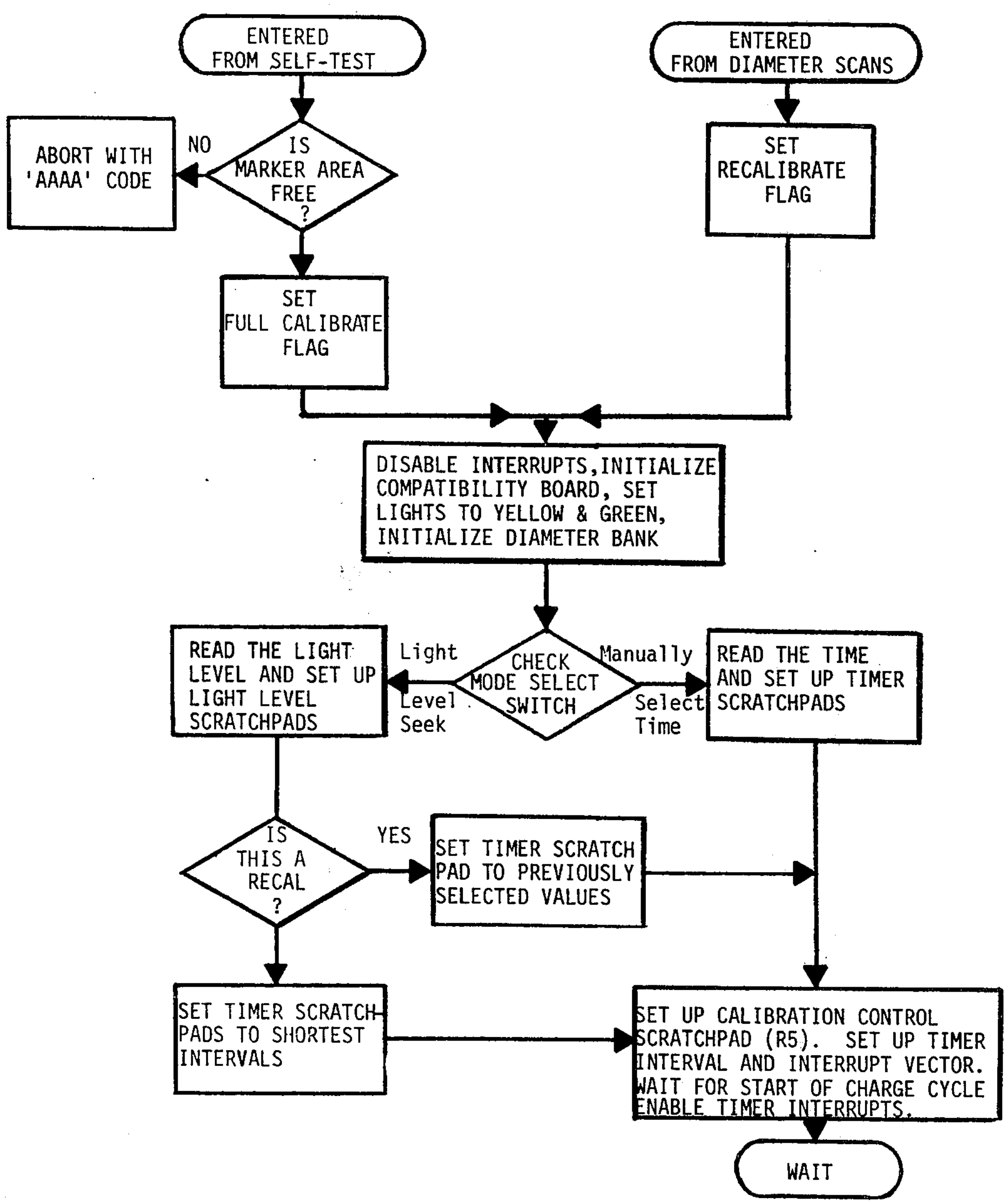
FIG. A-12a

Calibration - Buffer Processing
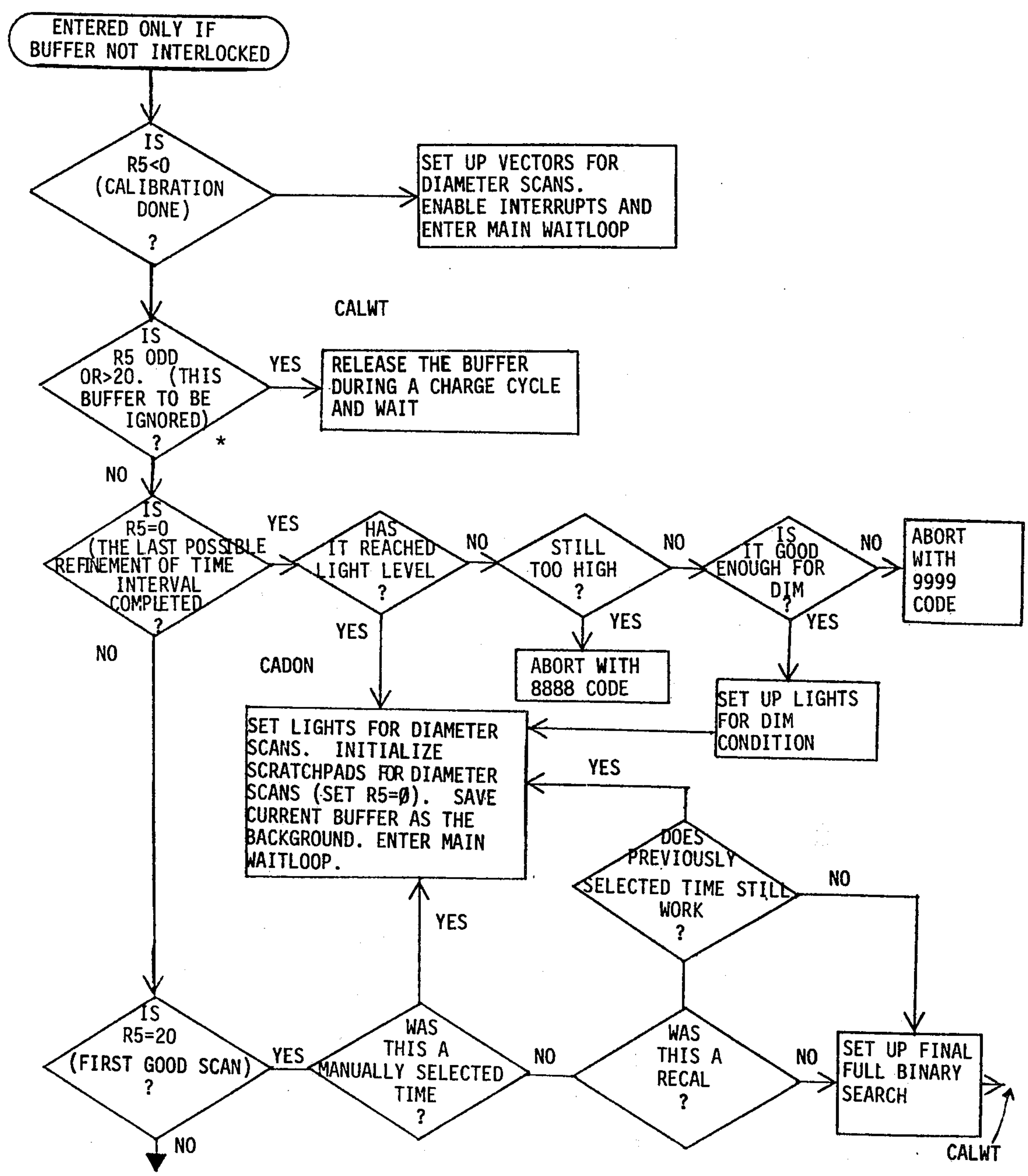
FIG. A-12b

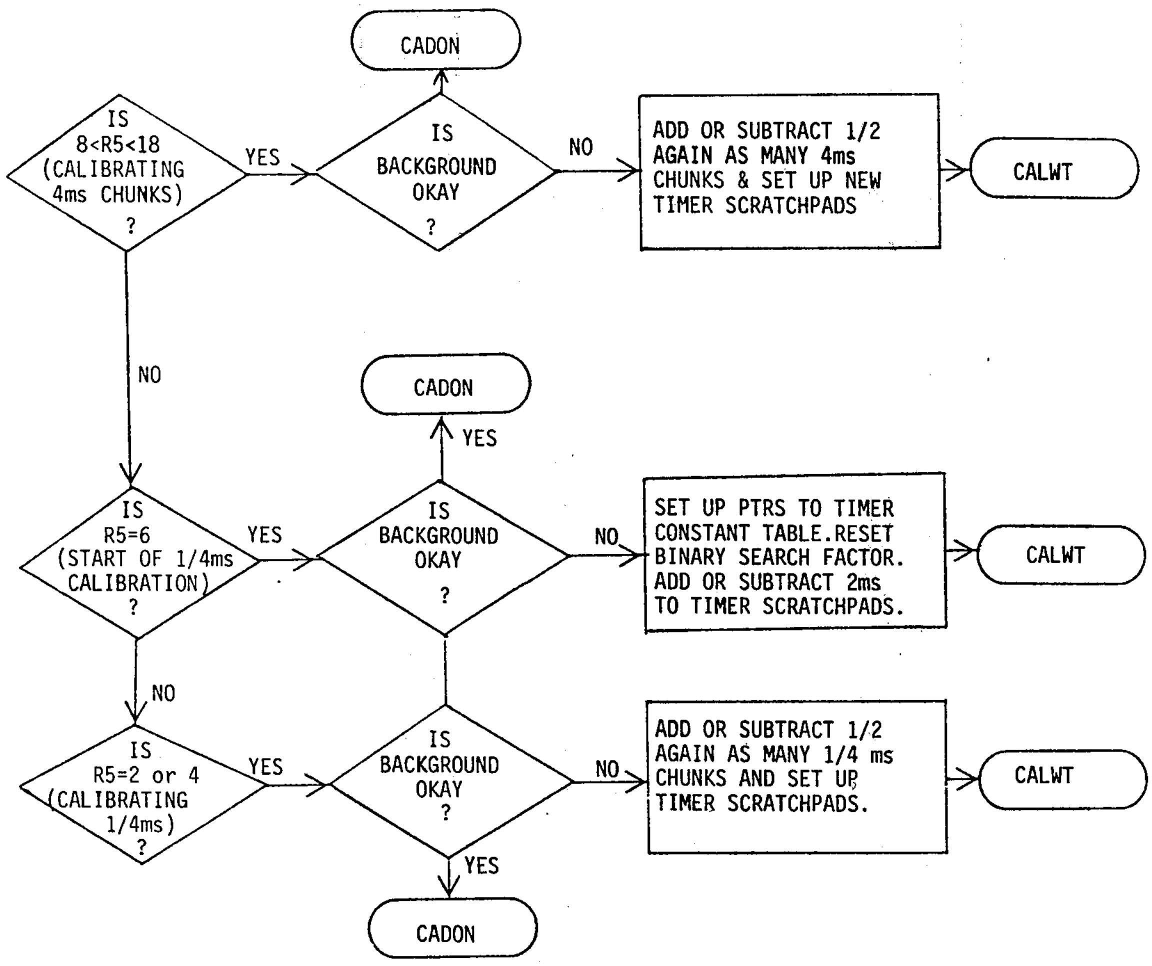

* NOTE

The first few buffer loads are thrown away to get rid of excess charge. After calibration begins, every other buffer load must still be thrown away. This is because one buffer is being collected while another is being processed. Since the processing actually changes the required charge time, the next buffer load does not yet reflect the updated time.

Calibration - Buffer Processing (Cont.)

FIG. A-12c

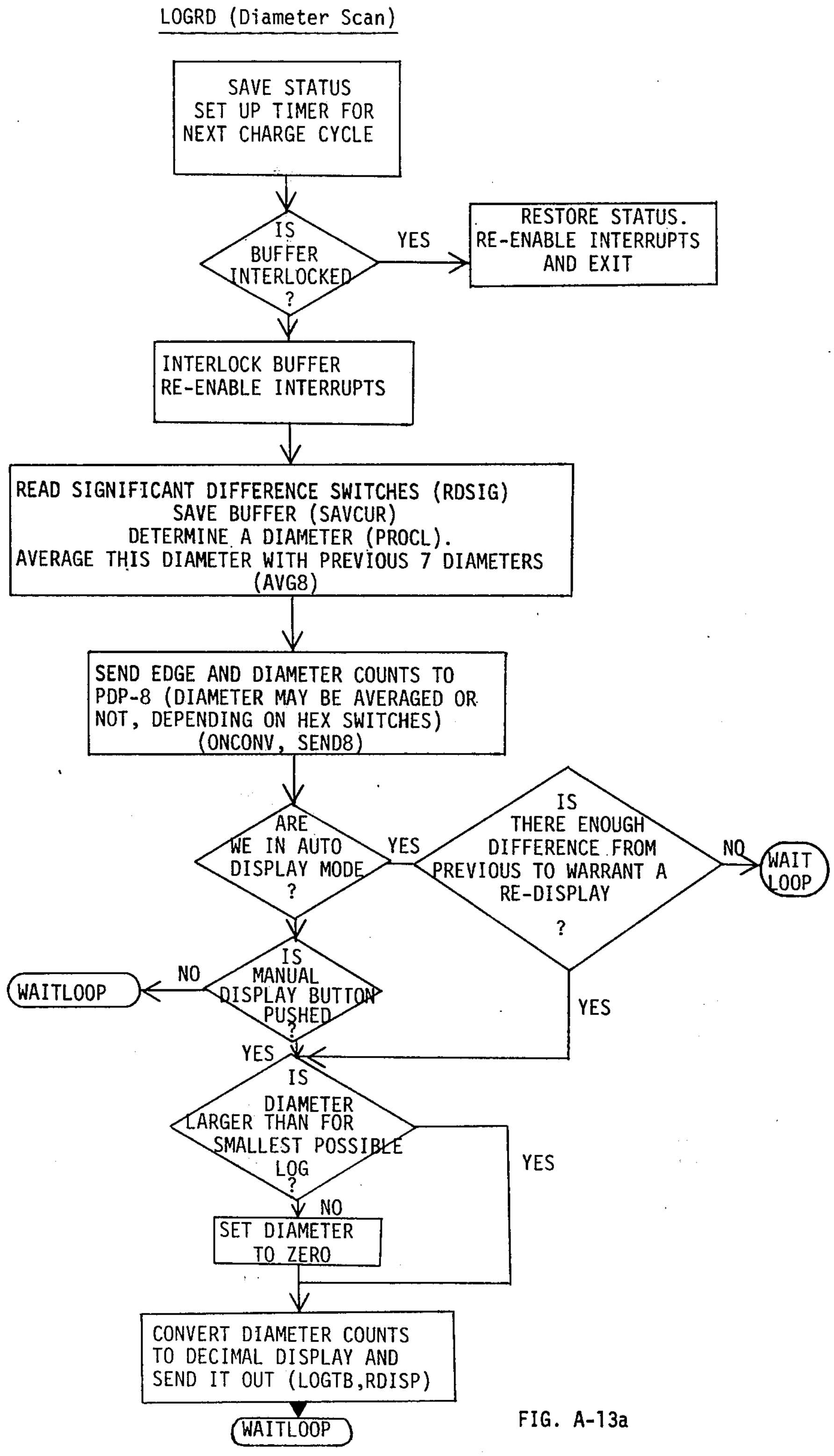
FIG. A-13a

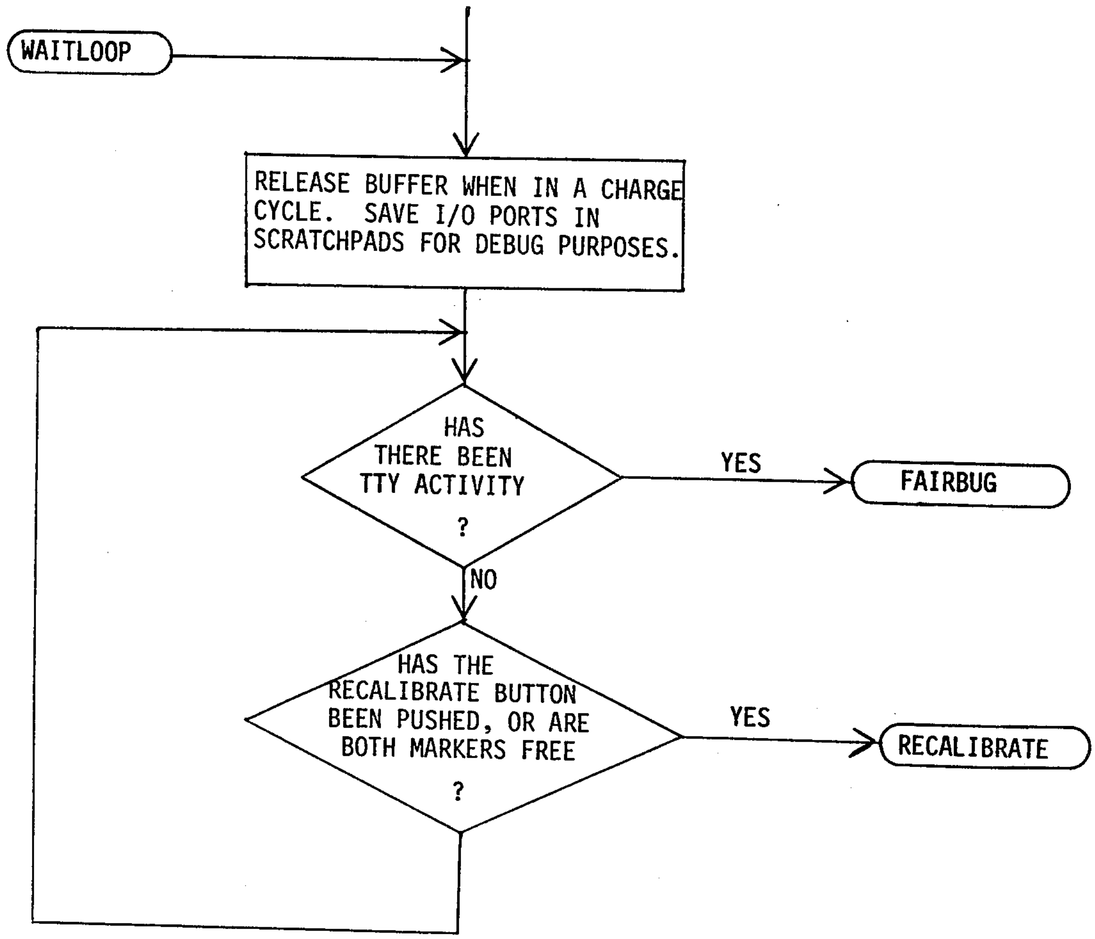
FIG. A-13b

PROCL (Process Log)
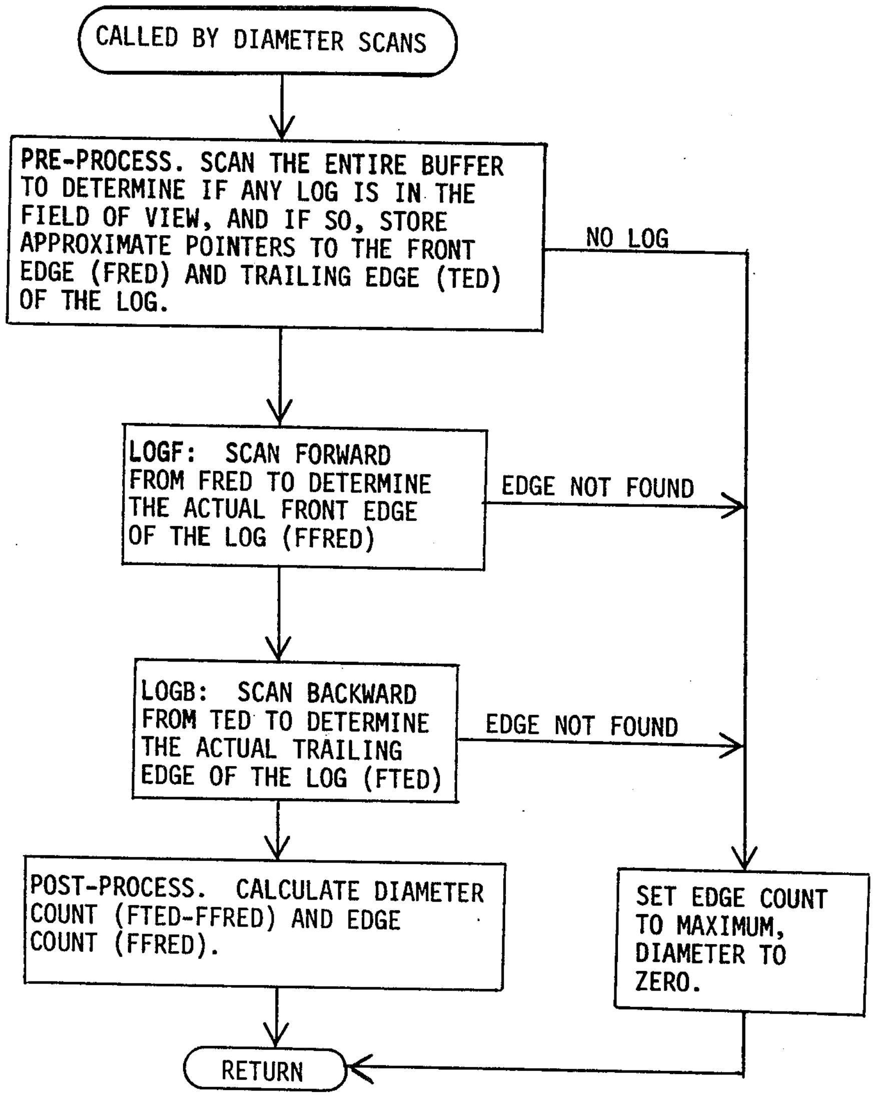
FIG. A-14

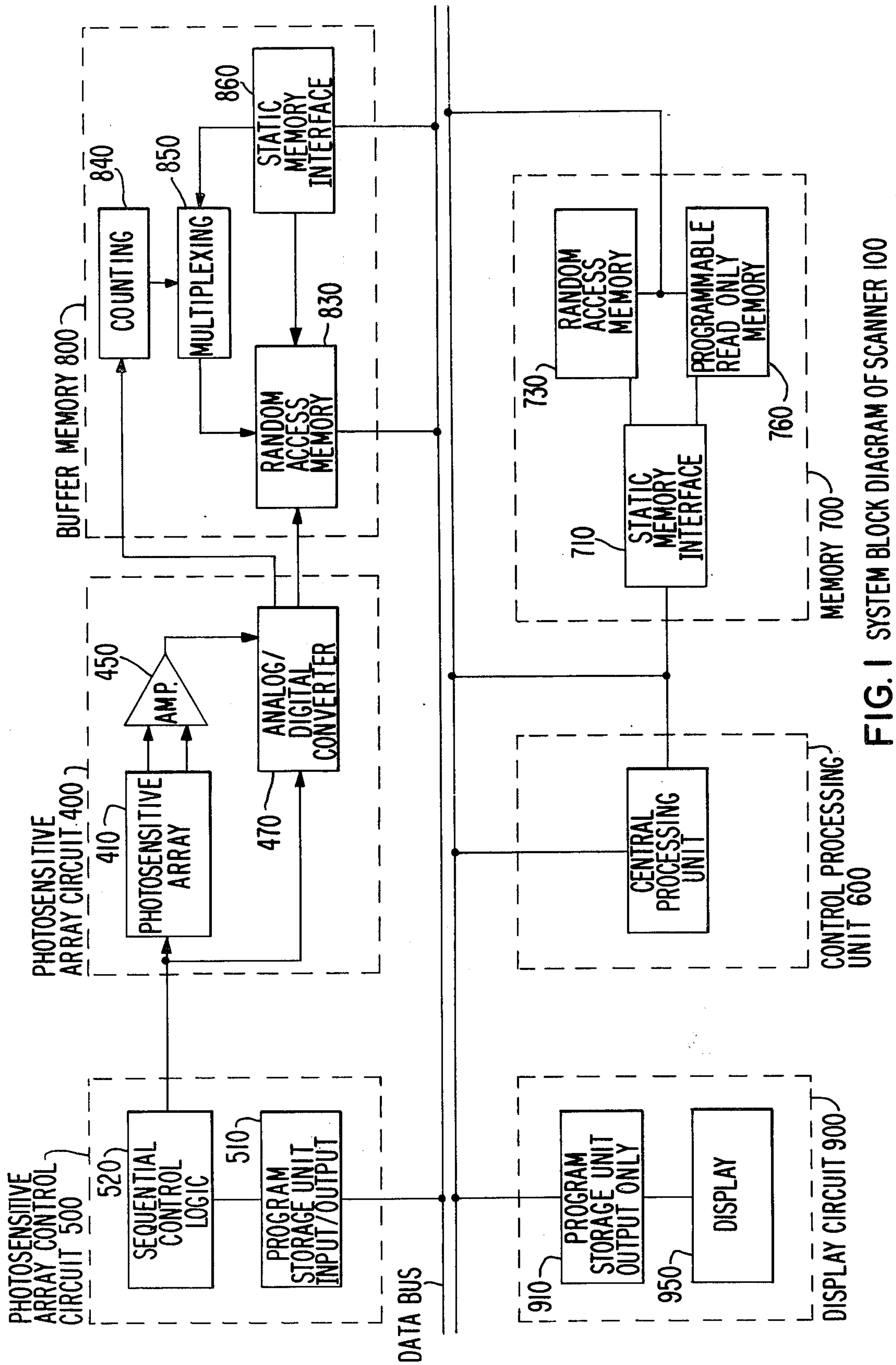
FIG. 1 SYSTEM BLOCK DIAGRAM OF SCANNER 100

FIG. 2A
FIG. 2B
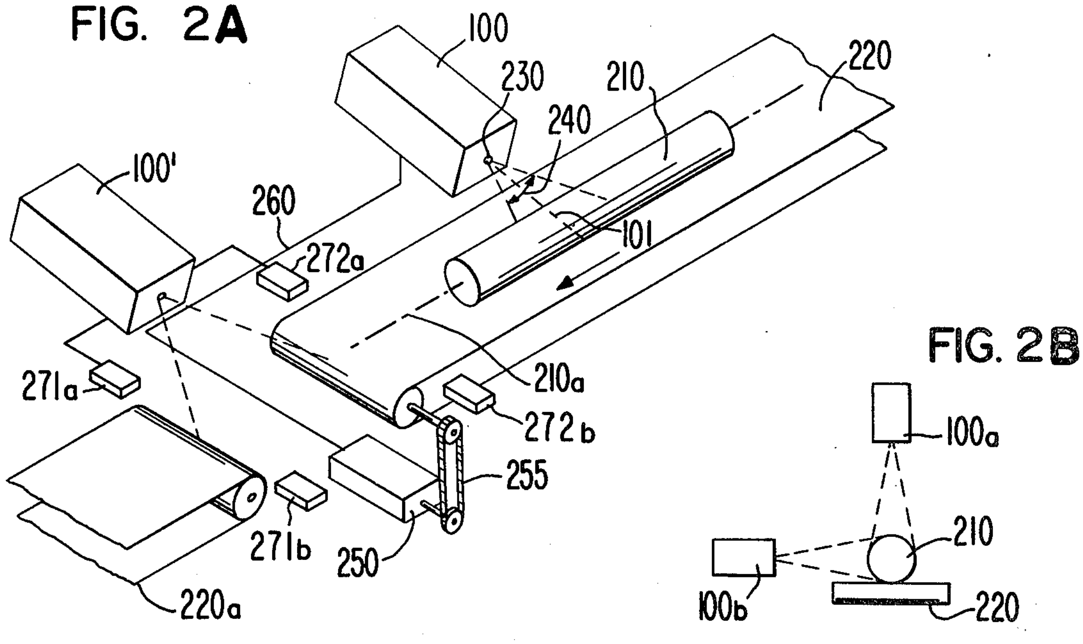
FIG. 3A
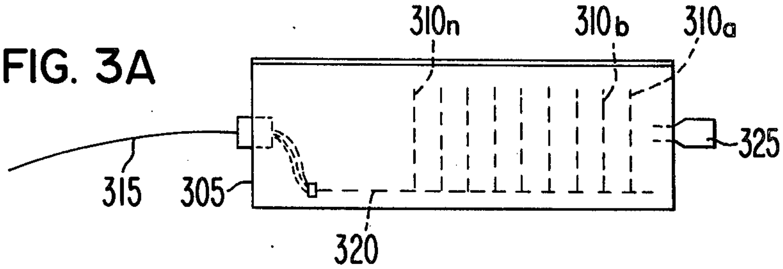
FIG. 3B
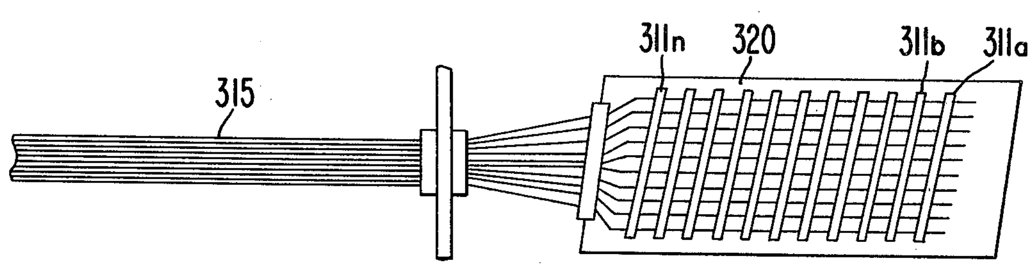

PHOTOSENSITIVE ARRAY CIRCUIT 400

FIG. 5 PHOTOSENSITIVE ARRAY CONTROL CIRCUIT

CENTRAL PROCESSING UNIT 600

MEMORY 700

BUFFER MEMORY 800

DISPLAY CIRCUIT 900

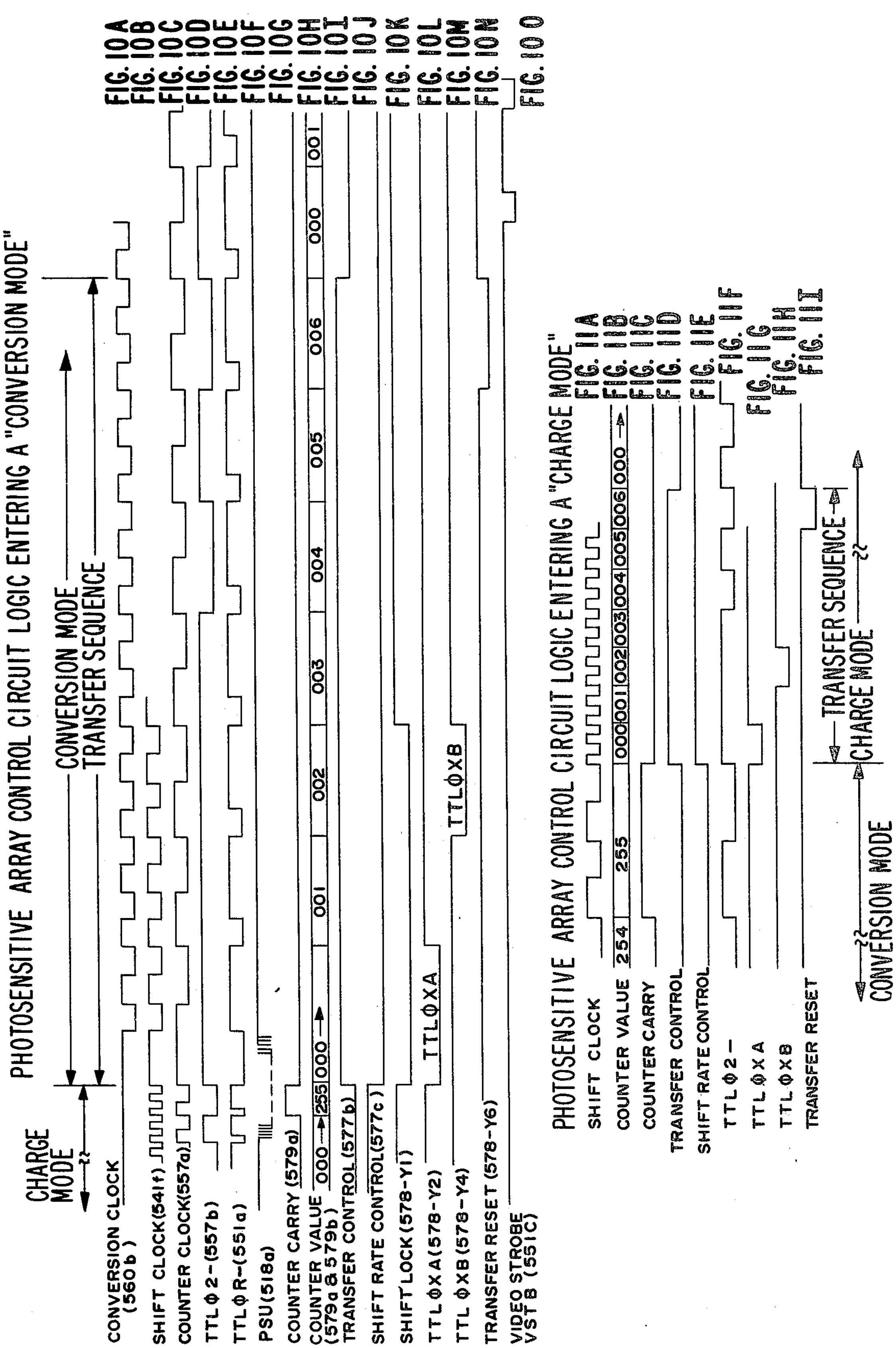
PHOTOSENSITIVE ARRAY CONTROL CIRCUIT LOGIC ENTERING A "CONVERSION MODE"
CHARGE MODE
CONVERSION MODE
TRANSFER SEQUENCE
CONVERSION CLOCK (560b)
SHIFT CLOCK(541f)
COUNTER CLOCK(557a)
TTL Φ 2-(557b)
TTL Φ R-(551a)
PSU(518a)
COUNTER CARRY (579a)
COUNTER VALUE (579a & 579b)
000 255 000 001 002 003 004 005 006 000 001
TRANSFER CONTROL (577b)
SHIFT RATE CONTROL(577c)
SHIFT LOCK(578-Y1)
TTL ΦXA(578-Y2)
TTLΦXA
TTL ΦXB(578-Y4)
TTLΦXB
TRANSFER RESET (578-Y6)
VIDEO STROBE VSTB (551C)
FIG. 10A
FIG. 10B
FIG. 10C
FIG. 10D
FIG. 10E
FIG. 10F
FIG. 10G
FIG. 10H
FIG. 10I
FIG. 10J
FIG. 10K
FIG. 10L
FIG. 10M
FIG. 10N
FIG. 10O
PHOTOSENSITIVE ARRAY CONTROL CIRCUIT LOGIC ENTERING A "CHARGE MODE"
SHIFT CLOCK
COUNTER VALUE
254 255 000 001 002 003 004 005 006 000
COUNTER CARRY
TRANSFER CONTROL
SHIFT RATE CONTROL
TTL Φ 2-
TTL Φ XA
TTL Φ XB
TRANSFER RESET
CONVERSION MODE
CHARGE MODE
TRANSFER SEQUENCE
FIG. 11A
FIG. 11B
FIG. 11C
FIG. 11D
FIG. 11E
FIG. 11F
FIG. 11G
FIG. 11H
FIG. 11I

FIG. 12

PROM 878 MAP

| INPUT: C. CPU. READ | C. ADR 15 | 14 | 13 | 12 | 11 | 10 | 09 | C. ADR 08 | | OUTPUT |
|---|---|---|---|---|---|---|---|---|---|---|
| 8 | 7 | 6 | 5 | 4 | 3 | 2 | 1 | 0 | TERMINAL Q | 3 |
| 1 | 0 | 1 | 0 | 1 | 0 | 0 | 0 | 0 | | 0 |
| ALL OTHER ADDRESSES | | | | | | | | | | 1 |

FIG. 13

CHIP SELECT DECODER 720 PRØM MAP

INPUT

| A: READ | ADR 15 | 14 | 13 | 12 | 11 | 10 | 09 | ADR 08 |
|---|---|---|---|---|---|---|---|---|
| 8 | 7 | 6 | 5 | 4 | 3 | 2 | 1 | 0 |
| 1 | 0 | 0 | 0 | 0 | 0 | 0 | 0 | 0 |
| 1 | 0 | 0 | 0 | 0 | 0 | 0 | 0 | 1 |
| 1 | 0 | 0 | 0 | 0 | 0 | 0 | 1 | 0 |
| 1 | 0 | 0 | 0 | 0 | 0 | 0 | 1 | 1 |
| 1 | 0 | 0 | 0 | 0 | 0 | 1 | 0 | 0 |
| 1 | 0 | 0 | 0 | 0 | 0 | 1 | 0 | 1 |
| 1 | 0 | 0 | 0 | 0 | 0 | 1 | 1 | 0 |
| 1 | 0 | 0 | 0 | 0 | 0 | 1 | 1 | 1 |
| 1 | 0 | 0 | 0 | 0 | 1 | 0 | 0 | 0 |
| 1 | 0 | 0 | 0 | 0 | 1 | 0 | 0 | 1 |
| 1 | 0 | 0 | 0 | 0 | 1 | 0 | 1 | 0 |
| 1 | 0 | 0 | 0 | 0 | 1 | 0 | 1 | 1 |

OUTPUT

| Q: 7 | 6 | 5 | 4 | 3 | 2 | 1 | 0 |
|---|---|---|---|---|---|---|---|
| 1 | 0 | 0 | 0 | 0 | 0 | 0 | 0 |
| 0 | 1 | 0 | 0 | 0 | 0 | 0 | 0 |
| 0 | 0 | 1 | 0 | 0 | 0 | 0 | 0 |
| 0 | 0 | 0 | 1 | 0 | 0 | 0 | 0 |
| 0 | 0 | 0 | 0 | 1 | 0 | 0 | 0 |
| 0 | 0 | 0 | 0 | 1 | 0 | 0 | 0 |
| 0 | 0 | 0 | 0 | 0 | 1 | 0 | 0 |
| 0 | 0 | 0 | 0 | 0 | 1 | 0 | 0 |
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 0 | 1 |
| 0 | 0 | 0 | 0 | 0 | 0 | 0 | 1 |

METHOD AND APPARATUS FOR MEASURING DIMENSIONS

BACKGROUND OF THE INVENTION

1. Cross-Reference to Related Application

This is a continuation-in-part of patent application serial No. 727,042 filed September 27, 1976, on an invention of Theodore A. Laliotis entitled "Method and Apparatus for Measuring Dimensions".

2. Field of the Invention

This invention relates to measuring systems and, in particular, to a measuring system which automatically provides measurements of selected dimensions of a wide variety of objects.

3. Prior Art

The measurement of dimensions of objects is of importance in a wide variety of fields. For example, in steel mills the lengths of steel slabs must be measured. On highways, the length of trucks must be measured to insure compliance with the motor vehicle laws. Freight haulers measure the volume of freight, as well as its weight, to calculate shipping charges. In lumber mills accurate measurements of log dimensions are necessary to select the most efficient cutting pattern for each log.

Various techniques have been proposed to measure the dimensions of objects automatically. In one system, mirrors rotate at a uniform rate and reflect light to a sensor from the object whose length is being measured. The number of light pulses generated by the sensor, together with the rotational rate of the mirror and the velocity of the object, uniquely determine the length of the object. The rotating parts, however, require frequent maintenance and adjustment.

Other automatic dimension measuring apparatus have been the subject of several patents. see, e.g., U.S. Pat. No. 3,897,156 entitled "Structure for Measuring the Average Diameter of an Approximately Circular Cross-Section of an Object," by Leon H. Chasson and assigned to Atmospheric Sciences, Inc., and U.S. Pat. No. 3,787,700 entitled "Automatic System for Measuring Selected Dimensions," also invented by Chasson and assigned to Atmospheric Sciences, Inc., the assignee of the invention which is the subject of this application. Also U.S. Pat. No. 3,806,253 entitled "Sweep Measuring Scheme" issued on an application of Denton and assigned to Weyerhaeuser Company, discloses a method of determining the sweep of a log.

SUMMARY OF THE INVENTION

This invention offers several advantages over prior art systems by utilizing a photosensitive array in such a manner as to eliminate several components formerly incorporated in systems used to measure selected dimensions of objects suitably disposed in front of an array or other apparatus. Although as with certain prior art systems, the system of this invention is substantially all electronic, this invention provides a self-contained automatic measuring system substantially smaller than prior art systems. In a significant departure from prior art systems, the system of this invention automatically compensates for ambient lighting conditions, and thus may be quickly and conveniently situated in many locations, and operated in a wide variety of lighting conditions.

According to this invention, a photosensitive array, typically comprising a charge coupled device image sensor containing a plurality of light sensing elements, is positioned to sense lighting conditions in relation to a path along which objects travel. The analog output signals generated by the photosensitive array, both with and without an object disposed in front of it, are converted to digital form, and stored in a memory. A central processing unit compares the set of digital signals representative of the view of the array with an object present to the set of signals representative of the view without an object present to derive a set of signals representative of the dimensions of the object in the view of the array. In one embodiment a third set of digital signals is also stored in the memory. This set of digital signals is indicative of the noise level (often called "dark current") present within the photosensitive array. This noise level is typically a function of temperature. The dark current signals may be utilized by the central processing unit to further refine the accuracy of the measurement of the dimensions of the object.

Placing an object before the photosensitive array influences the output signals of the photosensitive array in a manner related to the dimensions of the object. These analog signals from the photosensitive array are converted to digital form and stored in a buffer memory. Typically, the buffer memory is a random access memory having n storage locations or "bytes," each of k bits, where n at least equals the number of sensing elements of the photosensitive array, and k is typically, although not necessarily, eight.

Digital signals temporarily stored in the buffer memory are supplied to a central processing unit (CPU) and memory. The memory typically includes a programmable read only memory (PROM) which controls the central processing unit and a random access memory (RAM) for storing several sets of digital signals. One set of n bytes may be a stored digital signal representative of the dark current of the photosensitive array. Another set of digital signals, also of n bytes, is representative of the background, that is, the area viewed by the array without an object present. Still another set of digital signals, again of n bytes, indicative of the present view of the photosensitive array, either with or without an object present, is also stored in the random access memory. Depending upon a variety of factors, the dark current measurement may, if desired, be omitted.

By utilizing any one of numerous algorithms and the information stored in the random access memory, the central processing unit can detect the presence of the object being measured. In one embodiment this is accomplished by comparing the digital signals representative of the view of the array without an object present with the digital signals representative of the view of the array with an object present, and ascertaining if a preselected difference between the two sets of signals exists. Having detected the presence of the object, the central processing unit then proceeds to calculate the selected dimensions of the object and display them. The central processing unit may be used to continuously calculate selected dimensions of an object passing before the photosensitive array. For example, in one embodiment, the invention is capable of measuring the diameter of a log at locations situated one inch apart along the length of the log, as these locations pass in front of the photosensitive array at a velocity of up to 400 feet per minute. In one embodiment the invention is capable of resolving dimensions to tolerances of less than 0.5 millimeters.

In timber related operations, the invention is useful for log sorting, bucking, breakdown, scaling, sweep detection, edging, and other operations. It is also useful in controlling veneer lathes, peeler blocks, and in the sorting of lumber. This invention is also useful in measuring the dimensions of objects other than logs, such as metal products of any other object capable of being distinguished from the background.

While the operation of this invention will be described in terms of detecting the presence of an object by comparing the field of view of the scanner with an object present to the field of view of the scanner without an object present, it should be understood that this invention can also detect the disappearance of an object from the field of view. Basically, the field of view which the invention utilizes as a basis of comparison with subsequent fields of view, and which is referred to herein as the "background field of view" or "background" can be defined by the invention to either include or exclude an object. If the background includes the object, then upon removal of the object from the background, the invention indicates both the absence of the object and selected dimensions of the absent object. To avoid confusion as to whether the background includes or excludes an object, the dimensions of which are being measured, the invention includes means for controlling the measurement of the background to ensure that the background, when defined, is in a desired state (i.e., either includes or excludes an object). In one embodiment the means for controlling the measurement of the background comprises a plurality of marker sensors and corresponding light sources arranged to detect the presence or absence of the object. Signals from the marker sensors are used to control the times during which the scanner of this invention measures the background. In certain applications where this invention is used to measure selected dimensions of objects, the background will be measured during the absence of any object. In applications such as security surveillance, the background will often include numerous objects the absence of any of which is to be detected. In either case, the presence of additional objects in the field of view of the scanner can be detected, and usually selected dimensions of these objects can be measured by the invention.

This invention provides numerous substantial advantages over the prior art. Because the scanner of this invention can utilize only ambient lighting, no special or critical lighting requirements are necessary, although special lighting can be used either alone or in combination with ambient lighting. Therefore, the invention may be used inside a building, or outside a building in any type of weather. The scanner can be programmed to automatically adjust, as necessary, to changing ambient lighting and temperature conditions. A variety of ambient light levels can be selected depending upon the reflectivity of objects the dimensions of which are being measured, and the reflectivity of the background.

DESCRIPTION OF THE DRAWINGS

FIG. 1 is a schematic drawing of one embodiment of the system of this invention.

FIGS. 2A and 2B depict an embodiment of this invention as utilized to measure logs.

FIGS. 3A and 3B depict the physical arrangement of the components of one embodiment of this invention.

FIGS. 10A through 100 are diagrams depicting the interrelationship of the various signals illustrating operation of this invention during the transition from the "charge" mode to the "conversion" mode.

FIGS. 11A through 111 are additional diagrams illustrating the operation of the photosensitive array control circuit logic during the transition from the conversion mode to the charge mode.

FIG. 13 is a map of the programming of the chip select decoder 720.

FIG. 12 is a map of the programming of programmed reasonly memory 878.

Figures 3C, 3D, 3E, 3F, 3G, 3H, 3I, 3J:
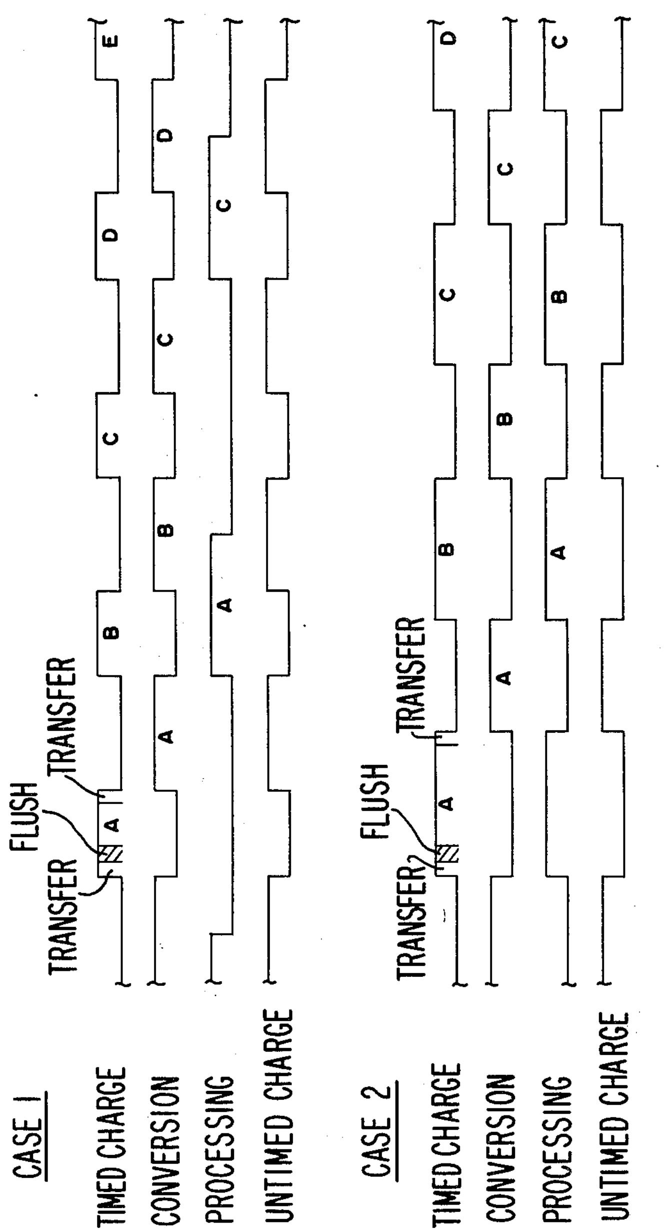
FIGS. 3C through 3J schematically depict operational modes of one embodiment of this invention.

FIGS. A-1,A-2,A-3,A-4,A-5,A-6*a*, A-6*b*,A-7, A-8,A-9,A-10, A-11,A-12*a*,A-12*b*, A-12*c*,A-13*a*,A-13*b* and A-14 are of use in explaining the microprocessor program described in detail in Appendix A.

DETAILED DESCRIPTION

A. General System Operation

In explaining the structure and method of operation of this invention, reference will be made to an embodiment of this invention used to measure selected dimensions of logs. The description of this embodiment is not to be interpreted as limiting the invention to the use described.

A block diagram of the structure of this invention is depicted in FIG. 1. The manner of operation of this structure will now be described.

According to this invention, a photosensitive array 410 of n elements scans a desired region of space in response to signals received from sequential control logic 520. The photosensitive array 410 typically comprises a sequence of n photosensitive elements. For example, in one embodiment found particularly useful in measuring the diameters and other dimensions of logs, the array is a single line of 256 elements (often called a "linear array"), such as the CCD 110 produced by Fairchild. In other embodiments, suitable for this and other applications, two dimensional arrays (often called "area arrays"), for example, 100 elements by 100 elements (such as the CCD 201 area array produced by Fairchild Camera and Instrument Corporation, hereinafter "Fairchild,") will be more suitable.

Each of the n photosensitive elements, each typically comprising a charge storage element of a charge coupled device (hereinafter referred to as "CCD"), in photosensitive array 410 will accumulate a charge representative of the integral of the light incident upon it over a selected time period from a segment of space upon which that particular element of photosensitive array 410 is focused. The analog output signal from each element of photosensitive array 410 will have an amplitude proportional to the integral of the light incident upon that element of photosensitive array 410. Because at any instant the light striking photosensitive array 410 is related to the dimensions of objects in the field of view of photosensitive array 410, the pattern of charge packets from all the light sensing elements of photosensitive array 410 will be related to certain dimensions of whatever objects are focused upon photosensitive array 410.

The photosensitive array control circuit 500 (containing sequential control logic 520 and program storage unit 510) controls photosensitive array 410 and provides, for example, signals to control the rate and disposition of output signals from the photosensitive array 410.

The charge packets within the n elements of photosensitve array 410 are used to generate n analog signals which are supplied sequentially to operational amplifier circuit 450, where the analog signals are amplified. The resulting amplified analog signals are then serially supplied to analog to digital converter 470 for conversion to digital form. The output signals from analog to digital converter 470 are a series of n digital signals (of binary form) each digital signal comprising a byte of k bits (where k is a selected integer such as eight (8)), the value of each byte being proportional to the integral of the light incident upon that particular element of photosensitive array 410 from which that byte was derived over whatever time period was selected.

One method of generating the appropriate time period for integration of the light within photosensitive array 410 comprises controlling central processing unit 600 to allow the ambient light to cause accumulation of charge within the elements of the photosensitive array 410 over changing (such as increasingly longer or shorter) time periods until the output signals from analog to digital converter 470 reach predetermined values. In this manner scanner 100 can adapt itself to varying ambient light levels. Alternatively a separate, suitable focused light sensitive element, for example, a photodiode, can be used to sense ambient light and to produce an output signal which is used to determine a suitable time period for accumulation of charge within the photosensitive array 410.

Another method of generating an appropriate integration time is to program CPU 600 to allow array 410 to perform a first charge integration for a predetermined period within an allowable time range, e.g., for 32 milliseconds in a range of 4 to 64 milliseconds. If a 5-volt average signal per element over the total number of elements of photosensitive array 410 is not supplied from A/D converter (as determined by CPU 600 analyzing the digital output signals from A/D converter 470 stored in RAM 830) then a longer (if the average signal is less than 5-volts) or shorter (if the average signal is more than 5-volts) period of integration is selected. This iterative process continues until a signal of five (5) volts plus or minus a selected tolerance is obtained. If such a signal can be obtained, CPU 600 supplies a signal so indicating. This signal may, for example, illuminate a portion of display circuit 900 thereby notifying the user of scanner 100 that a suitable background reading has been made and measurements may begin.

If a 5-volt average signal cannot be obtained even with integration time at either the longest or shortest period in the allowable range of integration times then the CPU 600 is programmed to repeat the iterative process with a different "target" voltage, for example 2.5 volts. Depending upon the target voltage actually achieved, CPU 600 will illuminate a selected portion of display circuit 900 to notify the user that the ambient light conditions are sufficient (i.e., the desired average signal can be achieved), marginal (i.e., the minimum or maximum average signal corresponding to a marginally dim or marginally bright ambient can be achieved), or insufficient (either too dim or too bright).

According to another method for selecting the integration time, one or more switches may be added to scanner 100 to allow manual selection of the integration time. In this manner the integration time can be selected to optimize the sensitivity of the system to objects of given reflectivity or a range of reflectivities. For example, the integration time can be selected to result in the largest difference in output signal level between the background reading and the average object reading or to maximize the probability of detecting the presence of an object selected from a population of objects having a given statistical distribution of reflectivities.

The series of n digital signals from analog to digital converter 470 are then supplied to the random access memory 830 of buffer memory 800. As each of the n bytes is supplied to random access memory 830 another signal is supplied from A/D converter 470 to counting circuit 840, which generates a unique address to define the location in memory 830 at which the corresponding byte of data from converter 470 is stored. Multiplexing circuit 850 transmits the address to memory 830. The particular address supplied to memory 830 is controlled by an address-select signal generated by a flip-flop contained within counting circuit 840. Thus the address supplied to memory 830 is generated either by counting circuit 840 or supplied by control processing unit 600 through static memory interface 860.

The contents of buffer memory 800 are then supplied to the central processing unit 600 and memory 700. The operation of central processing unit 600 is controlled by a programmable read only memory 760 which contains instructions for the CPU 600. Included within memory 700 is a random access memory 730, which will typically store two or three sets of digital data of n bytes each, depending upon whether dark current signals are desired. If so, the first set of n bytes will be a dark current correction which is a characteristic of photosensitive array 410 and the ambient temperature. A background reading, representative of the view of photosensitive array 410 when no object is being measures, will be stored as a second set of n bytes. This second set of data will be referred to as the background reading, and corresponds, for example, in the use of this invention in a lumber mill, to a view of an empty conveyor belt passing in front of the photosensitive array 410. This set of data also may be useful to provide a comparison with any "present" view for ascertaining whether an object is passing in front of the photosensitive array 410.

The third set of data stored in RAM 730 corresponds to the present view of the photosensitive array 410. The present view of the photosensitive array 410 may include an object not present in the background view, in which event the signals from photosensitive array 410 will be different from the background reading. Finally, remaining portions of random access memory 730 will be used by central processing unit 600 to store intermediate results of calculations.

Utilizing the instructions (which may include look-up tables) from the programmable read only memory 760 (hereinafter . sometimes referred to as "PROM 760") and the data stored in random access memory 730, the central processing unit 600 will perform calculations as specified by PROM 760. Typically, CPU 600 will correct the data indicative of the present view of the photosensitive array 410 by the data representative of the dark current and the data representative of the background view. The resulting digital signals will indicate the presence or absence of the object and will be related to the size of the object. These digital signals will be converted to dimensional information utilizing tables stored in PROM 760. The dimensional information is then transferred to display circuit 900, where it may be presented in any desired manner, for example, by light emitting diode display or by a printer. In addition, the information may be supplied to other equipment or computers or remote displays for further use, for example, to control automatic machine tools or update inventory records or to make an operator at a remote location aware of the dimensions of the object being measured. As will be seen, the operator can also operate the scanner manually to display, as long as he desires, the readout of the scanner at a selected time.

B. Object-Scanner Relationship

A schematic diagram of one possible relationship between one embodiment of the apparatus of this invention (hereinafter referred to as "smart scanner 100" or "scanner 100"), and an object being measured is depicted in FIG. 2A. In FIG. 2A a log 210 is shown on conveyor belt 220. Scanner 100 is shown positioned at substantially a right angle to the longitudinal axis **210*a* of log 210**.

As log 210 passes into view of scanner 100, light reflected from log 210 is focused upon the photosensitive array 410 contained within scanner 100 by a lens of well-known construction having a lens axis or centerline 101 as shown. Axis 101 is perpendicular to array 410. A suitable lens will be obvious to one skilled in the measuring arts and thus this lens will not be described in detail.

The longitudinal axis **210*a* of log 210 is defined as the series of centers, or centroids of area, of the infinite number of cross sections of log 210. Thus the longitudinal axis 210*a* need not, and typically will not, be a straight line. If the longitudinal axis 210*a* is curved in only a single plane, that is, in only two dimensions, an error will be introduced into the measurements made by scanner 100 unless the scanner 100 is placed so that the axis 101 of the lens is perpendicular to the plane of curvature of the longitudinal axis 210*a*. Thus in applications of scanner 100 to logging operations involving substantially straight logs or logs curved in only two dimensions it will be advantageous to place the scanner 100 so that lens axis 101 is perpendicular to the surface upon which the log is resting or being moved; for example, scanner 100 would be placed directly over and looking down on conveyor belt 220. The problem of measuring a log having a longitudinal axis 210*a*** which is curved in three dimensions is discussed below in conjunction with FIG. 2B.

The pattern of the incident light on array 410 will be related to the dimensions of the log 210. In FIG. 2A the diameter of log 210 appears to scanner 100 as occupying angle 240. The view of each element of array 410 may be converted to digital format and stored as previously discussed. By counting the number of elements of array 410 from which a significantly different digital value is obtained, as compared to that element's background reading, and then utilizing a look-up table relating log diameters to the number of significantly different elements of array 410, the diameter of the log can be displayed to the user of scanner 100.

One technique for controlling scanner 100 so that a background reading is taken at the desired time, for example, without a log present, is also shown in FIG. 2A. In this system a pair of "marker sensors" comprises, for example, two light sources **271*b* and 272*b* and two photosensitive elements 271*a* and 272*a*. The sources 271*b* and 272*b* and elements 271*a* and 272*a* are well known in the art and in one embodiment are as described in the above-cited Chasson patents. In operation elements 271*a* and 272*a* are connected to scanner 100, and continually relay signals to scanner 100 to provide an indication of whether any object is disposed on belts 220 and 220*a* in front of scanner 100. If no object is present, as indicated by marker sensors 271 and 272 then scanner 100 stores the reading from photosensitive array 410** as "background."

Also depicted in FIG. 2A is a technique which may be utilized to eliminate the conveyor 220 or other supporting means from the background view of scanner 100'. By providing a gap in conveyor 220, for example, as shown between conveyors 220 and **220*a*, or an opening in other supporting means for log 210, the view of scanner 100' of log 210 may be compared with a background which contains few or no objects. Additionally the gap facilitates more accurate measurements of logs by eliminating discolorations on the moving conveyor which interfere with measurements, and by allowing bark, chips, snow, or other debris which might introduce errors in measurements to fall from conveyor 220 before passing before scanner 100**.

To measure the length of log 210, the previously described system and a sensor to measure the velocity of the log 210 may be used. In one embodiment the velocity sensor is a digital speed sensor 250 of a type well-known to those who design sawmill equipment, although other types of sensors known to the art, such as light sensitive marker sensors and corresponding light sources, can be used. As described above, scanner 100' is situated so that light from a region between two sections of the conveyor is focused upon array 410 within scanner 100'.

As soon as the first end of log 210 moves into the field of view of array 410, a significantly different light pattern is sensed by scanner 100. The "significantly different pattern" may be defined by any appropriate algorithm; for example, by the existence of a pre-selected difference of thirty counts between the prior and present readings from five consecutive photosensitive elements in the photosensitive array 410. As long as the log 210 is moving in the direction designated by the arrow in FIG. 2, the central processing unit, connected to digital speed sensor 250 by cable 260, accumulates pulses from the digital speed sensor 250, which is connected to conveyor 220 by, for example, chain 255. After the log 210 leaves the field of view of the photosensitive array 410, the light pattern "substantially returns" to the original pattern stored in the memory and CPU 600 ceases counting pulses from digital speed sensor 250. "Substantially returns" may be defined by any appropriate algorithm, such as a pre-selected difference between the present and prior readings from a given number of consecutive photosensitive elements in array 410. A look-up table or other means may be then utilized to convert the number of pulses accumulated to units of length for display.

In an alternative method for measuring the length of log 210 scanner 100 can use an area array of light sensing elements and can be positioned sufficiently far from log 210 (or other object being measured) that the view of array 410 includes the full length of the log. Two mutually perpendicular lines of light-sensing elements in the area array can then be read out alternatively or in sequence to provide measures of both the length and width (or diameter) of the object being measured.

Alternatively a separate linear array can be used to measure length and in the manner previously described the output signals from this separate linear array will be related to the length of the log 210 and can be converted to dimensional information and displayed.

An embodiment utilizing two scanners 100*a* and 100*b* for measuring logs is shown in FIG. 2B. This embodiment is particularly useful for measuring logs having a longitudinal axis which is curved in three dimension or logs with non-circular cross-sections. By utilizing two scanners 100*a* and 100*b* to measure two diameters at the same cross-section of log 210, the average diameter will be substantially independent of the position of the log 210 on conveyor 220. Certain advantages from using two scanners are more fully described in U.S. Pat. No. 3,787,700, previously cited herein. While the U.S. Pat. No. 3,787,700 discloses the advantages of using two linear arrays of scanning elements and particularly two such mutually orthogonal arrays mounted forty-five degrees (45° ) from the vertical, this invention mounts two mutually orthogonal scanners 100*a* and 100*b* so that the centerlines of the lenses are vertical and horizontal respectively. This arrangement is particularly useful in measuring the correct vertical diameter and the correct horizontal diameter of a log cross-section. For example, with logs possessing substantially elliptically-shaped cross-sections, the major and minor axes of an ellipsoidal cross-section (which correspond to major and minor diameters of the cross-section of the log) can be measured independently. This then allows a saw mill to set what are called the top and side heads (i.e, vertically cutting and horizontally cutting saws) in an optimum manner to convert the log to a rectangularly shaped cant. Prior art systems, to the contrary, sometimes assumed that logs possessed substantially circular cross-sections. In addition, the use of scanners 100*a* and 100*b* will reduce the effect of knots or limb stubs upon the perceived average diameter of log 210.

Another advantage of the scanner embodiment shown in FIG. 2B is that each scanner can be utilized to detect an edge of the object to thereby provide a signal to the other scanner to indicate the distance between the object and the other scanner. This is done by detecting the particular photosensitive element in one array which produces the first output signal significantly different from the background and correlating the location of this photosensitive element to the location of the edge by using a stored lookup table, for example, or a formula based on trigonometric principles. This calculation can be done in a computer using well known programming principles and information from the two scanners, or using a hard-wired, special purpose computer. Of course, the more precisely the object-scanner distance is known the more accurate will be the measurements by the other scanner. On veneer lathes, for example, this technique facilitates close control of the knife edge used for peeling a layer of wood from a log.

C. Physical Configuration of One Embodiment of Scanner 100.

Two views of one possible physical configuration of scanner 100 are shown in FIGS. 3A and 3B. FIG. 3A is a side view, while FIG. 3B is a top view. Depicted in FIG. 3A are a case 305, printed circuit boards 310*a* through n (n is any required number sufficient to enable all circuits of scanner 100 to be placed within case 305) containing the necessary computer and control circuitry, mother board 320, power cable 315 and lens 325. Lens 325 may be any suitable lens known in the prior art, for example, in one embodiment lens 325 is a 10.5 millimeter, f2 anastigmatic. Shown in FIG. 3B are power cable 315, mother board 320, and printed circuit board edge connectors 311*a* through n. The power cable may be also utilized to transmit signals from scanner 100 to other apparatus, for example, to another computer maintaining inventory records. In one embodiment the dimensions of the case 305 are fourteen inches in length, five inches in width, and six inches in height. While these dimensions yield a particularly compact sensing and processing unit with its associated advantages such as ease of handling and replacement, the size, of course, can vary.

D. System Operational Modes

The operation of the circuitry of scanner 100 can be conveniently viewed as being in three different, but possibly overlaping in time, modes— "timed charge," "conversion," and "processing." The simplified timing diagrams in FIGS. 3C, 3D, 3E, 3F, 3G, 3H, 3I and 3J show the interrelationships of these modes for two different cases. The "timed charge" or "charge" mode of operation, FIGS. 3C (case 1) and 3G (case 2), is defined as that controlled or measured time during which charge is accumulating in the individual elements of photosensitive array 410. In addition, the timed charge mode includes the time during which the previously accumulated charges in the elements of array 410 are transferred from the charge storage elements to the analog shift registers of array 410 (when array 410 is a CCD array), and then discharged from the registers and discarded; that is, the operations referred to herein as "transfer" and "flush," respectively. Although the transfer and flush operations are shown only on the "A" cycle of FIGS. 3C and 3G, it should be understood that these operations occur in every cycle, for example, cycles "B", "C", "D", "E", etc.

The "conversion" mode, FIGS. 3D and 3H, is defined as the time during which analog to digital converter 470 is converting the timed charge from each element of array 410 from analog to digital form. Of course, because photosensitive array 410 will be exposed to ambient light regardless of the mode of operation of scanner 100, charge will accumulate in array 410 continuously. The charge which accumulates during the conversion mode is not useful and must be discarded. This untimed or uncontrolled accumulation occurs during the conversion mode and is shown in FIGS. 3F and 3J.

The processing mode, FIGS. 3E and 3I, is the operation of the system to process the digital data from A/D converter 470 by the remaining circuitry of scanner 100. The time during which the system is in the processing mode is shown in FIGS. 3E and 3I by the portions of these waveforms labelled "A,", "B", "C", etc.

FIGS. 3C to 3F and FIGS. 3G to 3J show two possible examples of the overall operation of scanner 100. Case 1 FIGS. 3C to 3F) shows the interrelationship of the previously defined three modes for relatively bright ambient lighting conditions. Case 2 (FIGS. 3G to 3J) shows the interrelationship for relatively dim ambient light. Note the relatively shorter time charge cycles in case 1 (FIG. 3C) as compared with case 2 (FIG. 3G). The rapidity of charge accumulation in FIG. 3C as contrasted with FIG. 3G results in an overlap of processing (FIG. 3E) with timed charge (FIG. 3C). Because of this overlap the circuitry of scanner 100 will discard or ignore the timed charge cycles which occur when the system is "busy" processing; for example, in FIG. 3C, cycles B and D will not be processed, and in general, only every other timed charge cycle will be processed. In contrast, note that in case 2 the timed charge cycle (FIG. 3G) is sufficiently long or slow to allow processing of every timed charge cycle—none need be discarded. Of course, depending upon the speed of the circuitry and the ambient light conditions, less frequent processing of the converted timed charge signals may occur, for example, one in ten cycles, or one in twenty cycles. This will all be further explained in the subsequent description.

E. Central Processing Unit 600

The operation of one embodiment of the circuitry of scanner 100 as depicted in schematic block diagram form in FIG. 1 and, in more detail, in FIGS. 5 through 9 will now be described. In the following description the value in ohms or microfarad (unless otherwise specified) or type, as appropriate, of a circuit component used in one embodiment of this invention will be placed in parentheses following the first reference to the component. Components of different values or types than those given can be used to vary the performance of the circuitry, as desired. Also, throughout the description the terms high logic level, high level and high are used synonymously as are the corresponding terms with low instead of high. Typically, using currently available logic circuitry, a high will be a voltage greater than 2.5 volts, while a low will be less than or equal 2.5 volts although other voltage levels can be used as appropriate logic circuits become available. As power is applied to the system from a power supply not shown in the drawings, but of any suitable well-known type, central processing unit 600 begins to execute its programmed instructions, typically at the first address 0000. The central processing unit 600 depicted in FIG. 1 is shown in additional detail in FIG. 6. In the embodiment shown, central processing unit 600 is the model 3850 central processing unit associated with the Fairchild F8 Microcomputer System. Central processing unit 600 is described in detail in *An Introduction to Microcomputers* by Adam Osborne and Associates, Inc., published by the same in Berkeley, Calif. in 1975. The portions of the book relating to the F8 are incorporated herein by reference. Additional technical description, including operational theory, electrical interface specifications and system timing information, of the Fairchild F8 Microprocessor System is available in the Fairchild Semiconductor F8 Circuit Data Book, which is also incorporated hereby by reference.

The source statement for the program used with central processing unit 600 in one embodiment of this invention is attached to this specification as Appendix A. Column 1 of this statement lists the location in ROM memory of the machine or object code given in column 2. Column 3 gives values assigned to labels, column 4 gives the line reference number of the object and source code on the assembler listing, column 5 lists labels and column 6 lists the instruction in assembler language. Column 7 gives the operand field and column 8 lists remarks.

This program is stored in PROM 760, which contains 2K to 4K bytes of memory. The source statements are divided into three parts. Part I contains the diagnostic routines used with the scanner 100. Part II contains the real time routines of the system for calibration, log reading and diameter look up and Part III contains the log processing routines, including the program for scanning the buffer containing the output signals from the A-D converter 470 to detect the shape of a log and to determine the diameter of a log. These source statements are associated with the Fairchild F8 Microprocessor and use the instructions associated with this microprocessor.

Figure 15:
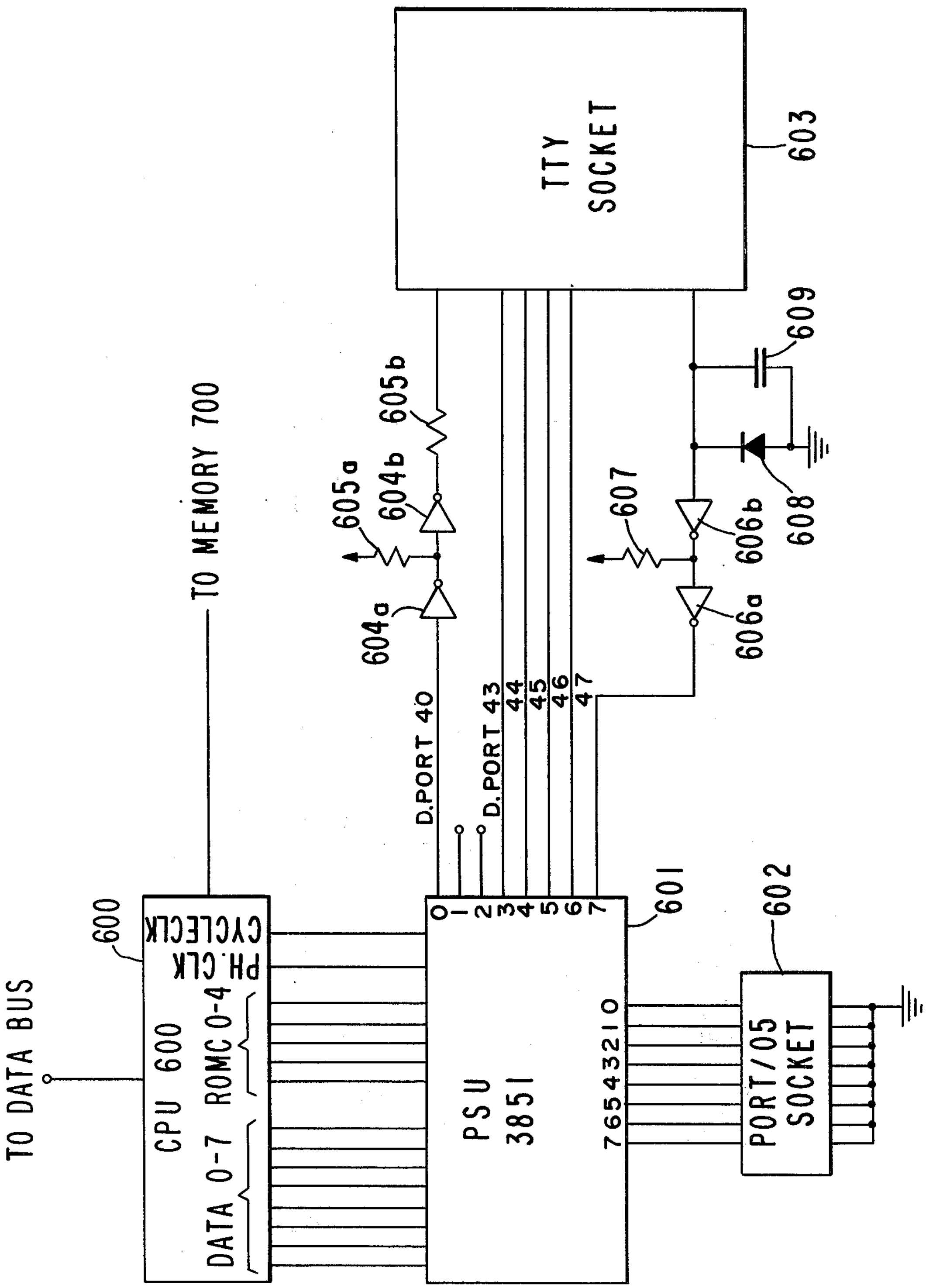
FIG. 15 is a schematic block diagram of an alternative embodiment of this invention wherein an additional PSU 601 and ancillary circuitry is combined with CPU 600.

The diagnostic routines in particular are designed to work with a version of central processing unit 600 containing an additional program storage unit 601 useful for diagnostic tests. PSU 601 is connected to CPU by fifteen data lines and contains ports 40, 43, 44, 45, 46 and 47 connected to a teletype socket for the purpose of allowing the output from CPU 600 to be printed out if desired. FIG. 15 shows this structure.

Appendix A also contains a summary of the operation of the microprocessor portion of scanner 100. This memory includes several logic flow charts and a description of the subroutines contained in the program.

Central processing unit 600 (or CPU 600) includes connections for eight lines of bi-directional data designated DATA0 through DATA7 with DATA0 carrying the least significant bit and DATA7 the most significant bit. All data transfers on lines DATA0 through DATA7 are controlled by signals on the control lines ROMC0 through ROMC4, which are driven by central processing unit 600. The state of lines ROMC0 through ROMC4 will be determined by the program within CPU 600, and signals on these lines may also control the manipulation of the program within CPU 600.

The line designated CYCLE.CLK carries a timing pulse which occurs every 4 or 6 PH.CLK pulses depending upon the particular instruction being carried out by CPU 600.

The width of a pulse on CYCLE.CLK is equal to the PH.CLK cycle time. The trailing edge of a CYCLE.CLK pulse provides a reference for all timing diagrams. The CYCLE.CLK pulse is generated by CPU 600 in response to the XTLY signal input from crystal 539 and its associated circuitry. The CYCLE.CLK signal synchronizes all data transfer within scanner 100. CPU 600 also generates signals on PH.CLK which are related to those on CYCLE.CLK. The signals on PH.CLK control internal data manipulation within and among the various components of the computer system associated with photosensitive array 410, for example, CPU 600, RAM 730 and PROM 760. PH.CLK signals will be the same frequency as the signal XTLY derived from a crystal oscillator 539 by photosensitive array control circuit 500, and supplied to CPU 600.

The data bus driver signal placed on line DBDR* is an input to CPU 600 and serves to inhibit access to the data bus by all components connected to the data bus except a selected component as defined by the ROMC lines.

Figure 6:
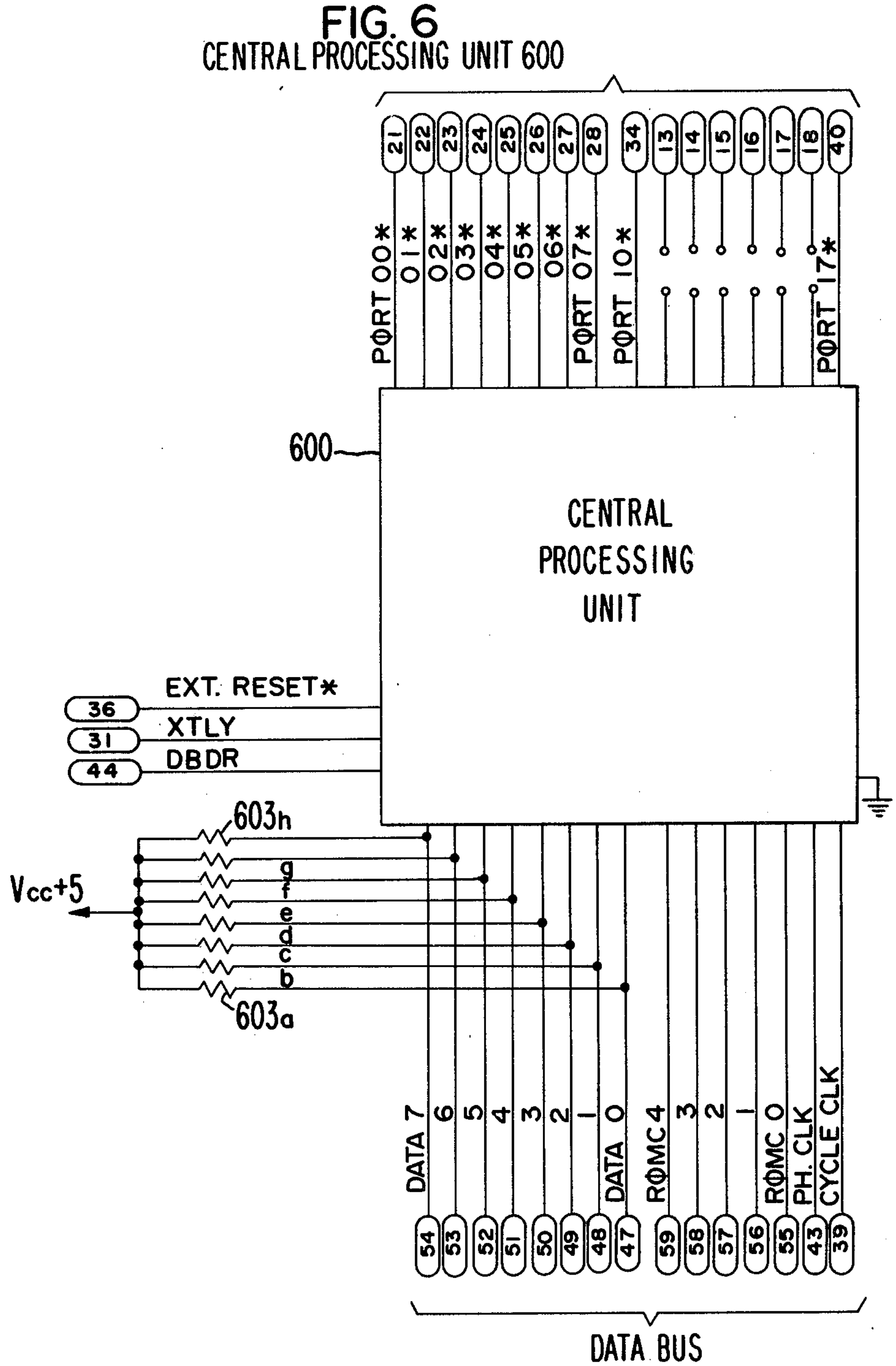
FIG. 6 is a schematic diagram of central processing unit 600 of FIG. 1.

Line EXT.RESET* is also an input to CPU 600, and when active causes CPU 600 to reset an informal program counter to zero thereby restarting program execution at address 0000. Ports 00*-07* and 10*-17* are each connected to eight lines for bi-directional transfer of input and output data. Data bus pull-up resistors 603*a* to 603*h* (each 10k) are also shown in FIG. 6.

CPU 600 may be programmed to perform additional tasks beyond measuring the dimensions of an object, and in particular it may be programmed to interrelate with other equipment with which scanner 100 operates. For example, if scanner 100 is installed in a lumber mill, in addition to measuring log and lumber dimensions, it may supply information to other computers for use in accounting functions such as maintaining inventories of logs or lumber processed or it may supply information to various machine tools such as lathes or saws. Of course numerous other applications in addition to those mentioned may also be made of the information generated by scanner 100.

In one preferred embodiment of scanner 100, CPU 600 is relieved of the burden of subtracting by a hard wired subtractor (FIG. 14) of a type well known in the digital circuit arts. Such a subtractor reduces the number of subtraction operations which must be performed by CPU 600, thereby allowing faster processing of the signals supplied from array 410 by more directly subtracting the digital values representative of the background (and dark current if desired) from the signals representative of the present field of view.

Figure 14:
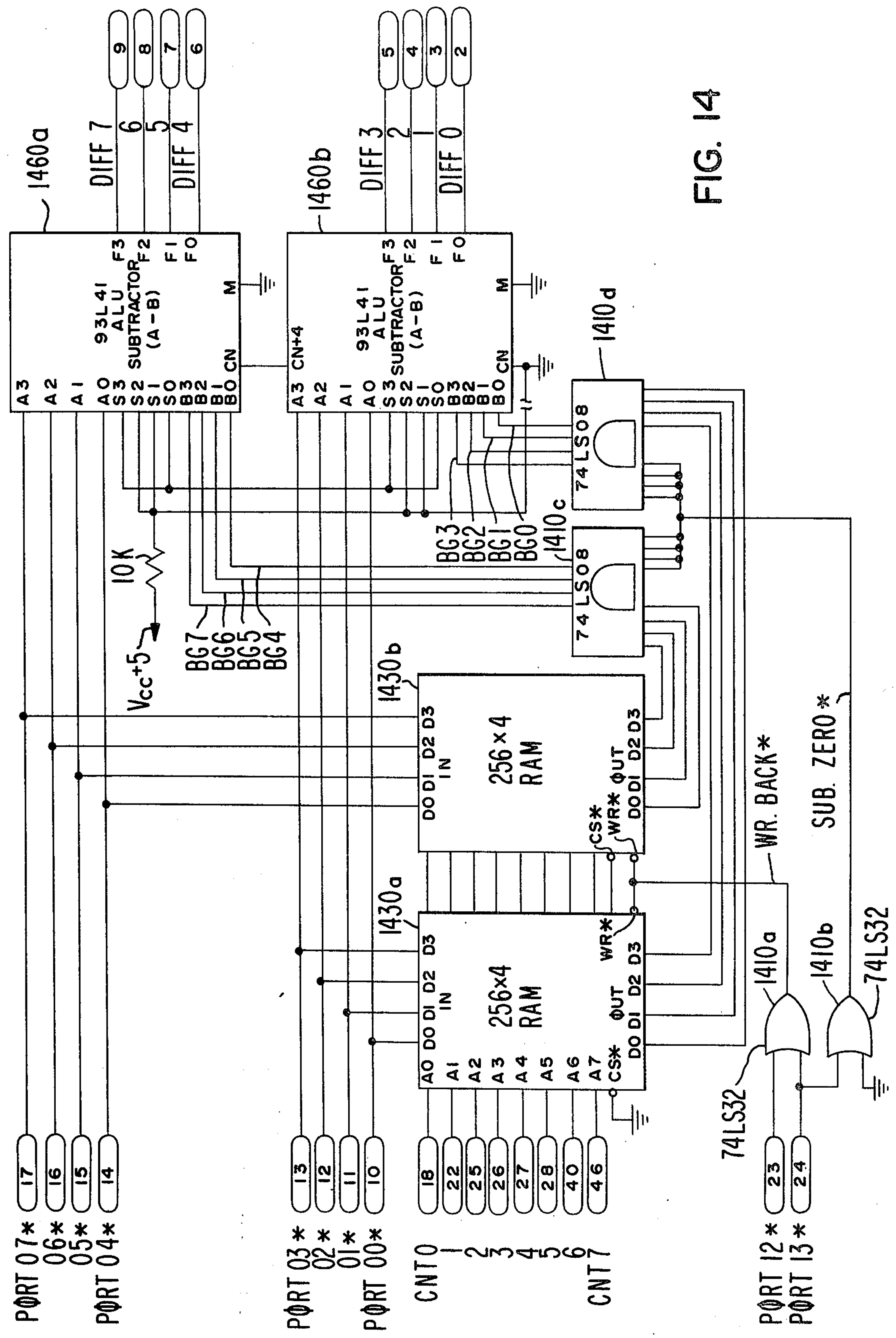
FIG. 14 is a schematic diagram of hard wired subtractor 1400.

FIG. 14 shows one appropriate subtractor. Such a subtractor is connected to receive output signals directly from A/D converter 470 (MN9324) and output signals from RAM 830, to perform the subtraction, and to supply output signals directly to RAM 730. In such an embodiment each digital byte representative of the background view of each element of array 410, all of said bytes stored in RAM 830, are subtracted from the corresponding digital signal representative of the view of each element of array 410 with an object present as the signals are supplied to the subtractor from converter 470. The difference between each byte in RAM 830 and the corresponding byte from converter 470 is stored as a series of bytes in RAM 730.

If utilized, one embodiment of the subtractor circuit of FIG. 14 includes eight lines (PORT 00* to 07*) for receiving data. Data on these lines may originate from CPU 600 or A/D converter 470. Addresses utilized by RAM's 1430*a* and 1430*b* (each Fairchild 3538) are supplied on lines CNT0 through CNT7. Operation of the subtractor circuit is controlled by signals from CPU 600 or A/D converter 470 on the lines designated PORT 12* and PORT 13*. Data from the subtractor circuit is supplied, depending upon the state of line PORT 13*, to RAM 730 on lines DIFF0 through DIFF7 from arithmetic logic units 1460*a* and 1460*b* (each a 93L41).

In operation asserting PORT 13* low allows PORT 12* to control the WR.BACK* signal via gate 1410*a* (74LS32). At the rising edge of WR.BACK*, data presented at the input connections of RAM's 1430*a* and 1430*b* is stored at the address specified by the signals on lines CNT0 to CNT7. As each byte is stored, the buffer memory 800 will increment the address. Signal SUB.-ZERO*, a duplicate of the signal at PORT 13*, then disables AND gates 1410*c* and 1410*d* (each 74LS08) to force the subtrahend to zero.

Subtraction of the background reading (output from RAM's 1430*a* and 1430*b*) from the present reading (PORT 00* to PORT 07*) is accomplished by ALU's 1460*a* and 1460*b*. When PORT 13* is high (not asserted), WR.BACK* is forced high via gate 1410*a* to disable further storage of the background reading. PORT 13* also enables gates 1410*c* and 1410*d* by forcing SUB.ZERO* high. The algebraic difference is then presented by the ALU's 1460*a* and 1460*b* as signals on lines DIFF0 to DIFF7.

F. Photosensitive Array Control Circuit 500

Figure 4:
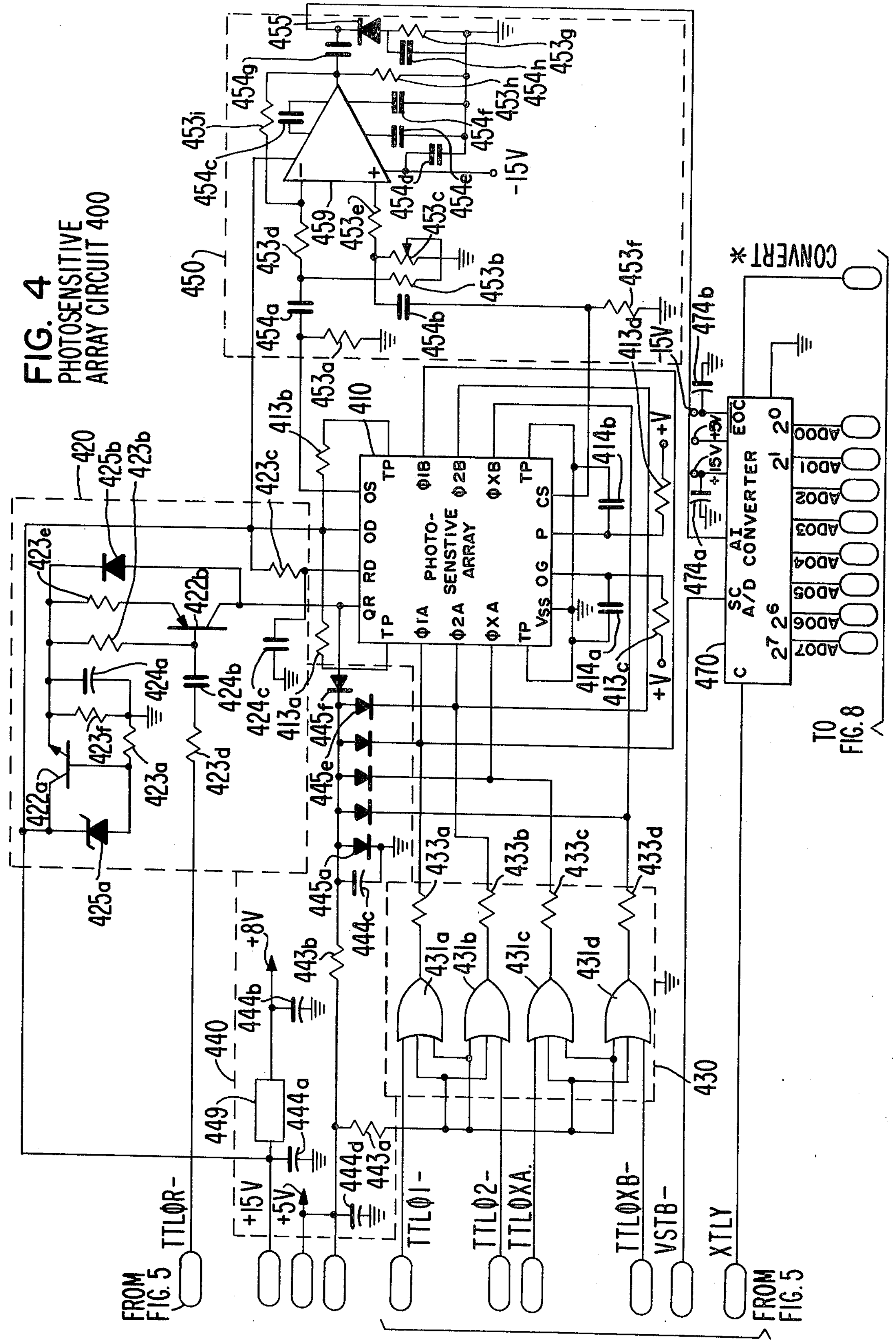
FIG. 4 is a schematic diagram of photosensitive array circuit 400 of FIG. 1.
Figure 5:
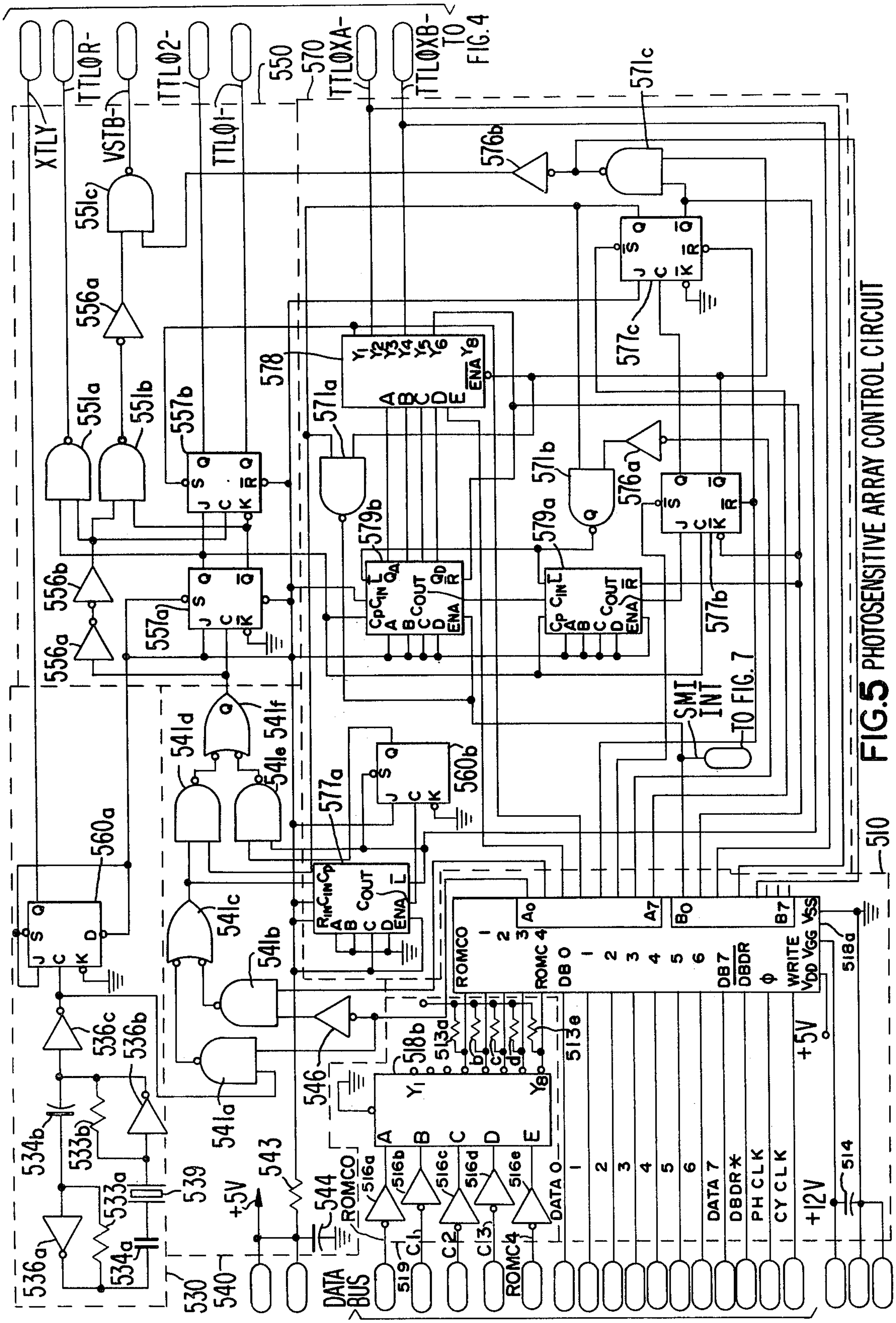
FIG. 5 is a schematic diagram of photosensitive array control circuit 500 of FIG. 1.

The photosensitive array control circuit 500 depicted in FIG. 1 is shown in detail in FIG. 5. The circuit in FIG. 5 is utilized to generate, with the proper interrelationship, the input signals for use in the circuit of FIG. 4. These signals include the system timing signal XTLY, video strobe signal VSTB, transfer signals TTLφXA and TTLφXB, analog shift register signals TTLφ1 and TTLφ2, and a reset signal TTLφR. The interrelationship of the signals generated by many of the various components of circuit 500 is shown in FIGS. 10 and 11, and will be referred to in the following description.

Input/output control circuit 510, also shown on FIG. 5, includes program storage unit 518*a* (Fairchild 3851), programmed read only memory 518*b* (Signetics 82S23), pull-up resistors 513*a* through 513*e* (each 1K0), and signal inverters 516*a* through 516*e* (each 74LS04). Central processing unit 600 is able to monitor the condition of control circuit 500 depicted in FIG. 5 by sensing the condition of each bit of port B of program storage unit 518*a*. Decoding circuit 519 serves to allow only selected signal combinations on lines ROMC0 through ROMC4 to reach program storage unit 518*a* (Fairchild 3851).

When power is supplied to scanner 100, central processing unit 600 first clears input/output ports A and B of program storage unit 518*a* to a non-active state, which in this particular case is the high level. The clearing of output ports A and B of program storage unit 518*a* causes the other circuit components depicted in FIG. 5, which will have switched on in a random position, to cycle through various conditions and reach steady state positions. The components depicted in FIG. 5 form a system which will rapidly reach a steady state condition, at which time all operations in the circuit depicted in FIG. 5 essentially cease and await further signals generated by the program of central processing unit 600.

Crystal frequency source 539, a commercially available crystal frequency source, turns on and oscillates at a selected frequency, four megahertz in this embodiment. Crystal frequency source 539 is included within clock circuit 530 which also includes additional circuit components to smooth, stabilize and amplify the signal from source 539. These elements are resistors 533*a* (330) and 533*b* (330), capacitors 534*a* (1.0pf) and 534*b* (1.0pf) and signal inverters 536*a*, 536*b* and 536*c* (each 7404). Circuits such as clock circuit 530 are well known in the art. System clock generator flip flop 560*a* (74LS109), driven by the four megahertz output signal from inverters 536*c*, toggles at one-half the four megahertz rate, or two megahertz, and supplies the system timing signal, designated XTLY in FIG. 5, to central processing unit 600.

The previously mentioned clearing of output ports A and B of program storage unit 518*a* to the high level (all logical zeroes) causes the signal on the Q output lead from flip flop 577*c* to go to the high level, thereby enabling NAND gate 541*d* (74LS00). A high level output signal on the $A_0$ output port from PSU 518*a* enables NAND gate 541*a* thereby allowing the four megahertz clock signal from signal inverter 536*c* to be gated through selection network 540 to the first stage of the video shift control flip flop 557*a* (74LS109), resulting in a two megahertz clock rate at output terminals Q and "not Q." (In the drawings a "not" output is designated by a bar over the symbol. For example, the "not Q" output is designated $\overline{Q}$.) The two megahertz clock rate (FIG. 10C) appearing at output terminals Q and "not Q" of video shift control flip flop 557*a* is again divided by flip flop 557*b* (74LS109), producing alternating one megahertz analog shift register signals TTL$\phi$1 and TTL$\phi$2 (FIGS. 10D and 11F). Analog shift register signals TTL$\phi$1 and TTL$\phi$2 are used to flush the previously accumulated charge from the analog shift registers of photosensitive array 410 (FIG. 4) to the output terminals CS and OS (see array 410, FIG. 4) while the photosensitive elements in array 410 are charging. During this time, the low output signal from the "not Q" output lead of flip flop 577*c* (74LS109) transmitted to the parallel enable input of modulo 16 counter 577*a* causes this counter to load the signal "0100" from its parallel inputs for clock synchronization purposes. The low level signal on the "not Q" output of flip flop 577*c* also disables NAND gate 541*e*.

During this time, the VSTB signal (on the output lead from NAND gate 551*c*) is held at a high level by a low level output signal from inverter 576*b* (74LS04). The output signal from inverter 576*b* is controlled by the state of the $B_4$ port from PSU 518*a*.

One input lead to NAND gate 551*a* (74LS00) is connected to the "Q" output lead of JK flip flop 557*a* and thus is enabled every other period of the output signal from OR gate 541*f* (74LS00). The output signal from gate 541*f* is applied, through dual inverters 556*a*, 556*b* to the other input lead to NAND gate 551*a* thereby resulting in an output pulse with a width equal to the width of the output pulse from OR gate 541*f* but with a frequency equal to the frequency of the output signal from flip flop 557*a*. Thus the output signal from NAND gate 551*a* has a duty cycle equal to one quarter of its period. Likewise, the output signal from NAND gate 551*b* (74LS00) has a duty cycle equal to one quarter of its period but is shifted by one-half cycle in relation to the output signal from NAND gate 551*a*. The output signal from NAND gate 551*a* is denoted TTL$\phi$R.

When the integration time expires (timekeeping is performed by the counter internal to CPU 600, FIG. 1), CPU 600 forces I/O port bit $A_6$ (FIG. 5) on PSU 518*a* to a low level which in turn forces the output signal from NAND gate 571*b* (74LS00) to a low level. This output signal is transmitted to the parallel enable input of modulo 16 counters 579*a* and 579*b* (74163) thereby loading these counters in parallel with all ones corresponding to the 255 count. This causes the $C_{OUT}$ signal from counter 579*a* (74163) to go high, thereby enabling the J input of JK flip flop 577*b* (74LS109). The next clock pulse (from the "Q" output lead of flip flop 557*a*) transmitted to the clock input of 577*b*, causes flip flop 577*b* to change state. The low-to-high transition of the signal on terminal "Q" of flip flop 577*b* changes the state of flip flop 577*c*. Thus the control circuit goes to its next stable state which has the "Q" output signal from flip flop 577*c* low. This low level signal disables NAND gate 541*d*. The new high level output signal on the "not Q" output lead from flip flop 577*c* enables NAND gate 541*e* in clock selection network circuit 540. The output signal from NAND gate 551*c* is still held high thereby disabling the VSTB signal which controls the operation of analog to digital converter 470 (FIG. 4). Converter 470 converts the analog output signal from photosensitive array 410 into binary coded form.

The change in the level from high to low of the output signal on the "not Q" output lead from flip flop 577*b* in response to the positive-going leading edge of the clock pulse from the "Q" output lead of flip flop 557*a* following the output pulse from counter 579*a* enables PROM 578 and drives the output lead from NAND gate 571*a* to a high level thereby enabling counter 579*b*.

The high output signal on the "not Q" output lead from flip flop 557*c* enables counter 577*a* and also enables NAND gate 541*e*, thereby switching the clock selection network circuit 540 to its slow mode of operation. This high level output signal also releases flip flop 560*b* (74LS109).

The output signal from OR gate 541*c* (74LS00) is transmitted to the clocking input of counter 577*a*. The high level output signal on the "not Q" output lead of flip flop 577*c* has parallel loaded counter 577*a* with the sequence 0100 (note that the "C" input is connected to the high level output signal on input lead 20 to photosensitive array control circuit 540). This high level signal also is transmitted to the enable input lead of counter 577*a* thereby placing counter 577*a* in a condition ready to count in response to the high level signal on its parallel-enable input "not L". Flip flop 560*b* produces an output signal every sixteen clock pulses input to counter 577*a*. The clock pulses from the "Q" output lead from flip flop 560*b* are transmitted to one input lead of enabled NAND gate 541*e* and then are used to clock flip flop 557*a*. The output signal on the "Q" output lead from flip flop 557*a* then is used to clock counter 579*b*. Note that counter 579*a* is disabled (enabled) by a low (high) level output signal on its reset input lead ($\overline{R}$) derived from the "Y6" output from PROM 578.

The output signal from inverter 536*c* in clock network 530 is transmitted through NAND gate 541*a*, enabled by a high level output signal on the $A_0$ output lead from PSU 518*a*, and then transmitted through NOR gate 541*c* to the clocking input lead $C_P$ of divide-by-16 counter 577*a*. Counter 577*a* has been enabled by the high level output signal on the "not Q" output lead from flip flop 577*c*. The output signal from counter 577*a* is transmitted to the clocking input of flip flop 560*b* which has been released by the high level output signal on the "not Q" output lead of flip flop 577*c*. Flip flop 560*b* further divides the output signal from NOR gate 541*c* by two. This output signal appears on the "Q" output lead from flip flop 560*b* and is transmitted to one input lead of enabled NAND gate 541*e*. Thus the "slow" output signal from NAND gate 541*e*, transmitted through OR gate 541*f*, is one thirty-second the frequency of the output signal from inverter 536*c*.

The slow clock output signal from NOR gate 541*f* is used to clock flip flop 557*a*. The output signal on the "Q" output lead of flip flop 557*a* (one sixty-fourth of the frequency of the output signal from inverter 536*c*) is transmitted to the clocking input of counters 579*b* and 579*a*. This counter 579*b* now counts at one sixty-fourth the frequency of the output signal from inverting amplifier 536*c*. Counter **579*a* is enabled only when the output signal on the "$C_{OUT}$" output lead from counter 579*b*** goes to a high level simultaneously with the appearance of a positive-going clocking pulse on the clocking input $C_P$.

Although counters **579*b* and 579*a* were loaded with all one's upon the appearance of a low level output signal from NAND gate 571*b*, the output signal from NAND gate 571*b* returned to a high level upon the appearance of a low level output signal on the "Q" output lead from flip flop 577*c* in response to the next following clocking signal from flip flop 577*a* appearing simultaneously with the high level output signal on the "$C_{OUT}$" output lead of counter 579*a*. This output pulse, which corresponds to a 255 count in counters 579*a* and 579*b*, is shown in FIG. 10G and the relationship of this count to the counter value in counters 579*a* and 579*b* is shown in FIG. 10H**.

The output signals from counter **579*b* are transmitted to PROM 578*e* which has been preprogrammed to respond to these output signals to control the transfer of charge packets from the light sensing elements of photosensitive array 410 to the shift registers contained on this array. Thus counter 579*b* starts counting up and causes PROM 578 to generate the transfer signals TTLφXA and TTLφXB used to shift charge packets accumulated in array 410 from the photosensitive elements in array 410 to the shift registers in array 410**.

The enabling of PROM 578 results in the following sequence of states on the output leads Y1 through Y6 of PROM 578 in response to the states "0000" through "0006" from counter **579*b***.

| 579b State | 578 Outputs | Action |
|---|---|---|
| 0000 | Y2 = 0 | TTL XA active. Start transferring charges into array 410 shift register A. |
| | Y1 = 0 | Hold 557B to a still state in order to disable shift pulses TTLφ1, and TTLφ2 |
| | Y4 = 1 | while transferring charges into shift register. |
| 0001 | Y2 = 1 | TTLφXA inactive. |
| | Y1 = 0 | Shift pulses disabled. |
| | Y4 = 1 | |
| 0002 | Y2 = 1 | TTLφXA inactive |
| | Y4 = 0 | TTLφXB active in order to transfer charges into shift register B of array 410 |
| | Y1 = 0 | Shift pulses TTLφ1 and TTLφ2 disabled |
| 0003 | Y4 = 1 | TTLφXB inactive |
| | Y1 = 1 | Shift pulses TTLφ1 and TTLφ2 enabled |
| 0004 | No change | |
| 0005 | No change | |
| 0006 | Y6 = 0 | Reset 577B, reset counters 579A and 579B to all zeroes. |

As shown in the above table describing the signal levels on the output leads from PROM 578 in response to the count on the $Q_A$ through $Q_D$ output leads from counter **579*b*, during the first state corresponding to the count "0000" on these output leads, the output signals on leads Y2 and Y1 are both zero. Thus TTLφXA, connected directly to the $Y_2$ output lead, goes to a low level and is "active." TTLφXA remains at a low level (FIG. 10L) for slightly more than one cycle of the output signal from flip flop 557*a* and during this time selected charge packets are transferred from half of the photosensitive elements in array 410** to one of the two shift registers formed on the same semiconductor chip as the photosensitive elements.

The next output state of counter **579*b* is "0001". During this state, the output signal on the $Y_2$ lead from PROM 578 goes to one thereby driving the TTLφXA signal to a high level and rendering this signal inactive. The output signal on the $Y_1$ output lead from PROM 578 remains low level, thereby disabling flip flop 557*b* and disabling the shift pulses TTLφ2 (FIG. 10D) and TTLφ1 used to drive the two shift registers on either side of the linear array of photosensitive elements in photosensitive array 410**.

The next state from counter **579*b* corresponds to "0010" in binary or "0002" in decimal. During this state, the output signal on $Y_2$ remains high, maintaining TTLφXA inactive. Also the output signal on Y1 remains zero disabling shift pulses TTLφ1 and TTLφ2. The output signal on the Y4 output lead goes to zero rendering TTLφXB active (FIG. 10M) (i.e., dropping the signal level to a low level) thereby to transfer the charge in those light sensitive elements in photosensitive array 410 controlled by the φXB transfer gate to the second shift register formed on the same semiconductor chip with the light sensing elements comprising photosensitive array 410**.

The relationship of these signals to the structure of the photosensitive array 410 is shown in a preliminary data sheet dated Mar. 1974 for the CCD 110 256-element image sensor produced by Fairchild Semiconductor Division of Fairchild Camera and Instrument Corporation. This data sheet is hereby incorporated herein by reference.

The next output state from counter **579*b* corresponds to "0011" or to decimal "0003". During this state, the output signal on lead $Y_4$ goes to a high level (see FIG. 10M). Simultaneously, the output signal on lead Y1 from PROM 578 goes to a high level thereby enabling flip flop 557*b*. On the next positive going pulse from inverter 556*b*, the output signals on the "Q" and "not Q" output leads from flip flop 557*b* are transmitted to photosensitive array 410. These signals, corresponding to the TTLφ2 and the TTLφ1 signals, then operate as shown in FIG. 10D (TTLφ1 is just an inverted version of TTLφ2) to transfer the charge packets stored in the two shift registers associated with photosensitive array 410 from the photosensitive array to the processing circuitry shown in FIG. 4**. The operation of this processing circuitry will be described shortly.

During output states "0100" and "0101" TTLφXB remains inactive, (as does TTLφXA) and shift pulses TTLφ1 and TTLφ2 continue to be enabled.

During the "0110" output state (corresponding to the decimal "0006"), the output signal on the Y6 lead goes to zero thereby resetting counters **579*a* and 579*b* to all zeroes and resetting flip flop 577*b*. This last state of PROM 578 forces control flip flops 577*b* and 577*c* to the state such that the signals on the "Q" output leads from both of these flip flops are low level. This condition initiates, and is maintained throughout, the conversion mode of operation of the scanner. The conversion mode consists of two phases: controlled transfer of video charge from the photosensitive elements in photosensitive array 410** and the actual analog-to-digital conversion.

Note that during states "004, " "005," and "006" of PROM 578 the output signals TTLφ2 and TTLφ1 generated on the "Q" and the "not Q" output leads from flip flop **557*b* have been transmitted to the photosensitive array 410**. Thus these two output signals have been driven one and one-half cycles prior to the beginning of actual analog-to-digital conversion. This corresponds to the driving of the charge packets in the two shift registers associated with the photosensitive array through those extra stages of the shift registers necessary to bring the first charge packet in one of the shift registers to the output circuitry associated with the photosensitive array in preparation for conversion of this analog signal into a digital code word. A review of the above referenced data sheet for the CCD 110 shows the necessity for these pulses.

Upon resetting counters 579*b* and 579*a* to zero, the output signal on lead Y6 from PROM 578 returns to the high level. See FIG. 10N. This enables counters 579*b* and 579*a* to begin counting for the conversion process.

Throughout the actual analog-to-digital conversion, the high level output signal on the "not Q" output lead from flip flop 577*b* disables PROM 578. The output signal on the "not Q" output lead of flip flop 577*c* is at a high level throughout the conversion mode. Thus NAND gate 571*c* produces a low level output signal which, transmitted through inverter 576*b* enables NAND gate 551*c*. NAND gate 541*e* remains enabled thereby maintaining the clock control network circuit in the slow count mode.

Video strobe signal VSTB (FIG. 10O) has a 25% duty cycle in accordance with the recommendation of the manufacturer of the A-D converter and is generated once every two cycles of the output signal from OR gate 541*f* (See FIG. 10B). The conversion cycle continues until counters 579*a* and 579*b* reach full count (corresponding to 255 in decimal notation). When the count reaches 255, the carry out signal ($C_{OUT}$) from counter 579*a* (a high level signal) conditions the J input of flip flop 577*b* so that the next clock pulse sets flip flop 577*b* thereby changing the state of both 577*b* and flip flop 577*c* such that the "Q" output leads from these two flip flops have high level signals thereon and the "not Q" output leads from these flip flops have low level signals thereon. The transition of the states of the output signals on the "Q" and the "not Q" output leads from flip flop 577*c* disables NAND gate 541*e* and enables NAND gate 541*d*, thereby converting the clock control network circuit to the fast clock mode of operation. Simultaneously, counters 579*b* and 579*a* are disabled by a low level output signal from NAND gate 571*b*.

During the reading out of the charge packets stored in the two shift registers adjacent the 256 light sensing elements in photosensitive array 410, the light sensing elements continue to accumulate charge in response to radiation incident thereon. Prior to the next charge cycle, it is necessary to transfer the charge packets accumulated in these light sensitive elements to the adjacent shift registers and then flush these transferred charge packets from the photosensitive array 410. This is done using the fast clock sequence at the start of the charge mode. This charge mode is entered after the charge packet accumulated in the 256th element of the photosensitive array during the previous charge mode has been converted to a usable video signal. At the start of this mode, counters 579*a* and 579*a* are enabled by a high level output signal from NAND gate 571*a*. This high level output signal is generated in turn by switching the output signals on the "Q" and the "not Q" output leads of flip flop 577*b* from low and high respectively, to high and low in response to the 255 count $C_{OUT}$ signal from counter 579*a* signalling the end of the previous conversion mode.

The low level output signal on the "not Q" output lead from flip flop 577*b* enables PROM 578. Accordingly, PROM 578 is cycled through its six output states as described above in conjunction with the transfer sequence at the end of the charge cycle. However PROM 578 is cycled through these steps much more rapidly in response to the fast clock signal from OR gate 541*f* than at the beginning of the charge mode. The operation of the photosensitive array control circuit during this fast transfer sequence is as described above in conjunction with the slow transfer sequence. Accordingly this operation will not be described again.

In the 0006 state of counter 579*b*, the output signal on the Y6 lead from PROM 578 goes to a low level, thereby disabling and resetting counter 579*b*. Flip flop 577*b* is reset by this signal such that the output signals on its "Q" and "not Q" output leads go to low and high levels, respectively. The signals on the "Q" and "not Q" output leads from flip flop 577*c* remain at high and low levels, respectively. This enables NAND gate 571*a* and initiates the beginning of a controlled charge cycle within photosensitive array 410. CPU 600 is notified of this fact by the output signal from NAND gate 571*a* going to a low level and being transmitted to I/O port $B_0$ on PSU 518*a*. This signal is also transmitted to the static memory interface 710 shown in FIG. 7 and used as the interrupt signal to initiate charge cycle timekeeping. The duration of the charge cycle is controlled by the clock on CPU 600 (see FIGS. 1 and 10F).

During the conversion mode, reset signal TTLϕR is provided at the output of NAND gate 551*a*. Reset signal TTLϕR clears the charge packet from the output diode associated with CCD 110 in photosensitive array 410 after the amplitude of each charge packet has been determined by the readout circuitry associated with photosensitive array 410 (to be described in conjunction with FIG. 4).

A few general remarks on the operation of the photosensitive array control circuit 500 are appropriate. From the above description it is apparent that clock selection network circuit 540 serves to select the appropriate clock rate for utilization by the remainder of the circuitry of this invention. Because photosensitive array 410 is continually sensing ambient light conditions and accumulating charge in proportion to the ambient light conditions, it is necessary to "flush" the previously accumulated charge from photosensitive array 410 immediately before desired measurements are made by array 410. Clock selection network circuit 540 accomplishes this "flushing" by providing a high clock rate to photosensitive array 410 during the "flush" cycles when the data contained within photosensitive array 410 will not be utilized and by providing a slower clock rate when the analog signals from photosensitive array 410 are to be converted to digital form and stored.

Typically, the central processing unit 600 will be programmed not to perform any program operations for a predetermined length of time after start of operation, which time will allow the previously described steady state to be arrived at by the circuit depicted in FIG. 5. In one embodiment this period is 4.096 milliseconds.

Because the apparatus of this invention will not have been used for a period of time prior to utilizing it for any given measurement, central processing unit 600 is programmed to execute emptying (i.e., transfer and flush) of the charge accumulated within the elements of photosensitive array 410, immediately after the system reaches its steady state condition. This is performed because the charge in the individual elements of photosensitive array 410 may have accumulated over an undesirably long time if this system has not been used for a period of time.

Central processing unit 600 can issue control signals to photosensitive array 410 through port A of program storage unit 518*a*. For example, diagnostic testing can be performed during the initial operation of scanner 100 by programming central processing unit 600 to issue control signals to photosensitive array 410 through port A of program storage unit 518*a*. During diagnostic testing CPU 600 provides a clock signal of the necessary frequency at terminals A0 and A1 of PSU 518*a*. This signal is supplied to circuit 500 through signal inverter 546, NAND gates 541*a* and 541*b*, and NOR gate 541*c* one clock pulse at a time. By monitoring port B and sensing the signals received there, central processing unit 600 can detect improper functioning of selected system elements.

The low from NAND gate 571*a* during a charge cycle without conversion is applied to terminal $B_0$ of program storage unit 518*a*. The low condition of $B_0$ of PSU 518*a* is detected by central processing unit 600 which allows charging to continue for a predetermined time. CPU 600 has been suitably programmed to recognize this condition as indicating that the photosensitive array control circuit 500 (FIG. 5) is in a charge cycle. The term charge cycle is used herein to designate that phase of the operation of this invention wherein charge is accumulating within the individual light sensing elements of photosensitive array 410 for the purpose of being further processed in the operation of the system "Charge cycle" is to be contrasted with "conversion cycle" which designates the cycle when analog-to-digital converter 470 is operating. Central processing unit 600 counts charge integration time and has signaled the start of the conversion cycle by charging the level of the output signal on terminal A6 of program storage unit 518*a* thereby terminating the charge cycle. Of course light sensing elements in array 410 will continue to accumulate charge during the conversion cycle, but this charge will not be processed by the system.

By the time the previously described conversion cycle has been completed, another transfer from the photosensitive elements of array 410 will be necessary to discard the charge packets which accumulated in the elements during the conversion cycle. Utilizing exactly the same transfer sequence as previously described, this unwanted charge is output from photosensitive array 410, but not utilized by central processing unit 600. At the completion of this cycle two highs are supplied to NAND gate 571*a* thereby generating an enabling low which blocks counters 579*a* and 579*b*. This same signal is presented to the central processing unit 600 via terminal B0 of program storage unit 518*a*. Upon receipt of this information, central processing unit 600 begins timing the next charge cycle in photosensitive array 410.

In one typical operational cycle as controlled by the circuit shown in FIG. 5, photosensitive array 410 will flush for approximately six milliseconds, integrate charge for about two hundred microseconds, then transfer the charge to the operational amplifier circuit 450, following which time that data will be converted to digital form by analog to digital converter 470.

G. Photosensitive Array Circuit 400

FIG. 4 is a schematic diagram of the circuitry included within block 400 in FIG. 1. At the center of FIG. 4 is a photosensitive array 410. In general, photosensitive array 410 may, with appropriate external circuitry, be any device, such as a linear array of photodiodes, capable of sensing variations in ambient lighting. In the preferred embodiment depicted in FIG. 4, photosensitive array 410 is a charge coupled solid state linear image sensor having 256 elements, manufactured by Fairchild and denoted as the "CCD 110." The circuitry of this device appears in a preliminary data sheet entitled "CCD 110 255-Element Image Sensor" published by Fairchild and dated March 1974. This data sheet is incorporated by reference. The CCD 110 includes two charge transfer gates, two two-phase analog shift registers, an output charge detector/pre-amplifier, and a compensation output amplifier. An optical glass window protects the image sensing array while allowing it to sense ambient lighting conditions. Other devices, such as photodiode arrays, are also suitable for use in photosensitive array 410 and are readily available commercially. However the circuitry in FIG. 4 would have to be appropriately modified to be compatible with the particular device selected.

In operation photosensitive array 410 senses the intensity of the ambient lighting incident on each of the 256 elements of photosensitive array 410. Transfer signals TTLφXA and TTLφXB, from control circuit 500, applied to terminals φXA and φXB, cause the transfer of the accumulated electric charge in each of the 256 photosensitive elements to two 128 element shift registers on opposite sides of the photosensitive elements. One pulse of transfer signal φXA causes the transfer of the accumulated charge in every other one of the elements of photosensitive array 410 into corresponding elements of one shift register, and one pulse of transfer signal φXB causes the transfer of the accumulated charge from the remaining elements of photosensitive array 410 into the corresponding elements of the other shift register. The contents of these analog shift registers are then output from terminal OS one element at a time by application of appropriate analog shift register signals TTLφ1 and TTLφ2 (FIG. 15D) to terminals φ1A, φ1B, φ2A and φ2B of photosensitive array 410. Resistors 413*a* (1K), 413*b* (1K), 413*c* (4.7K), and 413*d* (4.7K) and capacitors 414*a* (0.47) and 414*b* (0.47) are biasing and clamping circuitries supplied at the recommendation of the manufacturer of photosensitive array 410. To remove noise generated in the output circuitry of photosensitive array 410 from the analog signal transmitted to converter 470, a compensation amplifier is provided as part of array 410. The output signal from this amplifier contains the same noise as the output signal from the output shift registers output on terminal OS to the extent this noise is generated in the gated charge detection preamplifier formed on the same semiconductor chip as the linear array of photosensitive elements. This noise compensation signal is output on terminal CS.

The output signal from the OS terminal of photosensitive array 410 is transmitted through blocking and level shifting capacitor 454*a* to the negative input terminal of operational amplifier 459. Simultaneously, the output signal from the compensation amplifier on photosensitive array 410 is transmitted on the CS output terminal through blocking and level shifting capacitor 454*b* to the positive input terminal to operational amplifier 459. This amplifier subtracts one signal from the other thereby to cancel the common mode noise contained in the two signals and transmits the resulting signal through blocking capacitor 454*g* to the AI input of analog to digital converter 470. The output signal is filtered and halfwave rectified by diode 455 in conjunction with capacitor 454*h* and resistor 453*g*. Thus the positive portions of the output signal from amplifier 459 (which acts as an inverting amplifier) are transmitted to the input to converter 470.

Because photosensitive array 410 is typically a charge coupled device it is necessary to shift the level of incoming signals to an appropriate level. This level shifting is accomplished by TTL/CCD interface circuit 430. The TTL/CCD interface circuit 430 is included within photosensitive array circuit 400 at the recommendation of the manufacturer of photosensitive array 410—Fairchild, in the embodiment described. Included within TTL/CCD interface circuit 430 are four NOR gates 431*a*, 431*b*, 431*c* and 431*d* (all of chip type 9607), and resistors 433*a* 433*b*, 433*c* and 433*d* (each 51). TTL/CCD interface circuit 430 serves as an interface between the transistor transistor logic of the photosensitive array control circuit 500 which generates the analog shift register signals TTLφ1 and TTLφ2, and the transfer signals TTLφXA and TTLφXB, all eventually used to control photosensitive array 410. The signal TTLφR is used during the conversion cycle to clear the previously sensed charge from the charge detection diode used in the gated charge detector preamplifier associated with the CCD 110 array. The signal TTLφR is generated as previously described and is shown in FIG. 10E.

Power supply control circuit 420 (FIG. 4) provides the appropriate voltage levels and pulsing (TTLφR) to the reset terminal (φR) (one pulse to remove each charge packet from the gated charge detector preamplifier after it generates a signal which has been transferred to converter 470) of photosensitive array 410. A positive 15-volt signal is applied through resistor 423*c* to the reset transistor drain terminal (RD) of photosensitive array 410 and directly to output transistor drain terminal (OD) of photosensitive array 410. Power supply and control circuit 420 includes a zener diode 425*a* (1N747, 3.6v) for protection against voltage surges, a supply transistor 422*a* (2N5321), a switching transistor 422*b* (2N3638A), and diode 425*b* (1N916). Resistors 423*a* (1.5K), 423*b* (1.8K), 423*c* (100), 423*d* (100), 423*e* (4.7K), 423*f* (1.2K) and capacitors 424*a* (1.7), 424*b* (0.1), and 424*c* (0.33) all function to smooth the power output of power supply control circuit 420.

Protection and clamping circuit 440, also included within photosensitive array circuit 400 pursuant to the recommendation of Fairchild, the manufacturer of photosensitive array 410, is also shown in FIG. 4. During the readout of the charge packets from photosensitive array, negative going signal TTLφR is applied to the base of transistor 422*b* thereby turning on this transistor. Normally, no current flows in the path containing diode 425*a* and resistor 423*a*. Accordingly, transistor 422*a* is biased off. A positive voltage surge on the plus 15 line causes diode 425*a* to break down and conduct. The voltage drop across resistor 423*a* turns on transistor 422 and the emitter current of transistor 422 is passed through resistor 423*f*. Capacitor 424*a* charges to an average voltage determined by the time constant of the regulated circuit. During normal operation, when transistor 422*a* is not conducting, the application of a negative TTLφR pulse to the base of transistor 422*b* turns on this transistor and results in emitter current passing through resistor 423*e*. This emitter current creates a negative potential on the non-grounded side of capacitor 424*a* and creates a current flow from ground to the emitter of transistor 422*b* through resistor 423*f*. Also a current flow through resistors 423*f* and 423*b* tends to bring the base of transistor 422*b* back to ground. The base of transistor 422*b* is normally grounded. The resulting current discharges the gated charge detector preamplifier through transistor 422*b*, resistor 423*e* and transistor 423*f* to ground. Diode 445*a* (IN916) clamps the voltage across capacitor 444*c* at about the forward breakdown voltage of pn junction. Diodes 445*b* through 445*e* (each IN916) prevent any substantially negative-going signal on the TTLφ1, TTLφ2, TTLφXA and TTLφXB leads. Diode 445*f* (IN916) prevents any substantially positive signal on the collector of transistor 422*b*. One input lead of OR gates 431*a*, 431*b*, 431*c* and 431*d* is connected to the leads carrying the signals TTLφ1, TTLφ2, TTLφXA and TTLφXB, respectively. The other two input leads of these OR gates are connected to a positive 5-volt potential through resistor 443*a*, as shown. These OR gates are connected to serve as voltage level shifters between TTL and CCD components.

Solid state regulator 449 (78M08) provides an eight volt supply to TTL/CCD interface circuit 430.

The output signals from photosensitive array 410 appear as sequential signals on terminals OS and CS, which are connected to operational amplifier circuit 450. Capacitors 454*a* and 454*b* together with resistors 453*a* (1K) and 453*f* (1K) conduct the output current on these two terminals to ground and, in doing so, convert these currents to voltages. The magnitude of the current on terminal OS at a given time is controlled by and related to the amplitude of the particular charge packet from the photosensitive array then in the gated charge detector preamplifier. (This charge packet is applied to the gate of, and thus controls the output current from, an MOS transistor.) The variable intensity output signals on the OS and CS terminals are level shifted by capacitors 454*a* (0.33) and 454*b* (0.33). A balanced signal is achieved by utilizing resistors 453*d* (1K), 453*e* (1K) and variable resistor 453*c* (500). The resulting signals are supplied to operational amplifier 459 (715 DC). Operational amplifier 459 is a conventional, monolithic, highspeed operational amplifier available commercially. The circuit to the right of operational amplifier 459 includes resistors 453*g* (330), 453*h* (10K) and 453*i* (510K), and capacitors 454*c* (47pf), 454*d* (6.8), 454*e* (270pf), 454*f* (470pf) and 454*g* (0.33) which provide frequency compensation for particular operational amplifier chosen as operational amplifier 459. This circuitry usually will be specified by the manufacturer of amplifier 459. Diode 455 (1N916), resistor 453*g* (330) and capacitor 454*h* (0.33) serve to eliminate negative excursions of the output signal from amplifier 459, resulting in only positive voltage excursions being supplied to analog to digital converter 470.

In one embodiment, the output signals from operational amplifier 459 are adjusted to be a series of analog pulse signals each having amplitude between zero and 10 volts. These analog signals, supplied to analog to digital converter 470 through lead AI are converted into a series of digital signals, each signal having eight binary bits. For example, an analog pulse of amplitude zero volts is translated by analog to digital converter 470 into an output of zero on each of the eight leads AD00 to AD07 from analog to digital converter 470. If an input signal of ten volts is supplied to lead AI, an output signal of one appears on each of the eight leads AD00 to AD07. Intermediate input voltages, of course, result in output digital signals representative of intermediate binary numbers from the analog to digital converter 470.

As each amplified analog pulse from operational amplifier circuitry 450 is supplied to terminal AI of analog to digital converter 470, the video strobe signal VSTB (FIG. 100) is supplied to terminal SC of analog to digital converter 470. As explained above in conjunction with the description of FIG. 5, video strobe signal VSTB is typically equal to twenty-five percent (25%) of the shift period of a single photosensitive element within photosensitive array 410. As video strobe signal VSTB goes low, analog to digital converter 470 is caused to be reset and prepared for the next incoming analog pulse at terminal AI. VSTB (FIG. 100) has a 16 microsecond period and a twenty-five percent (25%) duty cycle. Thus 4.096 milliseconds is required to read out and convert to digital form the 256 charge packets accumulated in the light sensing elements of photosensitive array 410. Four microseconds after it goes low, the video strobe signal VSTB will return light, with the leading edge of signal VSTB timed to coincide, by circuit 500, with the maximum amplitude of the analog signal supplied to terminal AI of analog to digital converter 470. System timing signal XTLY is applied to terminal C. Analog to digital converter 470 then proceeds to convert the analog input signal appearing at terminal AI into an eight bit digital signal to be output through terminals AD00 through AD07. At the completion of each conversion, analog to digital converter 470 generates a negative signal CONVERT* which is supplied via terminal "not EOC" to the circuit depicted in FIG. 8, and functions to switch the circuit depicted in FIG. 8 into a condition to receive the data present at output terminals AD00 to AD07 of analog to digital converter 470.

H. Buffer Memory 800

Figure 8:
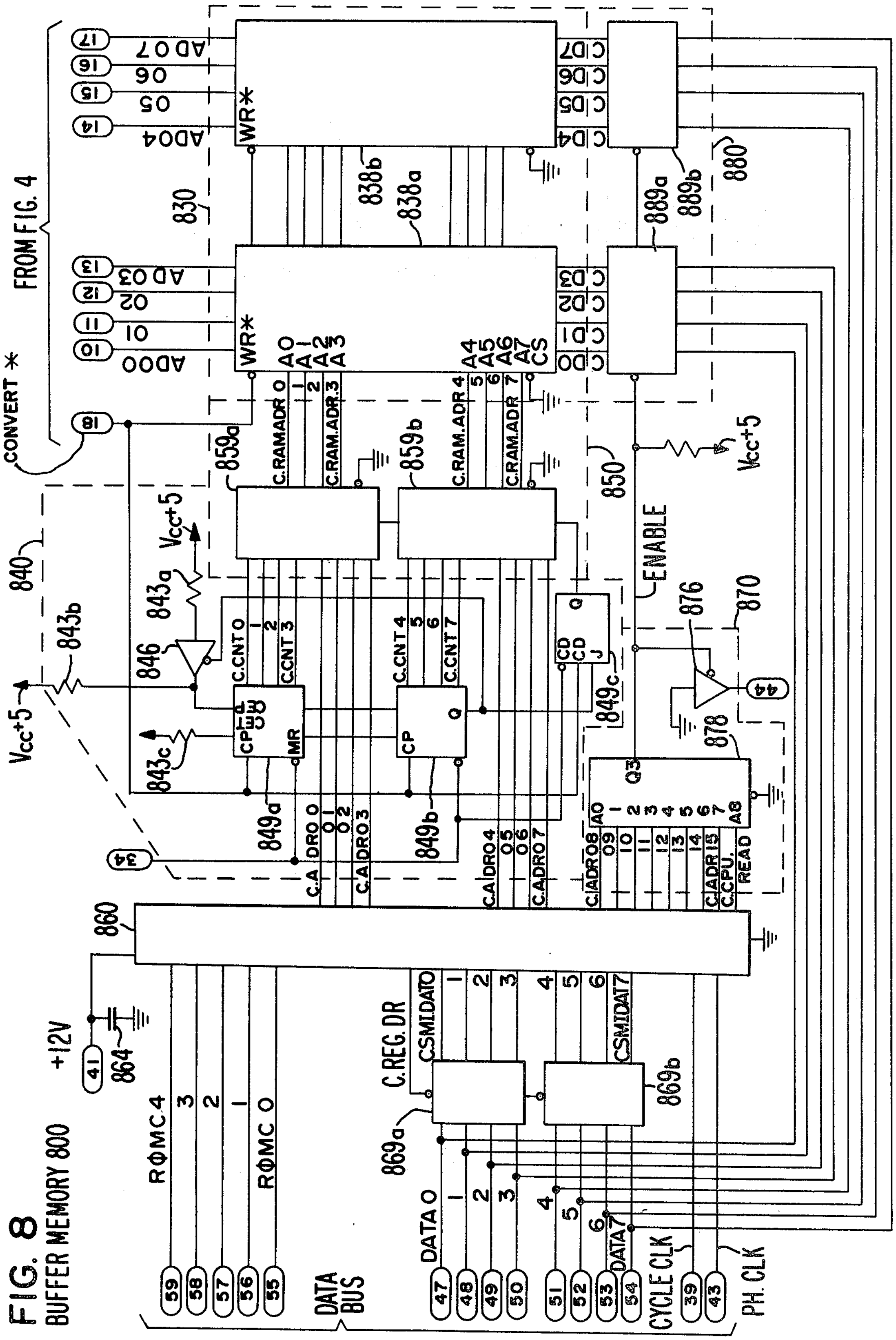
FIG. 8 is a schematic diagram of buffer memory 800 of FIG. 1.

The buffer memory 800 depicted in FIG. 1 is shown in additional detail in FIG. 8, Buffer memory 800 includes random access memory 830 (two 256×4 Fairchild MOS Random Access Memories type 3538), counting circuit 840, multiplexing circuit 850, static memory interface (or SMI) 860 (Fairchild 3853), decoder circuit 870, and buffer circuit 880.

Random access memory 830 provides temporary storage of the output from analog to digital converter 470. After each of the 256 analog signals originating in photosensitive array 410 has been converted to an eight bit digital word, the 256 eight bit words are stored in random access memory 830 which comprises 256 bytes. The addresses for storage of each eight bit byte from analog to digital converter 470 are generated by counting circuit 840 in response to the signals on "CONVERT*" from A/D converter 470. Multiplexing circuit 850 provides an interface between SMI 860 and memory 830 and between counting circuit 840 and memory 830.

As each eight bit code word appears at the output of analog to digital converter 470, the data will be accepted and stored in the random access memory 830. When the CONVERT* signal applied to terminals WR* of random access memory 838*a* and 838*b* (each is a 256×4 Fairchild 3538 and the data sheet of this part is hereby incorporated herein by reference) goes low, it enables storage of the data supplied on lines AD00 through AD07 input to random access memory 830. When the CONVERT* signal returns to a high level it causes counters 849*a* (93L16) and 849*b* (93L16) to be incremented to the next address. Counters 849*a* and 849*b* thereby function with multiplexers 859*a* (93L22) and 859*b* (93L22) to generate a series of addresses for the storage of data supplied to random access memory 830 from analog to digital converter 470. After the storage of all 256 eight bit digital signals from analog to digital converter 470, a high output will be presented at terminal Q of counter 849*b* causing flip flop 849*c* (74LS109) to go into the set state with terminal Q high on the next clock pulse from converter 470. This signal conditions multiplexers 859*a* and 859*b* to their other condition, that is, with the input connections from counting circuit 840 disabled and the address input connections from CPU 600 via SMI 860 enabled. The address inputs are designated in FIG. 8 as lines C.ADR00 through C.ADR07. No further counting by counters 849*a* and 849*b* will occur until they are enabled by a signal from gate 846 (340097), which is also connected to resistors 843*a* (10K) and 843*b* (2.2k). A low signal on lead C.TERM.CNT allows continued counting by counters 849, while a high signal disables gate 846 to terminate counting.

After the 256 eight bit digital signals have been stored in random access memory 830, the photosensitive array control circuit 500 returns to the charge condition as described above, and central processing unit 600 will begin timing the new charge cycle of photosensitive array 410.

Central processing unit 600 can access the random access memory 830 to read out the data stored therein. This is accomplished in the following manner. The programming of central processing unit 600 will develop an address internally. This procedure is explained in the Fairchild Semiconductor F8 Circuit Data Book which is incorporated herein by reference. This address will be supplied to the buffer memory 800 through the lines designated ROMCO through ROMC4 and DATA0 through DATA7. These signals are supplied to static memory interface 860 (Fairchild 3853). Enabling buffers 869*a* (Fairchild 340097) and 869*b* (Fairchild 340097) are utilized to filter out those signals on DATA lines intended for static memory interface 710 rather than 860. The high order eight bits of the signals appearing on lines C.ADR08 through C.ADR15 are supplied to a programmed read only memory 878 (93436, 93446). Programmed read only memory 878 is encoded to assert terminal Q3 low when specified addresses (for example, hexadecimal addresses 5000 to 50FF) are supplied to programmed read only memory 878. The memory map of memory 878 is shown in FIG. 12. The low at output terminal Q3 of programmed read only memory 878 is referred to as signal C.GATE BUFF* and enables buffers 889*a* (340097) and 889*b* (340097). The enabling of buffers 889*a* and 889*b* allows the data within random access memory 830 to be placed on the data bus lines designated DATA0 through DATA7. At the same time data bus control signal DBDR* is asserted as a low by gate 876 (340097).

I. Memory 700

Figure 7:
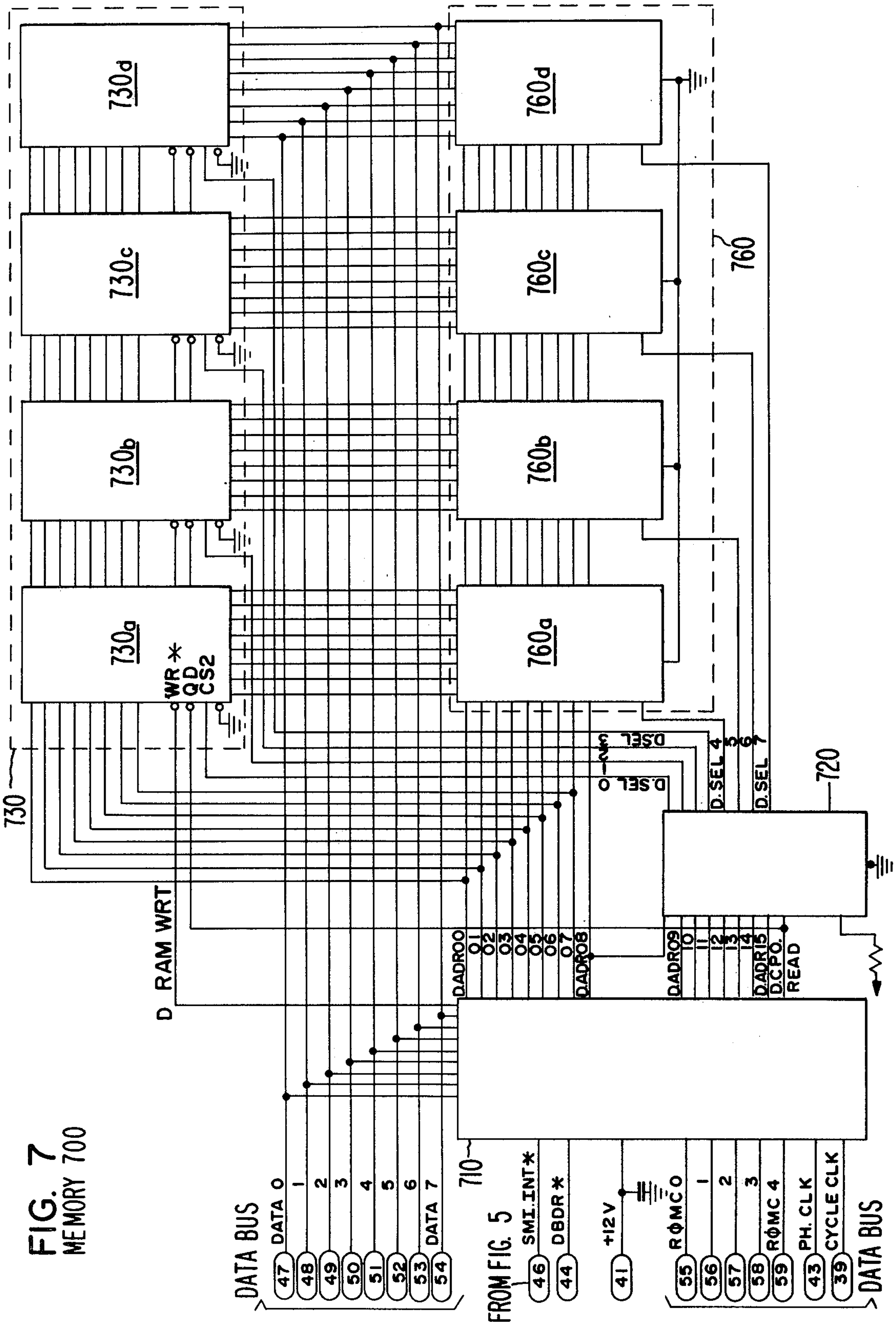
FIG. 7 is a schematic diagram of memory 700 of FIG. 1.

The circuitry of memory 700 depicted in FIG. 1 is shown in additional detail in FIG. 7. Memory 700 includes a static memory interface 710 (Fairchild 3853), a programmed read only memory 760 (four 512×8 Fairchild 93438/48 or alternatively four 1024×8 type 2708 electrically programmable ROMS), a random access memory 730 (four 256×8 Fairchild 3539), and a chip select decoder 720 (512×8 Fairchild 93448 PROM). The memory map of chip select decoder 720 is shown in FIG. 13. Additional memory can be added if required.

Programmed read only memory 760 contains instructions for central processing unit 600 and at least one table providing a conversion between the information generated by photosensitive array 410 and dimensional information. For example, if log diameters are being measured by the system, programmed read only memory 760 will contain a table relating the diameters of various size cylinders to the projected cords of those cylinders. Thus, for example, if n photosensitive elements of photosensitive array 410 have a pre-defined change in their digital value, programmed read only memory 760 will relate this change of n elements to a particular log diameter. If a single embodiment of this invention is installed a fixed distance from a region of space through which objects being measured will pass, a calibration must be performed to relate the projected image of these objects to their actual dimensions.

Random access memory 730 provides, in one embodiment, the necessary temporary storage for intermediate calculations by central processing unit 600, a set of 256 eight bit words representing dark current and a set of 256 eight bit binary code words indicative of the appearance of the region of space (without an object present) focused upon the photosensitive array 410. This reading will be generated and stored by scanner 100 during its initial few seconds of operation and at selected intervals thereafter. Depending upon the particular use to which scanner 100 is to be devoted, it may be necessary to not have an object in the view of the scanner 100 when it begins operation. Thus, in one embodiment, central processing unit 600 is programmed to utilize the field of view of the scanner 100 during the initial few moments of operation as a background reading for comparison with other readings to establish the dimensions of objects. Further, in operation, the central processing unit 600 may be programmed with a suitable algorithm to detect the edge of a solid object moving across its field of view. For example a significant change in k contiguous eight bit code words when compared to the corresponding code words from the stored background information will indicate the edge of an object, where k is a selected integer, such as 4 or 5. If the invention is so programmed, repeated background readings can be taken with any desired frequency between measurements of various objects. In other embodiments of this invention, for example, in the grading of lumber to insure a given lot contains only pieces of certain minimum dimensions it may be desirable to have an object in the field of view of the array 410 when the background signals are being generated and stored. In this fashion the dimensions of subsequently measured objects will appear as differentials from the initial object.

The dark current correction may be computed by central processing unit 600 and stored as a group of digital signals (eight bit binary code words) in random access memory 730 at any selected time. Updated data may be obtained with any desired frequency. This is accomplished by programming central processing unit 600 to perform the steps of the dark current correction at any desired interval. In one embodiment the correction is performed whenever scanner 100 is in a charge cycle. In another embodiment the correction is performed at selected intervals when scanner 100 is not measuring an object, that is, between edge detection sequences.

According to the first method central processing unit sets terminal $A_7$ of PSU 518*a* to logical one thereby blocking subsequent transfer of the accumulated charge packets from the photosensitive elements of array 410 to their corresponding shift registers. Central processing unit 600 then waits a suitable time for any existing charge accumulated in the analog shift registers to be "flushed," for example 128 microseconds in one embodiment. The period or interval over which charge will be allowed to accumulate within the photosensitive elements of array 410 is then computed and this period begun. At the start of this period terminal $A_3$ of PSU 518*a* is asserted low to thereby inhibit signals TTL$\phi$1 and TTL$\phi$2.

As soon as the selected interval elapses terminal $A_6$ of PSU 518*a* is asserted to place scanner 100 in a conversion cycle. Simultaneously signals TTL$\phi$1 and TTL$\phi$2 are enabled by resetting terminal $A_3$ of PSU 518*a* to a logical zero. The data from array 410 is then processed and stored and represents a measure of the integral of the dark current in the shift registers during the charge integration period.

Software utilized in conjunction with central processing unit 600 may be utilized to make initial calculations relating to the adequacy of the ambient light striking the photosensitive array 410. This is accomplished by selecting an integration time within which charge may accumulate within a photosensitive array 410 and then converting the resulting analog signal to digital form and storing it, thereby to provide a measure of suitable integration time within which to allow light to cause charge to accumulate in the photosensitive array 410. For example, the initial integration time may be determined to be that time which results in an average five volt signal from analog to digital converter 470 for each of the photosensitive elements of photosensitive array 410. The resulting time interval expressed as a number of clock pulses is stored in random access memory 730. Typically, this integration time period will vary linearly with the amount of ambient light. Thus the total charge which accumulates in photosensitive array 410 will be proportional to the integration time selected by central processing unit 600 and the ambient lighting conditions present in the vicinity of photosensitive array 410. The set of 256 eight bit binary code words representing the charge packet accumulated in each light sensitive element of photosensitive array 410 will then be stored in memories 838*a* and 838*b* of buffer memory 800 in a manner as described above. CPU then transfers these eight bit code words to a selected one of static RAMS 730. The CPU then compares these code words to a previously defined set of code words to determine whether the charge accumulated over the selected integration time is greater than or less than desired, on the average. If the charge accumulated exceeds the desired charge by a given amount, this indicates that the ambient lighting is more intense than anticipated and the integration time is reduced until the accumulated charge packet in each light sensing element, on the average, comes to within the desired charge by a specified amount. On the other hand, if the average accumulated charge packet in each light sensing element is less than the desired average, the integration time is increased a selected amount until the average charge accumulated in each light sensing element is sufficiently close to the desired average value.

As a feature of this invention, the reference amplitude to which the accumulated charge packets in each light sensitive element of photosensitive array 410 is compared, can be varied over a selected range to add a greater degree of flexibility to the operation of the system. Thus if the ambient lighting is very weak and the maximum integration time of the scanner is not sufficient to bring the average amplitude of the charge packet accumulated in each light sensitive element of photosensitive array 410 to the reference amplitude, the reference amplitude can be lowered to a value which will bring the average value of the charge packet in each light sensing element to the reference value provided the ambient light is above a certain minimum value. Conversely, if the ambient light is greater than expected, and even the shortest integration time produces charge packets in the light sensitive elements of photosensitive array 410 which exceed the reference amplitude, the reference amplitude can be increased. The system produces output signals which indicate that the ambient light is too weak to allow the system to operate even with a lowered reference amplitude or too bright to allow the system to operate even with a raised reference amplitude.

As each object, for example, a log, passes out of the field of view of photosensitive array 410 the changing light pattern caused by the disappearance of its "trailing" edge is detected by an algorithm programmed into programmed read only memory 760 and utilized by central processing unit 600. Central processing unit 600 then regenerates the information utilized to select the integration time and stores this new integration time in random access memory 730. As soon as this information is stored, the central processing unit 600 is switched into an edge detection sequence and awaits the appearance of additional objects in the field of view of photosensitive array 410. By keying the programming of central processing unit 600 to the speed of the objects moving in front of photosensitive array 410, a sufficient amount of time may be allowed after detection of an edge of an object to allow photosensitive array 410 to sense the full dimensions of the object. For example, measurements of the diameter of a log may be made a selected period of time after detection of the edge to allow for the jagged edges of the cut ends of the log to pass before the photosensitive array 410. The relationship between changes in the output of the various photosensitive elements of photosensitive array 410 and the diameter or other selected dimension of the object being measured will be stored in programmed read only memory 760.

In a system similar to that previously discussed in conjunction with random access memory 830, the higher order address bits D.ADR09 through D.ADR15 are utilized by chip select decoder 720 to enable the appropriate portions of random access memory 730 or programmed read only memory 760 to read or write data supplied on lines DATA0 through DATA7. The signals from chip select decoder 720 are supplied to programmed read only memory 760 and random access memory 730 by lines designated D.SEL0 through D.SEL7. In other conditions, central processing unit 600 may write data into random access memory 730 by applying an enabling pulse to line D.RAM.WRT* which is supplied to terminal WR* of random access memory 730. The static memory interface 710 accepts as input signals the ROMC control signals from the data bus. In response to particular ROMC signals static memory interface 710 will accept data from data lines DATA0 through DATA7. As static memory interface 710 accepts data from the data bus, this data is translated into address signals to be output on the leads designated D.ADR of static memory interface 710.

Whenever either random access memory 730 or programmed read only memory 760 is properly addressed and the data from either memory 760 is properly addressed and the data from either memory is ready to be placed on the data bus, static memory interface 710 triggers signal DBDR* to inform the central processing unit 600 that the data is ready for transmission. The data is then placed on the data bus for utilization by the remainder of the system.

J. Display Circuit 900

Figure 9:
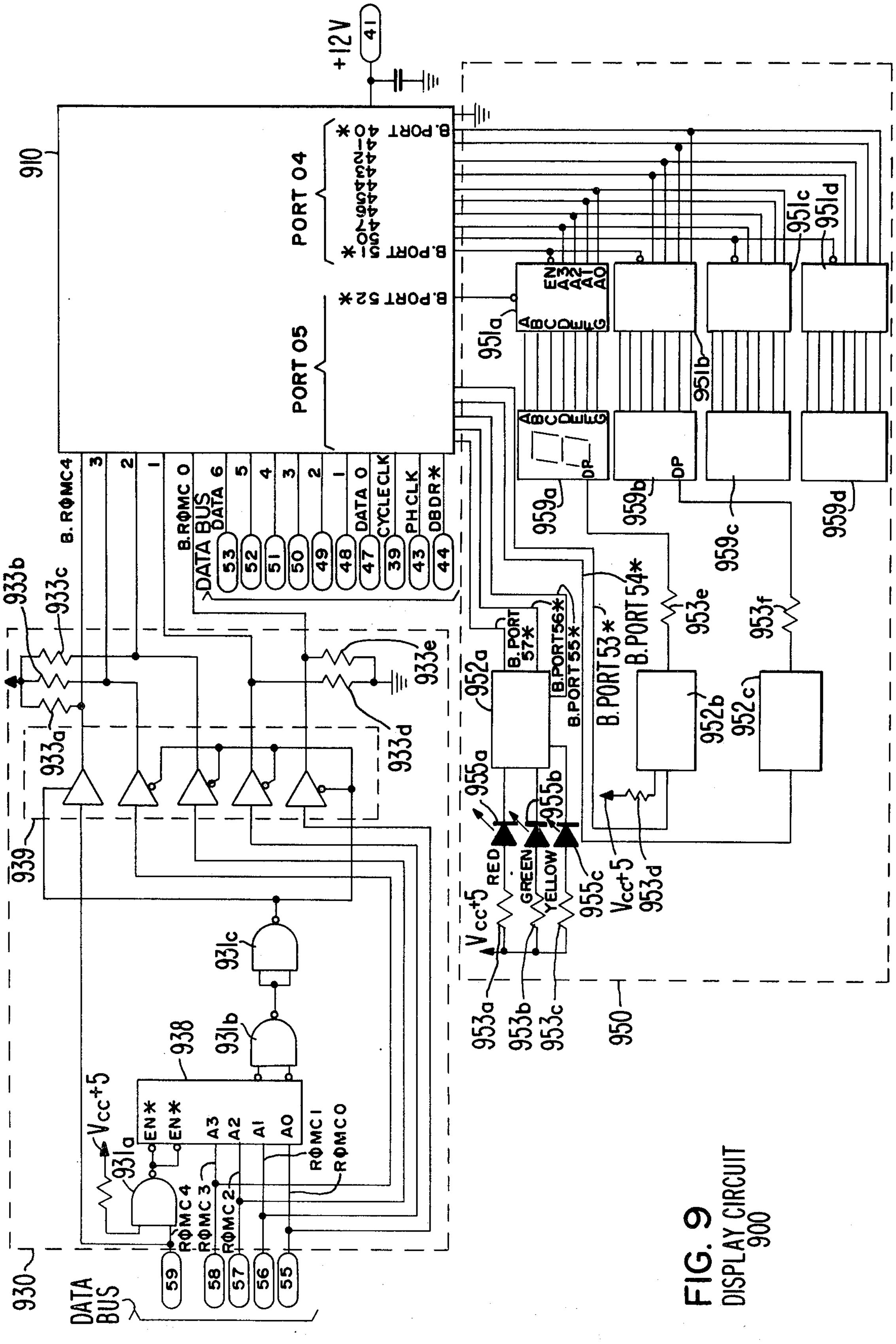
FIG. 9 is a schematic diagram of display circuit 900 of FIG. 1.

Display circuit 900 is shown in FIG. 9. Display circuit 900 includes a program storage unit 910 (Fairchild 3851), which is utilized solely as an output device. Because of this limited utilization of its capabilities, disabling circuit 930 prevents certain signals on lines ROMC0 through ROMC4 from being input to program storage unit 910. Disabling circuit 930 includes NAND gates **931*a*; 931*b* and 931*c* (each 74L00), 938 (93L11), 939 (340097) and resistors 933*a* through 933*e*** (each 10K).

Light emitting diode display circuit 950 includes 7-segment displays **959*a* through 959*d* (each FND507), light emitting diodes 955*a*** (FLV110), 955*b* (FLV360) and 955*c* (FLV410), 7-segment display decoder/driver/latches 951*a* through 951*d* (each 9370), drives **952*a* through 952*c* (each 8T28) and resistors 953*a* (120), 953*b*** (120) 953*c* (120), **953*d* (10K), 953*e* (91), and 953*f* (91). Each of the 7-segment displays 959 is directly driven by a corresponding decoder 951 which has a built-in current limitation. Similarly, each light emitting diode 955 is directly driven by a driver 952 and has an associated current limiting resistor 953*a*, 953*b*, 953*c*.**

After the central processing unit 600 processes data, it sends an output code on ROMC0 through ROMC4 to program storage unit 910. Data is then supplied to program storage unit 910 on lines DATA0 through DATA6. Program storage unit 910 accepts the data and drives a series of 7-segment displays **959*a* through 959*d* through port 04. At the same time, signals placed on lines B.PORT53 and B.PORT54 connected to port 05 control the location of the decimal point, if any. Drivers 952*b* and 952*c* are utilized to drive the appropriate decimal point terminal DP in the presentation of information on the 7-segment displays 959*a* and 959*b*. In one embodiment programmed to display log diameters in meters the decimal point is placed after the first digit whereas if inches are used the decimal point may be placed after two digits. Light emitting diodes 955*a*, 955*b*, and 955*c*, are status lights which are driven by driver 952*a*. Illumination of light emitting diode 955*a* informs the user of the system that the system is attempting to adjust itself to ambient lighting conditions and cannot be used at this time. Illumination of light emitting diode 955*b* indicates that the system may be operated, while illumination of light emitting diode 955*c*** indicates marginal ambient lighting conditions, and therefore possibly inaccurate dimensional measurements.

In the above-described system, the word "light" is used to mean any radiation capable of causing charge to accumulate in a photosensitive element in array 410.

The set of digital code words representing the background (either with or without an object present, as desired) is generated in response to either a manually actuated recalibration button which generates a signal received by an input port of CPU 600, or to a variety of other possible inputs to CPU 600, including periodic recalibration signal (or signals) from marker sensors ***271a*, *271b* and *272a*, *272b*, is (are) input to CPU 600 to indicate either the presence or absence of an object in the field of view of scanner 100' (or scanner 100). Similarly the CPU 600** can be programmed to periodically measure the average or representative amplitude of detected charge to determine if the integration time needs to be adjusted in response to changing light conditions. Appropriate adjustment of integration time is then made in accordance with the results of a comparison of the amplitude of the detected charge to a reference amplitude.

The data sheets for semiconductor components used in this invention are hereby incorporated into this specification by reference to the extent they have not heretofore been so incorporated.

APPENDIX A

SUMMARY OF OPERATION OF MICROPROCESSOR PORTION OF SCANNER 100

Scanner 100 (sometimes herein called a "Smart Scanner") converts buffers of video data into log diameters and edge counts, which it then displays locally and may send back via a compatibility board to a system for automatically processing a log.

During calibration the buffer (256 bytes) contains the actual voltage levels (ranging from $\phi$–127) which each of the 256 diodes in photosensitive array 410 "sees". At the end of calibration, this background is "memorized". Then, during diameter scans, the buffer contains signed differences from the background (which may range from $-127$ to $+127$). These differences are processed and the number of diodes (often called "light sensitive elements") which "see" the log is noted; also noted is the first diode which sees the log. These numbers are converted into a diameter and edge count respectively This is done via a table which had been generated offline and is based on the placement of the scanner relative to the family of logs it expects to see.

The Smart Scanner Monitor (i.e., control circuit 500) contains the logic to run the CCD array which "sees" the logs, as well as the logic to process the data. The CCD must alternate between charge cycles in which the voltages build up in the diodes, and conversion cycles in which the voltages are shifted out and run through an A/D converter to be placed in the buffer memory. The conversion cycle length is fixed, but the charge cycle length may vary. The optimum length for the charge cycle is determined either manually by setting switches or under program control during calibration. All diameter scans then last for this amount of time. While one charge cycle is taking place, the previously read-out signals from array circuit 400 are being processed. The buffer is interlocked by setting a bit which inhibits A/D conversion during the conversion cycle. This allows charge times as small as 256 s to be reached; however, since processing takes about 20 ms, many conversion cycles will be thrown away when running at these times. At the other extreme, with a charge cycle of 128 ms, the processing will be completed long before a new buffer is ready.

A gross flow chart of the Smart Scanner logic is shown in FIG. A-1. This flow chart is self-explanatory.

In order to understand the logic of Scanner 100 one must first understand what resources are available to it. These resources include PROM for program and data storage, RAM (both external and CPU scratchpad) for dynamic data storage, and input/output ports for transferring data to and from the external world. The choices made in allocating these resources greatly affect the overall operation and efficiency of the Smart Scanner program. For this reason these resources are now described in detail.

4K of programmable read only memory 760 are available to Scanner 100. These residue at addresses H'0000'-H'07FF' and H'4000'-H47FF', where the "H" means the following number is in hexadecimal. Each physical prom contains (½)K or $200_{16}$ bytes. An attempt has been made to keep each physical prom fairly independent from the others.

The following breakdown was done:

| | |
|---|---|
| Prom 0 (0000-01FF) | Self-Test Diagnostics |
| Prom 1 (0200-03FF) | Self-Test Diagnostics<br>Calibration Set-Up<br>RDISP } General purpose<br>DELAY } subroutines |
| Prom 2 (0400-05FF) | Recalibration Set-Up<br>Timer Routines (0500)<br>External Interrupt Routines (0580)<br>Subroutines used by calibration, diameter scans, and timers. |
| Prom 3 (0600-07FF) | Calibration Routine<br>Log Scan Routine<br>Subroutines used by diameter scans. |
| Prom 4 (4000-41FF) | Diameter Table |
| Prom 5 (4200-43FF) | Old scanner Conversion Table (CONVTAB) (4200-42FF)<br>Other tables (4300-43FF) |
| Prom 6 (4400-45FF) | PROCL Subroutine<br>SAVBG & SAVCUR routines |
| Prom 7 (4600-46FF) | Unused |

1K of RAM is available at addresses H'0800'-H-'OBFF'. This is not used during normal operation. It is used in debug mode to store backgrounds or log images. (See SAVBG and SAVCUR routines.) FAIRBUG uses locations H'OBEO'-H'OBFF' to store status.

An additional 1K of RAM is available, but presently unused at addresses H'4800'-H'4BFF'.

SCRATCHPAD REGISTERS IN THE F8 CPU 600

The first 9 scratchpad registers are directly addressable. The next 7 are used by the F8 for special purposes. The remaining 48 are organized into banks of 8 each, and must be addressed through the ISAR.

| | | |
|---|---|---|
| R0 | = | Scratch |
| R1 | = | Count of 4ms chunks for integration time during log scans. |
| R2 | = | Timer constant for fraction of 4 ms to be added to 4*(R1) for total |

-continued

| | | |
|---|---|---|
| | | integration time. |
| R3 | = | Copy of R1 which is counted down by the timer. |
| R4,R5,R6,R7 | = | Scratch<br>During log scan wait-loop, they contain<br>R4 — Current diameter in old scanner counts.<br>R5 — Averaged diameter in Smart Scanner counts<br>R6 — Current edge count in old scanner counts.<br>R7 — Current diameter in Smart Scanner counts. |
| R8 | = | (During log scans) Previously displayed diameter in Smart Scanner counts. |
| R9 = J | = | Used to store status word during interrupt processing. |
| R10 = HU | = | Unused |
| R11 = HL | = | Used to store accumulator during interrupt processing. |
| R12<br>= K<br>R13 | = | Used to store subroutine return addresses. |
| R14<br>= Q<br>R15 | = | Scratch. Used to construct a memory address (to be placed in DCφ) for table lookups. |

All the following registers are addressed indirectly. They are customarily numbered in octal, with the bank number as the high order octal digit.

| | | |
|---|---|---|
| LEDBNK = Bank 2 | | |
| CONTL = 20 | = | Control byte for displays (in format of I/O Port 8) |
| HIORL = 21 | = | High order display digits |
| LOORL = 22 | = | Low order display digits |
| DIAPTR = 23 | = | Pointer to next slot in diameter ring buffer. |
| GOODA = 24 | = | Requested voltage level in values of 0-31. |
| DIMA = 25 | = | (GOODA)/2 |
| 26<br>27 | = | Unused |
| PROCLB = Bank 3 | | (Values set or used by PROCL subroutine) |
| FRED = 30 | = | Front edge. Number (0-255) of the diode which defines the front edge of a log shape. This is the value estimated during the PROCL prescan. |
| TED = 31 | = | Trailing edge. Number (0-255) of the diode which defines the trailing edge of a log shape. This is the value estimated during the PROCL prescan. |
| PROCT = 32 | = | Estimated count of diodes in the log (calculated by PROCL prescan, decremented by actual scans). |
| FFRED = 33 | = | Final value for front edge. |
| FTED = 34 | = | Final value for trailing edge. |
| SDIF = 35 | = | Significant difference (threshold voltage) needed to define a log edge. |
| SJMP = 36 | = | Voltage difference between adjacent diodes required to identify a sharp edge on a log. |
| 37 | = | Unused |
| DIABNK = Bank 4<br>This bank is used as a ring buffer which stores the previous eight diameters (in diode counts). DIAPTR is used as an input pointer to the buffer. | | |
| STABNK = Bank 5 | | |
| SWWRD = 50 | = | Switch word. The bits in this word control various debugging routines. It is set to zero during normal operation.<br>SLBGDB = 1 — Causes background readings to be saved.<br>SLRDB = 1 — Causes log scans to be saved. |
| SPORT1 = 51 | = | Saved value of I/O Port 01. |
| SPORT4 = 52 | = | Saved value of I/O Port 04. |
| SHIOR = 53 | = | Saved value of high-order hex switches. |
| SLOOR = 54 | = | Saved value of low-order hex switches. |
| SAVBG = 55 | = | Saved average voltage level in the background. This equals GOODA if the system |

-continued

| | | |
|---|---|---|
| | | is in voltage-level-seek mode. |
| 56 | | |
| | = | Unused |
| 57 | | |
| Banks 6 and 7 Unused | | |

I/O PORTS

All input and output to the scanner 100 is done via 8-bit I/O ports, (with the exception of the data which goes directly into the buffer memory). These portions can be used to transmit data, such as diameters to be displayed in the LEDs, or control information, such as that which is needed to coordinate the video boards of the scanner. Some of the ports are used to control programmable timers and external interrupts. The exact function of each port is described in FIGS. A-2 through A-9.

Port 00 on CPU 600 is illustrated schematically in FIG. A-2. This port can be used as an output port to ship data to the buffer memory. Data must be in one's complement form. In operation, the buffer is filled by first pulsing bit $\phi$, port 1, and then disabling A/D conversion (setting bit 1, port 1). Then each byte is sent by placing it in port $\phi$ and pulsing bit 2, port 1. Port 01 is shown in FIG. A-3.

INTERRUPT DRIVER ROUTINES

The Smart Scanner monitor recognizes two types of interrupts, those from the programmable timer and those from the video board indicating the end of a conversion cycle. Both types of interrupts are handled by I/O ports OC, OD, OE and OF. (See I/O PORTS writeup.) Ports OC and OD contain the interrupt vector for both types of interrupts; however, bit 7 of the low order byte of the address changes depending on the type of interrupt. This necessitates a careful placement of the interrupt service routines. At various points in the monitor an external interrupt (from the video board) requires different servicing; this is handled by changing the interrupt vector. Although both types of interrupts cannot be enabled simultaneously, in order to allow an easy transition from external to timer routines, each external interrupt routine has a corresponding timer routine.

To avoid space problems, all the vectors point to locations which contain a jump to the actual routine. Note however that the accumulator must be stored before doing the jump. Each interrupt routine also stores the status word. (Registers HL and J are used to hold the accumulator and status words.)

TIMER INTERRUPT ROUTINES

The programmable timer is used to time the charge cycle. Port OF contains a "timer constant" which allows a range of from 15.5 $\mu$s to 3.953 ms. These timer constants must be determined by a table lookup; there is not a linear relation between the value of the constant and the length of the interval. (See Appendix C of "A Guide to Programming the Fairchild F-8 Microcomputer".) When timer interrupts are first enabled, (port OE), the timer counts down and generates an interrupt after the amount of time indicated by the timer constant. If timer interrupts remain enabled it continues to count down for full cycles (3.953 ms) and generate an interrupt at the end of each full cycle. Thus, a time interval, T, must be calculated by the following formula:

$$T=(3.953)x+y$$

where $y<3.953$. Port OF must be set with the timer constant (y') which generates an interval of length y before timer interrupts are enabled. $x+1$ interrupts will be received before the interval T has elapsed. The Smart Scanner actually uses the formula:

$$T=4x+y$$

where y is limited to multiples of 256 $\mu$s in order to limit the size of the timer constant table.

EXTERNAL INTERRUPT ROUTINES

An external interrupt occurs at the beginning of each conversion cycle. At this point a new buffer load of data has been collected and, unless the buffer is interlocked, stored in buffer memory (H'5000'-H50FF'). There are various external interrupt service routines which each do something different with the data. However, the basic logic for all of them is shown in FIG. A-10.

Note that while the timer service routines always exit immediately, the external service routines only do so if the buffer is interlocked. Thus whenever a buffer load is processed, status is lost and the code which was executing previously is not re-entered. This does not cause a problem since the buffer is always interlocked unless the program is in a waitloop.

The two external interrupt routines are:

CALIBRATION (Background scans)

LOG READ (Diameter scans)

In order to cause a transition from one routine to the next, some of the routines actually change the interrupt vector before they enable interrupts and process the data.

Following precalibration, interrupts are enabled, but the first few buffer loads are thrown away in order to flush out any excess charge which might have built up. Then, depending on the calibration mode select switch, either one background scan is made at the selected charge time, or a series of scans are started in order to determine an optimum charge time.

In the latter case, the first try will be made at the previously selected charge time if this is a recalibration. If a full seek is needed then a binary search is begun. Scans are taken at a selected charge time, and then the average background light level is compared with the selected light level. If the selected light level is reached, the search ends, otherwise the charge time is adjusted. If at the end of the search the light level is not reached, yellow and red light error checking is done. Unless an error has occurred, diameter scans are enabled. R$\phi$ is used to control the binary search logic (as to how much to add or subtract from the charge time), and R5 is used to determine which phase of calibration is in progress. A detailed flow chart is shown in FIGS. A-12*a*, A-12*b* and A-12*c*.

DIAMETER SCANS

The major control loop of the scanner deals with recognizing log shapes, determining diameters, and displaying diameters. Various switches are used to alter the modes in which these events take place. The diameter scan routine sets up timers and buffer interlocks in the same manner as calibration. It then processes a buffer which contains signed differences from the background to determine a log shape, and hence a diameter. This diameter is stored in the diameter bank, sent out to the compatibility board, and may then be displayed. At the end of each diameter scan the main wait loop is entered. The wait loop first stores status (for debugging purposes) and releases the buffer. It then repeatedly checks to see if a recalibration should be done, and either goes off to recalibrate or is interrupted to begin a new diameter scan. FIGS. A-13*a* and A-13*b* show the diameter scan flow chart.

SUBROUTINES

The Smart Scanner does not have either a hardware or software stack, so it is limited to two levels of subroutines. The first level saves its return address in the K-registers, while the second level utilizes PCl. When an interrupt occurs, PCl is used to store the current PCϕ, and thus only one level of subroutine is available when interrupts are enabled. For this reason all the subroutines described below are first level routines, and none of them call any other routines.

---

AVBG (Average Background)

Function: Returns an average light level value for one buffer memory load.
Register Usage: R6 — Scratch
R7 — Returns average level as a difference from the requested average level.
R8 — Returns average level
Called by: Calibration
Comments: AVBG looks at 64 values in the A/D buffer, i.e., every other diode in the middle two quarters of the background. This area was picked to avoid the large buildup of charge at the beginning of the buffer. It uses R7 and R8 to do a double precision sum of these values. At the end of the sum R7 = X contains the average value divided by 4. This is returned in R8 and is saved in scratchpad SAVBG. Scratchpad GOODA contains a requested average value (similarly divided by 4). R7 is used to return X-GOODA, i.e., a signed difference from the request.

AVG8 (Average 8 Consecutive Diameters)

Function: Averages the current diameter in with the previous seven diameter readings.
Register Usage: Scratchpad bank DIABNK is used as a ring buffer to hold 8 diameter readings (in diode counts). Scratchpad DIAPTR holds pointer to place for next entry in DIABNK.
R4, Rϕ used as scratch.
On input:
R7 = current diameter
On output:
R5 = averaged diameter
R7 = unchanged
Called by: Called after each log scan.
Comments: If the group of eight diameters contains more than two zero readings, then an average value of zero is returned. This cuts down on the display flicker at the beginning and end of each log.

CHDIFF (Check difference)

Function: Compares the new reading to be displayed with the previously displayed reading. Compares this difference with the "display flicker" value from the hex switches.
Register Usage: On entry: R8 = previously displayed value (in diode counts)
R5 = current reading (in diode counts)
On exit: R5 = unchanged
R8 = updated (changed only if $|R5-R8| >$ display flicker).
Carry set if $|R5-R8| \leqq$ display flicker
Carry reset if $|R5-R8| >$ display flicker
Called By: After each log scan when in auto-display mode.

DELAY (Delay)

Function: Provides a delay for a given time interval.
Register Usage: R6 holds the number of milliseconds to delay (R6 = 0 gives 256 ms delay).
Rϕ — used for scratch.
Called By: Diagnostics, call to FAIRBUG.

LOGTB (Log Diameter Table Lookup)

-continued

| | |
|---|---|
| Function: | Converts a diode count into a decimal diameter. |
| Register Usage: | R8 = diameter in diode counts (0–255). Scratch registers HIORL and LOORL are filled as a result of the conversion. DCϕ and Q-Regs used. |
| Comments: | Table lookup is used. The diameter table, DTAB, contains 256 2-byte entries. The first byte goes to the two high order LEDs, the second to the low order LEDs. If the diode count is greater than 254 then "EE"s are displayed in the LEDs. |
| ONCONV (Old/New Diode Count Conversion) | |
| Function: | Converts diode count from Smart Scanner units to old scanner units. |
| Register Usage: | R6 = Edge Count (Input and Output) R4 = Diameter (Input and Output) DCϕ and Q-regs used. |
| Called By: | Log scan |
| Comments: | Conversion is done by table lookup. Maximum returned count is 128. |
| PROCL (Process Log) | |
| Function: | Converts an image in buffer memory into an edge count and a diameter. |
| Register Usage: | Returns edge count in R6, diameter in R7. Uses Rϕ, R4, R5 for scratch. |
| Called By: | Log scan |
| Comments: | The actual determination of a log shape is done by the subroutine PROCL. It takes as input a buffer load of signed differences from the background and returns as output an edge count (first diode which sees the log) and a diameter count (number of diodes which see the log). The overall flow of PROCL is shown in Figure A-14 |

FIG. A-14

Comments:

The basic algorithm used is to look for five diodes in a row which exhibit a "significant difference" from the background (this value is chosen by the switches in the J-box). If such a situation occurs, the first diode to exhibit the difference is called the edge. An additional test is made to see if three consecutive diodes vary by more than twice the significant difference, i.e., to see if there is a "significant jump" in the voltage levels within a small number of diodes. In this case the middle diode is called the edge. The routine looks at absolute values of the differences and thus allows shapes which are both below and above the background. FIG. A-14 shows the flow chart for this logic.

| | |
|---|---|
| RDISP (Remote Display) | |
| Function: | Updates the remote displays |
| Register Usage: | Scratchpads CONTL, HIORL, LOORL hold the control byte and high and low order digits. |
| Called By: | Diagnostics, Calibration, Diameter Displays |
| Comments: | See I/O Ports 8 and 9 write-ups for description of the required protocol. |
| RDSIG (Read Significant Differences) | |
| Function: | Translates the input from the significant difference switches into voltage levels. |
| Register Usage: | Scratchpads SDIF and SJMP are set up. |
| Called By: | Calibration and before each log scan. |
| Comments: | Translation is done by a table lookup. The table (SIGDIFTB) has 2-word entries which correspond to the 2 scratchpad registers. In a dim light condition (which is sensed by looking at the LED control scratchpad) the threshold requirements are halved. |
| SAVBGD (Save Background) | |
| Function: | Saves the current background in RAM. Currently used only for debugging. |
| Register Usage: | Scratchpad STABNK, Bit SLBGDB controls saving. Return is made immediately if this bit is 0, else RAM bank SLBGD is filled. R0 is used for scratch |
| Called By: | At end of calibration (before background is saved). |
| SAVCUR (Save Current Diameter Scans) | |
| Function: | Saves the current log reading in RAM. Currently used only for debugging. |
| Register Usage: | Scratchpad SWWRD, bit SLRDB controls saving. Return is made immediately if this bit is 0, else RAM bank SLRD is filled. R0 is used for scratch. |

-continued

| | |
|---|---|
| Called By: | Each log scan |
| Comments: | Some code shared with SAVBGD. |
| SEND8 (Send counts to PDP-8) | |
| Function: | Sends an edge count and a diameter to the PDP-8 via the compatibility board. |
| Register Usage: | On entry: R4 = diameter<br>R6 = edge count<br>On exit: R4, R6 unchanged<br>R0 used for scratch. |
| Called By: | Each log scan, calibration set-up. |
| Comments: | See I/O Ports 24, 25 write-up. This routine may involve a delay of up to 124 micro-seconds in waiting for a start pulse. |

SELF TEST DIAGNOSTICS

After a power-on or a reset, the Smart Scanner goes through a set of self-test diagnostics. These diagnostics exercise the various boards in the scanner, and stop with an error code if an unacceptable condition is detected. The error must be corrected before normal operation will begin.*

Most of the diagnostics also place additional information in the accumulator, which can only be accessed when debugging using the Formulator.* All of these routines run with interrupts disabled, and thus the subroutines need not utilize the K-register. The code is straight-forward and is well documented in the listings. A brief description of each test follows.

Upon encountering a self-test error, entry will be made to FAIRBUG if a teletype attached to the system shows activity. The "JMP FAIRBUG" destroys the accumulator, contents of which were previously stored in the QL register for FAIRBUG debugging.

| | |
|---|---|
| Test - Checksum on PROMS | |
| Error Code: | 000n (where n = the prom bank where the failure occurred (1-7). |
| Description: | A checksum is computed on each PROM (1/2K each). This is then compared against a value which was stored when the PROM was first burned. |
| Accumulator Contents: | The accumulator contains the computed checksum. During program development these values can be used to compute and store the checksums. |
| Comments: | The checksum for each PROM is contained in the last byte of that PROM. It is equal to the 2'S complement of the sum of all the previous bytes in the PROM; thus the sum of all bytes in a PROM should equal zero.<br>This diagnostic may be bypassed (under switch control). It is possible that the checksum itself may be bad, but that the rest of the PROM is good. In this case, Smart Scanner performance is not affected. |
| Test - I/O Ports | |
| Error Code: | 10nn (where nn = I/O port in error) |
| Description: | Hex '55' and 'AA' are alternately stored and read back from ports $\phi$, 1 and 8. |
| Accumulator Contents: | The erroneous value read out of the I/O ports. |
| Comments: | To correctly test port $\phi$ and 1 the A/D conversion of the video must be disabled. |
| Test - LEDs | |
| Error Code: | None |
| Description: | The remote display LED's are put through a test sequence. The numbers 0000, 1111, ..., 9999 are displayed.<br>The three colored lights are blinked off and on with each number change. The decimal point position should also alternate (between X.XXX AND XX.XX) with each number change. At the end of the test a 000 (leading zero suppressed) should appear. |
| Accumulator Contents: | None |
| Test - Buffer Memory Test | |
| Error Code: | 2Xnn (where X = which test failed nn = error address). |
| Description: | This diagnostic consists of a series of tests on the buffer memory (5000-50FF). The A/D conversion and subtractor logic are disabled. Each test consists of storing a pattern in the 256 bytes and |

-continued

| | |
|---|---|
| | then reading it back out. |
| | 2A = store all zeroes (H'00') |
| | 2B = store all ones (H'FF') |
| | 2C = Checkerboard pattern - H'55' in even addresses, H'AA' in odd addresses. |
| | 2D = Checkerboard pattern - H'AA' in even addresses, H'55' in odd addresses. |
| | 2D = address in data, i.e., H'00' in 5000, H'01' in 5001, ..., H'FF' in 50FF. |
| Accumulator Contents: | Expected patterns (address 50nn contains the pattern in error) |

Test - Subtractor Memory Test

| | |
|---|---|
| Error Code: | 3Xnn (where X = test which failed nn = error address) |
| Description: | This diagnostic consists of a series of tests on the subtractor logic. The subtractor RAM is first filled with 256 bytes of address-in-data which become the subtrahends for the subtract operations. The buffer memory is then repeatedly filled with patterns which become the minuends. The differences are read back from buffer memory and checked. |

| Test | Minuend | Difference Expected |
|---|---|---|
| 3A | Address-in-data | Zeroes in all 256 bytes |
| 3B | Zeroes | Zero-one in descending order (5000 = H'00' 500T = H'FF' 50FF = H'01') |
| 3C | Ones (H'FF') | Complemented address in data (5000 = H'FF' 5001 = H'FE' 50FF = H'00' |

| | |
|---|---|
| Accumulator Contents: | Expected difference (the value which is in error is in address 50nn). |

Test - Subtractor Memory Test (II)

| | |
|---|---|
| Error Code: | 4Xnn (where X = test which failed or 5Xnn nn = error address) |
| Description: | This diagnostic tests the "no-store, no-subtract" mode of the subtractor logic. Subtractor RAM still contains address-in-data. By entering the "no-store, no-subtract" mode, we should be able to store and retrieve data from the buffer memory without disturbing the subtractor RAM. The test consists of two parts; first storing and retrieving data, and second, checking to see that the subtractor RAM is intact. |

| Test | Description |
|---|---|
| 4A | Store and retrieve zeroes |
| 4B | Store and retrieve ones |
| 4C | Store and retrieve checkerboard ('55' in even, 'AA' in odd) |
| 4D | Store and retrieve checkerboard ('AA' in even, '55' in odd) |
| 5A | Subtract stored background from address-in-data. Result should be all zeroes. |
| 5B | Subtract stored background from zero. Result should be '0' to '1' in decrementing order. (i.e., 5000 = 00 5001 = FF 50FF = 01). |

| | |
|---|---|
| Accumulator: Contents: | Expected pattern (address 50nn contains the pattern in error.) |

Test - RAM Diagnostic

| | |
|---|---|
| Error Codes: | Axnn (where A-E indicates which test is<br>Bxnn being performed.<br>Cxnn where x indicates which RAM bank<br>Dxnn is in error<br>Exnn where nn indicates which byte is in error). |
| Description: | A series of tests is performed on each RAM bank. Each bank consists of 256 bytes at the following addresses:<br>Bank 0 = 800 - 8FF<br>1 = 900 = 9FF<br>2 = A00 - AFF<br>3 = B00 = BFF |

-continued

| | |
|---|---|
| | These tests are the same as for the buffer memory.<br>Test A = zeroes<br>B = ones<br>C = checkerboard (odd-in-even)<br>D = checkerboard (even-in-odd)<br>E = address-in-data |
| Accumulator Contents: | Expected value. (The erroneous value can be found at the address indicated by the error code.) |
| Comments: | This test may be bypassed (under switch control). Since the Smart Scanner does not currently use RAM, a RAM failure does not affect Smart Scanner performance. |
| Calibration Errors: | |
| Error Code: | 8888 |
| Meaning: | The ambient light level is too bright to allow the scanner to reach the requested voltage level.<br>(Applicable only if in light-level-seek mode). |
| Error Code: | 9999 |
| Meaning: | The ambient light level is too dim to allow the scanner to reach the requested voltage level.<br>(Applicable only if in light-level-seek mode). |
| Error Code: | AAAA |
| Meaning: | On entering calibration from self-test (rather than from a recalibration) the markers are blocked (indicating that a log is in view). This diagnostic can be overridden from the hex switches. |

DEBUGGING WITH FAIRBUG

Included on the processor board is a PSU (3851ADC-SL31197) containing the FAIRBUG debugger. This debugger uses ROM with addresses H'8000'-H'83FF'; its entry point is H'8080'. I/O ports 4 and 5 are used by Fairbug. On entry, Fairbug stores the status of the system in RAM H'OBE6'-H'OBFF', disables interrupts, and destroys the contents of the PCl and scratchpad register 8.

A mechanism to allow entry to Fairbug has been included in the Smart Scanner. If no teletype is connected to the system, port 4, bit 7, must remain a 1. If there is a teletype then the bit will normally remain a 1; however, any teletype activity will cause the bit to flicker. This bit is monitored in the Smart Scanner wait-loop and error-condition loops and any activity causes the program to execute a "JMP 8080" instruction.

Fairbug allows the user to access memory and scratchpad registers via the teletype. For instance, scratchpad SWWRD can be set to all ones to enable various trace routines. (See SAVBGD, SAVCUR write-ups). When the scanner monitor is re-entered (GO O), it will now save data which can be looked at the Fairbug. Following is a detailed description of the FAIRBUG features.

When FAIRBUG is entered, a prompt character (?) is sent to the output device. The user then has the option of using any of the debug commands. After each debug execution the user is again prompted with (?). All data and input parameters are in hexadecimal notation. C/R following a command indicates a carriage return.

| COMMAND TYPE | COMMAND | FUNCTION |
|---|---|---|
| Display | A (C/R) | Display the contents of the Accumulator |
| | D0 (C/R) | Display the contents of DCO |
| | Dl (C/R) | Display the contents of DCl |
| | I (C/R) | Display the contents of ISAR |
| | M XXXX (C/R) | Display Memory Location XXXX |
| | M XXXX-YYYY (C/R) | Display Memory Location XXXX to YYYY |
| | PO (C/R) | Display the contents of PCO |
| | Pl (C/R) | Display the contents of PCl |
| | R XX (C/R) | Display the contents of Register XX |
| | R XX-YY (C/R) | Display the contents of Registers XX to YY |
| | S (C/R) | Display the contents of W Register, status |
| | W (C/R) | Display the contents of W Register, status |
| *Change | C XX (C/R) (C/R) | Change the previously displayed memory location or register to XX |
| | C XXXX (C/R) (C/R) | Change the previously displayed PC or DC to XXXX |
| Examine | E (C/R) | Display the last addressed register or memory location |
| Next | N (C/R) | Display the next register or memory location |
| Go To | G (C/R) | Go to address of PCO |
| | G AAAA (C/R) | Change PCO to address AAAA, then go to AAAA to execute next instruction |
| Delete Command | [ | Delete command and start a new command input string |
| WARNING | F,P,L | Commands having to do with loading and punching tapes. Typing these commands |

-continued

| COMMAND TYPE | COMMAND | FUNCTION |
| --- | --- | --- |
| | | will cause FAIRBUG to "hang". |

*Note that two (2) C/R's are required for the Change Command. The address pointer is incremented so that successive memory locations may be changed easily.

Memory locations H'ØBØØ'-H'ØBDF' are available to the user for storing programs (FAIRBUG itself uses H'ØBEØ-ØBFF'). Following are two examples of FAIRBUG use.

FAIRBUG Example 1

```
?M B00
 M0B00=00            Store a program to set scratch pad to 0-3F
?C 70                      LIS 0
?C 0B                 Loop LR  I S,A
?C 5C                      LR  S,A
?C 1F                      INC
?C 25                      CI  H'3F'
?C 3F                      BNZ Loop
?C 94                      JMP H'8080'
?C FA
?C 29
?C 80
?C 80
?M B00=B0A
 M0B00=70 0B 5C 1F 25 3F 94 FA }  Display Program
 M0B08=29 80 80 D0 00 10 00 91 }
?R0-3F
 R0000=A4 FF 09 FF 00 00 FF 00
 R0008=83 0A 00 FF 81 97 03 FF
 R0010=0C 20 13 00 1E 00 BF 00
 R0018=9D 40 7D 01 DD 17 55 00    Display scratch pad before execution.
 R0020=B7 F7 7F A2 FF 0E FF 22
 R0028=FF 76 FF 3C FF CE 5F 20
 R0030=18 04 02 00 D9 04 7F 00
 R0038=75 01 57 4A 0F 0A 0A FF
?GO B00                          Go to location to execute
```

FAIRBUG Example 2

```
?R5
 R0005=00
?R1-2                              R1-2 Types R0-R7
 R0000=A4 FF 09 00 00 00 FF 00
?N R0008=83 — Next=R8
?C 55          Change R3 to 55
?E R0008=55    Examine R8
?R8
 R0008=55
?R8
 R0008-55
?P0 83B0
?D0 8078
?D1 0000
?CFFFF         Display DC1, Change, Examine, then display again.
?E FFFF
?D1 FFFF
?I=0F ——— ISAR
?S=0A }
?W=0A }  Status
?M3E0-3FF
 M03E0=04 00 00 10 00 00 00 83
 M03E8=80 EE EE 80 78 FF FF A4    Memory Dump
 M03F0=FF 09 00 00 00 FF 00 55
 M03F8=0A 00 FF 81 97 03 FF 00
```

```
?R0-F
 R0000=A4 FF 09 00 00 00 FF 00 }   Register Dump
 R0008=55 0A 00 FF 81 97 03 FF }
?R10-40
 R0010-00 20 13 00 1E 00 BF 00 )
 R0018=9D 40 7D 01 DD 17 55 00 |
 R0020=B7 F7 7F A2 FF 0E FF 22 |   Register Dump
 R0028=FF 76 FF 3C FF CE 5F 20 |   Note: R40-R47 is used by FAIRBUG.
 R0030=18 04 02 00 D9 04 7F 00 |
 R0038=75 01 57 4A 0F 0A 0A FF |
 R0040=A4 FF 00 00 44 00 47 EF )
```

```
FAIRCHILD MICROSYSTEMS DIVISION - F8 NATIVE ASSEMBLER (REV 2.0)
SMART SCANNER MONITOR-PART 1-9 SEP 76-5:00
PRS  LOC OBJECT ADDR LINE                    SOURCE STATEMENT

                     0001          TITLE 'SMART SCANNER MONITOR-PART 1-9 SEP 7
                     0002   *
                     0003   *
                     0004   *THIS TAPE CONTAINS  THE DIAGNOSTIC ROUTINES OF THE
                     0005   *SMART SCANNER.
                     0006   *IT ALSO CONTAINS THE DISPLAY AND DELAY UTILITY ROUT
                     0007   *
                     0008   *SOME OF THE EQUS DEFINED BELOW ARE USED TO REFERENC
                     0009   * ON OTHER TAPES (OR ALLOW OTHER TAPES TO REFERENCE
                     0010   * THESE SHOULD BE CAREFULLY EVALUATED AND REMOVED WH
                     0011   * LINKING LOADER BECOMES AVAILABLE.
                     0012   *
                     0013   *
                     0014   *THESE EQUS MUST BE FIRST FOR ADDRESSING EQUS TO WOR
                     0015   *
                0000 0016   PROM0      EQU    H'0000'
                4000 0017   PROM1      EQU    H'4000'
                0800 0018   RAM        EQU    H'0800'
                     0019   *
                0011 0020   CHKDIG     EQU    H'11'
                     0021   *
                5000 0022   ADMEM      EQU    H'5000'
                0004 0023   RAMCT      EQU    4
                0200 0024   PROMBNK1   EQU    PROM0+H'200' FIRST CHECKSUMMED PROM.
                     0025   *
                     0026   *ADDRESSES IN OTHER TAPES.
                     0027   *
                0403 0028   PRECB1     EQU    H'0403'   START OF SECOND TAPE.
                     0029   *
                     0030   *ADDRESSES IN THIS TAPE.
                     0031   *
                0280 0032   RDISP0     EQU    H'0280'
                02C0 0033   LDISP0     EQU    H'02C0'
                02F0 0034   DLAY0      EQU    H'02F0'
                     0035   *
                0001 0036   BIT0       EQU    1
                0002 0037   BIT1       EQU    2
                     0038   *
                0005 0039   STABNK     EQU    5
                     0040   *
[illegible] DIVISION - F8 NATIVE [illegible]
[illegible] SEP 76-5 00
[illegible] OBJECT ADDR LINE                 SOURCE STATEMENT

                     0041              EJECT
                0000 0042   R0         EQU    0
                0001 0043   R1         EQU    1
                0002 0044   R2         EQU    2
                0003 0045   R3         EQU    3
                0004 0046   R4         EQU    4
                0005 0047   R5         EQU    5
                0006 0048   R6         EQU    6
                0007 0049   R7         EQU    7
                0008 0050   R8         EQU    8
                0009 0051   JREG       EQU    9
                000A 0052   HU         EQU    10
                000B 0053   HL         EQU    11
```

```
          0054  *
0002      0055  LEDBNK.   EQU   2        LED CONTROL E ANK (SCRATCHPA
0000      0056  CONTL     EQU   0
0001      0057  HIORL     EQU   1
0002      0058  LOORL     EQU   2
          0059  *
          0060  *
0000      0061  PORT0     EQU   0
0001      0062  PORT1     EQU   1
0080      0063  WROK      EQU   H'80'
0004      0064  PORT4     EQU   4
0020      0065  RECAB     EQU   H'20'
0005      0066  PORT5     EQU   5
0006      0067  PORT6     EQU   6
0007      0068  PORT7     EQU   7
0008      0069  PORT8     EQU   8
0009      0070  PORT9     EQU   9
000C      0071  PORTC     EQU   H'0C'
000C      0072  IHIADD    EQU   H'0C'
000D      0073  PORTD     EQU   H'0D'
000D      0074  ILOADD    EQU   H'0D'
000E      0075  PORTE     EQU   H'0E'
000E      0076  ICONT     EQU   H'0E'
000F      0077  PORTF     EQU   H'0F'
000F      0078  ITIME     EQU   H'0F'
0014      0079  PRT14     EQU   H'14'
0014      0080  COMPEDCE  EQU   H'14'
0015      0081  PRT15     EQU   H'15'
0015      0082  COMPDIA   EQU   H'15'
0020      0083  PRT20     EQU   H'20'
0021      0084  PRT21     EQU   H'21'
0024      0085  PRT24     EQU   H'24'
0024      0086  LED       EQU   H'24'
0025      0087  PRT25     EQU   H'25'
0025      0088  LEDC      EQU   H'25'
0040      0089  PRT40     EQU   H'40'
0040      0090  RLED      EQU   H'40'
0044      0091  PRT44     EQU   H'44'
0044      0092  REDGE     EQU   H'44'
0045      0093  PRT45     EQU   H'45'
0045      0094  RDIAM     EQU   H'45'
          0095  *
00CC      0096  SYNC      EQU   H'CC'
          0097  **
```

```
... MICROSYSTEMS DIVISION - F8 NATIVE ASSEMBLER  REV 3.0)
... MONITOR-PART    ? SEP 76-6:00
LOC OBJECT ADDR LINE               SOURCE STATE...
 1    2     3    4     5              7               8
                0098               EJECT
                0099               ORG PROM0
                0100  *
0000 1A         0101  START:       DI
0001 70         0102               CLR
0002 E6         0103               OUTS PORT6      CLEAR PENDING INTERRUPTS.
0003 BE         0104               OUTS PORTE
0004 2725       0105               OUT PRT25
0006 2740       0106               OUT PRT40
0008 20FF       0107               LI H'FF'
000A B7         0108               OUTS PORT7
000B BF         0109               OUTS PORTF      DISABLE TIMERS.
                0110  *
                0111  *INITIALIZE STAUS BANK TO ALL ZEROES.
                0112  *
000C 65         0113               LISU STABNK
000D 6F         0114               LISL 7
000E 70         0115               CLR
000F 5E         0116               LR D,A
0010 8FFE  000F 0117               BR7   *-1
0012 62         0118               LISU LEDBNK     ADDRESS LED BANK.
                0119  *
                0120  *CHECKSUM DIAGNOSTIC. FIRST PROM CONTAINS CHECKSUM D
                0121  *EACH OF THE OTHER PROMS. ERROR CODE IS '000N' WHERE
                0122  *PROM BANK IN ERROR.
                0123  *
```

```
0013 905E   0072 0124          BR IOPDG        LEAVE OUT CHECKSUMS FOR NOW
0015 69          0125 CHKSUMD  LISL HIORL
0016 70          0126          CLR
0017 5D          0127          LR I,A          ERROR CODE='00'
0018 71          0128          LIS 1
0019 5C          0129          LR S,A          START WITH PROM BANK 1.
001A 2A0260 0203 0130          DCI PROMBNK1
001D 280063 0063 0131          PI CHR0
0020 2511        0132          CI CHKDIG       ****COMPARE ACC WITH STORED
0022 943C   005F 0133          BNZ CHKHL       HALT ON NOT EQUAL.
0024 72          0134          LIS 2
0025 5C          0135          LR S,A
0026 280063 0063 0136          PI CHR0         CHECK BANK 2.
0029 2511        0137          CI CHKDIG       ***
002B 9433   005F 0138          BNZ CHKHL
002D 73          0139          LIS 3
002E 5C          0140          LR S,A
002F 280063 0063 0141          PI CHR0         CHECK BANK 3.
0032 2511        0142          CI CHKDIG       ***
0034 942A   005F 0143          BNZ CHKHL
0036 2A4000 4000 0144          DCI PROM1       SECOND HALF IS NOT CONTIGUO
0039 74          0145          LIS 4
003A 5C          0146          LR S,A
003B 280063 0063 0147          PI CHR0
003E 2511        0148          CI CHKDIG       ***
0040 941E   005F 0149          BNZ CHKHL
0042 75          0150          LIS 5
0043 5C          0151          LR S,A
0044 280063 0063 0152          PI CHR0
0047 2511        0153          CI CHKDIG       ***
0049 9415   005F 0154          BNZ CHKHL
004B 76          0155          LIS 6
004C 5C          0156          LR S,A
004D 280063 0063 0157          PI CHR0
0050 2511        0158          CI CHKDIG       ***
0052 940C   005F 0159          BNZ CHKHL
```

FAIRCHILD MICROSYSTEMS DIVISION - F8 NATIVE ASSEMBLER (REV 2.0)
SMART SCANNER MONITOR-PART 1-9 SEP 76-6:03

```
ERRS LOC OBJECT ADDR LINE          SOURCE STATEMENT

     0054 77          0160          LIS 7
     0055 5C          0161          LR S,A
     0056 280063 0063 0162          PI CHR0
     0059 2511        0163          CI CHKDIG       ***
     005B 9403   005F 0164          BNZ CHKHL
     005D 9014   0072 0165          BR IOPDG        NOW CHECK I/O PORTS.
                      0166 *
     005F 07          0167 CHKHL    LR QL,A         SAVE OFFENDING CHECKSUM.
     0060 290262 0262 0168          JMP HALTR       HALT AND DISPLAY ERROR.
                      0169 *
                      0170 *CHECKSUM COMPUTATION.
                      0171 *
     0063 72          0172 CHR0     LIS 2
     0064 50          0173          LR R0,A
     0065 70          0174          CLR
     0066 51          0175          LR R1,A         SET INNER LOOP TO 256.
     0067 58          0176          LR R8,A         ZERO SUM.
     0068 16          0177 CHR0L    LM
     0069 C8          0178          AS R8
     006A 58          0179          LR R8,A
     006B 31          0180          DS R1
     006C 94FB   0068 0181          BNZ CHR0L       INNER LOOP.
     006E 30          0182          DS R0
     006F 94F8   0068 0183          BNZ CHR0L       OUTER LOOP.
     0071 1C          0184          POP             RETURN WITH ACC = CHECKSUM
```

FAIRCHILD MICROSYSTEMS DIVISION - F8 NATIVE ASSEMBLER (REV 2.0)
SMART SCANNER MONITOR-PART 1-9 SEP 76-6:00

```
ERRS LOC OBJECT ADDR LINE          SOURCE STATEMENT

                      0185          EJECT
                      0186 *
                      0187 *I/O PORTS TEST.
                      0188 * STORE AND RETREIVE CHECKERBOARD PATTERN (H'55' IN
```

```
                    0189  * ERROR CODE IS 10NN WHERE NN IS THE CURRENT I/O FOR
                    0190  *
0072 69             0191  IOPDG    LISL HIORL       ADDRESS HIGH ORDER LEDS.
0073 2010           0192           LI H'10'
0075 5D             0193           LR I,A           LEAVE ISAR POINTING AT LOW
0076 2055           0194           LI H'55'
0078 50             0195           LR R0,A          STORE CHECKERBOARD PATTERNS
0079 18             0196           COM
007A 51             0197           LR R1,A
007B 72             0198           LIS 2            DISABLE A/D CONVERSION.
007C B1             0199           OUTS PORT1
                    0200  *
                    0201  *PORT 0 (PROCESSOR BOARD).
                    0202  *
007D 70             0203           CLR
007E 5C             0204           LR S,A           LOAD ERROR CODE.
007F 40             0205           LR A,R0
0080 B0             0206           OUTS PORT0
0081 A0             0207           INS PORT0
0082 2555           0208           CI H'55'
0084 942B      00B0 0209           BNZ PRER1
0086 41             0210           LR A,R1
0087 B0             0211           OUTS PORT0
0088 A0             0212           INS PORT0
0089 25AA           0213           CI H'AA'
008B 9424      00B0 0214           BNZ PRER1
                    0215  *
                    0216  *PORT 1 (PROCESSOR BOARD).
                    0217  *
008D 71             0218           LIS H'01'
008E 5C             0219           LR S,A
008F 2057           0220           LI H'57'         KEEP BIT 1 ON.
0091 B1             0221           OUTS PORT1
0092 A1             0222           INS PORT1
0093 213F           0223           NI H'3F'
0095 2517           0224           CI H'17'
0097 9418      00B0 0225           BNZ PRER1
0099 41             0226           LR A,R1
009A B1             0227           OUTS PORT1
009B A1             0228           INS PORT1
009C 213F           0229           NI H'3F'
009E 252A           0230           CI H'2A'
00A0 940F      00B0 0231           BNZ PRER1
                    0232  *
                    0233  *PORT 8 (VIDEO BOARD).
                    0234  *
00A2 78             0235           LIS H'08'
00A3 5C             0236           LR S,A
00A4 40             0237           LR A,R0
00A5 B8             0238           OUTS PORT8
00A6 A8             0239           INS PORT8
00A7 2555           0240           CI H'55'
00A9 9425      00CF 0241           BNZ PRERR
00AB 41             0242           LR A,R1
00AC B8             0243           OUTS PORT8
00AD A8             0244           INS PORT8
00AE 25AA           0245           CI H'AA'
00B0 941E      00CF 0246  PRER1    BNZ PRERR
FAIRCHILD MICROSYSTEMS DIVISION - F8 NATIVE ASSEMBLER (REV 2.0)
SMART SCANNER MONITOR-PART 1-9 SEP 76-6:00
ERRS  LOC OBJECT ADDR LINE              SOURCE STATEMENT

                    0247  *
                    0248  *PORT 9(VIDEO BOARD).
                    0249  *
00B2 79             0250           LIS H'09'
00B3 5C             0251           LR S,A
00B4 40             0252           LR A,R0
00B5 B9             0253           OUTS PORT9
00B6 A9             0254           INS PORT9
00B7 2555           0255           CI H'55'
00B9 9415      00CF 0256           BNZ PRERR
00BB 41             0257           LR A,R1
00BC B9             0258           OUTS PORT9
```

```
00BD A9             0259             INS PORTS!
00BE 25AA           0260             CI H'AA'
00C0 940E      00CF 0261             BNZ PRERR
                    0262    *
                    0263    *
00C2 70             0264             CLR
00C3 B0             0265             OUTS PORT0
00C4 B1             0266             OUTS PORT1
00C5 B4             0267             OUTS PORT4
00C6 B5             0268             OUTS PORT5
00C7 B8             0269             OUTS PORT8
00C8 B9             0270             OUTS PORT9
00C9 2724           0271             OUT PRT24
00CB 2725           0272             OUT PRT25
00CD 9005      00D3 0273             BR LEDDG        ON TO LED DIAG.
                    0274    *
                    0275    *ERROR ROUTINE.
                    0276    *
00CF 07             0277    PRERR    LR QL,A         SAVE OFFENDING PATTERN.
00D0 290262    0262 0278             JMP HALTR       ERROR DISPLAYS ALL SET UP.
```

```
FAIRCHILD MICROSYSTEMS DIVISION - F8 NATIVE ASSEMBLER (REV 2.0)
  ART SCANNER MONITOR-PART 1-9 SEP 76-6:00
ERRS  LOC OBJECT ADDR LINE              SOURCE STATEMENT

                      0279             EJECT
                      0280    *LED TEST. SET ALL THE DIGITS IN BOTH LOCAL AND REMO
                      0281    *TO 0-9. R1,R2 USED FOR SCRATCH.
                      0282    *
      00D3 62         0283    LEDDG    LISU LEDBNK      ADDRESS DISPLAY BANK
      00D4 6A         0284             LISL LOORL
      00D5 70         0285             CLR
      00D6 5E         0286             LR D,A           ZEROES IN DISPLAYS
      00D7 5E         0287             LR D,A
      00D8 78         0288             LIS H'08'        NO LIGHTS AND DD.DD.
      00D9 5C         0289             LR S,A           CONTROL IN R20.
      00DA 7A         0290             LIS 10
      00DB 52         0291             LR R2,A          LOOP COUNTER
                      0292    *
                      0293    *SEND TO LOCAL AND REMOTE.
                      0294    *
      00DC 2802C0 02C0 0295   LED0     PI LDISP         LOCAL DISPLAY.
      00DF 280280 0280 0296            PI RDISP         REMOTE DISPLAY
      00E2 20FA       0297    LED1     LI 250           50 MS = 1/4 SEC
      00E4 56         0298             LR R6,A
      00E5 2802F0 02F0 0299            PI DLAY
      00E8 6A         0300             LISL LOORL
      00E9 4C         0301             LR A,S
      00EA 2411       0302             AI H'11'         UPDATE DIGITS
      00EC 5E         0303             LR D,A
      00ED 5E         0304             LR D,A
      00EE 4C         0305             LR A,S
      00EF 23F8       0306             XI H'F8'         ALTERNATE LIGHTS AND DECPT.
      00F1 5C         0307             LR S,A
      00F2 32         0308             DS R2
      00F3 94E8  00DC 0309             BNZ LED0         DON'T GO PAST 9.
                      0310    *
                      0311    *END WITH ALL THREE LIGHTS AND A LEADING BLANK.
                      0312    *
      00F5 6A         0313             LISL LOORL
      00F6 70         0314             CLR
      00F7 5E         0315             LR D,A
      00F8 5E         0316             LR D,A
      00F9 20E4       0317             LI H'E4'
      00FB 5C         0318             LR S,A
      00FC 2802C0 02C0 0319            PI LDISP
      00FF 280280 0280 0320            PI RDISP
                      0321    *
                      0322    *        BR ADMDG         ON TO A/D MEMORY DIAG.
                      0323    *
```

```
FAIRCHILD MICROSYSTEMS DIVISION - F8 NATIVE ASSEMBLER (REV 2.0)
     FILE MONITOR-PART 1-9 SEP 76-6:01
LOC  OBJECT ADDR LINE              SOURCE STATEMENT

                            EJECT
                 *A/D BUFFER MEMORY TEST. DISABLE A/D CONVERSION AND
                 *SUBTRACTOR LOGIC. CONDUCT THE FOLLOWING STORE AND C
                 *          TEST              ERROR CODE (NN=ADDR).
                 *
                 *          ALL ZEROES        2ANN
                 *          ALL ONES          2BNN
                 *          CHKBD (0 IN E)    2CNN
                 *          CHKBD (0 IN D)    2DNN
                 *          ADDR IN DATA      2ENN
                 *
                 *SET UP OVERALL TEST CONSTANTS AND Q-REGS TO POINT A
                 *
0102 2A5000 5000 ADMDG      DCI ADMEM
0105 0E                     LR Q,DC
0106 7A                     LIS H'0A'
0107 54                     LR R4,A           BASIC PORT 1 BITS.
0108 7B                     LIS H'0B'
0109 55                     LR R5,A           SET TO CLEAR MEMORY.
010A 7E                     LIS H'0E'
010B 56                     LR R6,A           SET TO LATCH DATA.
010C 69                     LISL HIORL        POINT ISAR AT HIGH ORDER DI
                 *
                 *ZEROES TEST.
                 *
010D 202A                   LI H'2A'
010F 5C                     LR S,A
0110 70                     CLR
0111 52                     LR R2,A
0112 2801F3 01F3            PI STCN           STORE CONSTANT.
0115 280228 0228            PI CHCN           CHECK CONSTANT.
                 *
                 *ONES TEST.
                 *
0118 202B                   LI H'2B'
011A 5C                     LR S,A
011B 20FF                   LI H'FF'
011D 52                     LR R2,A
011E 2801F3 01F3            PI STCN
0121 280228 0228            PI CHCN
                 *
                 *CHECKER BOARD 1. 55 IN EVEN ADDRS, AA IN ODD ADDRS.
                 *
0124 202C                   LI H'2C'
0126 5C                     LR S,A
0127 2055                   LI H'55'
0129 52                     LR R2,A
012A 280204 0204            PI STCH
012D 280233 0233            PI CHCH           STORE AND CHECK CHKBD.
                 *
                 *CHECKER BOARD 2. REVERSE OF ABOVE.
                 *
0130 202D                   LI H'2D'
0132 5C                     LR S,A
0133 20AA                   LI H'AA'
0135 52                     LR R2,A
0136 280204 0204            PI STCH
0139 280233 0233            PI CHCH
                 *
                 *ADDRESS IN DATA.
                 *
013C 202E                   LI H'2E'
```

```
FAIRCHILD MICROSYSTEMS DIVISION - F8 NATIVE ASSEMBLER (REV 2.0)
SMART SCANNER MONITOR-PART 1-9 SEP 76-6:00
ERRS  LOC OBJECT ADDR LINE              SOURCE STATEMENT

     013E 5C             0386           LR S,A
     013F 280217 0217 0387           PI STAD         STORE ADDR IN DATA.
     0142 28024C 024C 0388           PI CHAD         CHECK ADDR IN DATA.
                          0389    *
                          0390    *      BR SBMDG        ON TO SUBTRACTOR BOARD TEST
FAIRCHILD MICROSYSTEMS DIVISION - F8 NATIVE ASSEMBLER (REV 2.0)
SMART SCANNER MONITOR-PART 1-9 SEP 76-6:00
ERRS  LOC OBJECT ADDR LINE              SOURCE STATEMENT

                          0391           EJECT
                          0392   *SUBTRACTOR MEMORY TEST.  SUBTRACTOR RAM CONTAINS AD
                          0393   *FROM FINAL BUFFER MEMORY TEST.  STORE THIS BACKGROU
                          0394   *ENABLE THE SUBTRACTOR LOGIC.
                          0395   *SUBTRACT ADDR-IN-DATA FROM THE FOLLOWING:
                          0396   *
                          0397   *    MINUEND   DIFF    ERROR CODE.
                          0398   *
                          0399   *         ADDR  0          3ANN
                          0400   *         0     0-1(DEC)   3BNN
                          0401   *         H'FF' -1-0(DEC)  3CNN
                          0402   *
                          0403   *ISAR POINTS AT HIGH DIGITS OF ERROR CODE. Q-REGS PO
                          0404   *
     0145 08              0405   SBMDG   LR K,P
     0146 72              0406           LIS H'02'
     0147 54              0407           LR R4,A         BASIC PORT 1 BITS.
     0148 73              0408           LIS H'03'
     0149 55              0409           LR R5,A         SET TO CLEAR
     014A 76              0410           LIS H'06'
     014B 56              0411           LR R6,A         SET TO LATCH DATA.
                          0412   *
                          0413   *ADDR IN DATA TEST
                          0414   *
     014C 203A            0415           LI H'3A'
     014E 5C              0416           LR S,A          STORE ERROR CODE.
     014F 280217 0217 0417           PI STAD         STORE ADDR IN DATA.
     0152 70              0418           CLR
     0153 52              0419           LR R2,A
     0154 280228 0228 0420           PI CHCN         CHECK CONSTANT ZERO.
                          0421   *
                          0422   *SUBTRACT ZEROES.
                          0423   *
     0157 203B            0424           LI H'3B'
     0159 5C              0425           LR S,A
     015A 70              0426           CLR
     015B 52              0427           LR R2,A
     015C 2801F3 01F3 0428           PI STCN         STORE CONSTANT.
     015F 28023F 023F 0429           PI CHDC         CHECK DECREMENT (START WITH
                          0430   *
                          0431   *SUBTRACT H'FF' (-1).
                          0432   *
     0162 203C            0433           LI H'3C'
     0164 5C              0434           LR S,A
     0165 20FF            0435           LI H'FF'
     0167 52              0436           LR R2,A
     0168 2801F3 01F3 0437           PI STCN         STORE CONSTANT.
     016B 28023F 023F 0438           PI CHDC         CHECK DECREMENT (START WITH
                          0439   *
                          0440   *       BR    RAMDG     ON TO RAM DIAG.
FAIRCHILD MICROSYSTEMS DIVISION - F8 NATIVE ASSEMBLER (REV 2.0)
SMART SCANNER MONITOR-PART 1-9 SEP 76-6:00
ERRS  LOC OBJECT ADDR LINE              SOURCE STATEMENT

                          0441           EJECT
                          0442   *
                          0443   *RAM DIAGNOSTIC. FOR EACH  BANK OF RAM PERFORM THE F
                          0444   *
                          0445   *       TEST                ERROR (X=BANK,NN=ADDR).
                          0446   *
```

```
                     0447  *          ZEROES          AXNN
                     0448  *          ONES            BXNN
                     0449  *          CHKBD (O IN E)  CXNN
                     0450  *          CHKBD (E IN E)  DXNN
                     0451  *          ADDR-IN -DATA   EXNN.
                     0452  *                          SKIP RAM TEST FOR NOW.
0166 290IC0 01C0     0453             JMP PRECB       **USEFUL FOR DEBUG PURPOSES
0171 69              0454  RAMDG      LISL HIORL
0172 74              0455             LIS RAMCT
0173 50              0456             LR R0,A         R0=COUNT OF RAM BANKS.
0174 2A0800 0800     0457             DCI RAM
0177 0E              0458             LR Q,DC         SAVE CURRENT BANK IN Q.
0178 70              0459             CLR
0179 53              0460             LR R3,A         R3=X=RAM BANK.
                     0461  *
                     0462  *ZEROES TEST.
                     0463  *
017A 20A0            0464  RMDGL      LI H'A0'
017C C3              0465             AS R3
017D 5C              0466             LR S,A          SET UP ERROR CODE.
017E 70              0467             CLR
017F 52              0468             LR R2,A
0180 2801D9 01D9     0469             PI RMCN         STORE IN RAM.
0183 280228 0228     0470             PI CHCN         CHECK CONSTANT.
                     0471  *
                     0472  *ONES.
                     0473  *
0186 20B0            0474             LI H'B0'
0188 C3              0475             AS R3
0189 5C              0476             LR S,A
018A 20FF            0477             LI H'FF'
018C 52              0478             LR R2,A
018D 2801D9 01D9     0479             PI RMCN
0190 280228 0228     0480             PI CHCN
                     0481  *
                     0482  *CHKBD 1. 55 IN EVEN, AA IN ODD.
                     0483  *
0193 20C0            0484             LI H'C0'
0195 C3              0485             AS R3
0196 5C              0486             LR S,A
0197 2055            0487             LI H'55'
0199 52              0488             LR R2,A
019A 2801E2 01E2     0489             PI RMCH
019D 280233 0233     0490             PI CHCH
                     0491  *
                     0492  *CHKBD 2.
                     0493  *
01A0 20D0            0494             LI H'D0'
01A2 C3              0495             AS R3
01A3 5C              0496             LR S,A
01A4 20AA            0497             LI H'AA'
01A6 52              0498             LR R2,A
01A7 2801E2 01E2     0499             PI RMCH
01AA 280233 0233     0500             PI CHCH
                     0501  *
                     0502  *ADDR IN DATA.
FAIRCHILD MICROSYSTEMS DIVISION - F8 NATIVE ASSEMBLER (REV 2.0)
CHART SCANNER MONITOR-PART 1-9 SEP 76-6:00
ERRS  LOC OBJECT ADDR LINE           SOURCE STATEMENT

                     0503  *
01AD 20E0            0504             LI H'E0'
01AF C3              0505             AS R3
01B0 5C              0506             LR S,A
01B1 2801EC 01EC     0507             PI RMAD
01B4 28024C 024C     0508             PI CHAD
                     0509  *
                     0510  *ADDRESS NEXT RAM BANK, IF ANY.
                     0511  *
01B7 02              0512             LR A,QU
01B8 1F              0513             INC
01B9 06              0514             LR QU,A
01BA 43              0515             LR A,R3
```

```
01BB 1F            0516          INC
01BC 53            0517          LR R3,A
01BD 30            0518          DS R0
01BE 94BB    017A  0519          BNZ RMDGL        LOOP IF MORE.
                   0520   *
                   0521   *END DIAGS-CHECK MARKER AREA BEFORE STARTING CALIBRA
                   0522   *
             0005  0523   SYNCPORT EQU 5
             0001  0524   MRKSYS   EQU H'01'
             0040  0525   EXTSN    EQU H'40'
             0080  0526   MRKBIT   EQU  H'80'
                   0527   *
01C0 70            0528   PRECB    CLR
01C1 58            0529            LR R8,A        SET FLAG FOR TOTAL CAL.
01C2 A5            0530            INS SYNCPORT
01C3 2101          0531            NI MRKSYS
01C5 9410    01D6  0532            BNZ RECALJ      NON-MARKER SYS-GO AHEAD.
01C7 2E40          0533            IN EXTSN
01C9 2180          0534            NI MRKBIT
01CB 940A    01D6  0535            BNZ RECALJ      AREA FREE.
01CD 62            0536            LISU LEDBNK
01CE 0A            0537            LISL LOORL
01CF 20AA          0538            LI H'AA'
01D1 5E            0539            LR D,A
01D2 5E            0540            LR D,A
01D3 290262 0 262 0541              JMP HPLTR       AAAA ERROR CODE.
                   0542   *
01D6 290403 0403   0543   RECALJ   JMP PRECBI

FAIRCHILD MICROSYSTEMS DIVISION - F8 NATIVE ASSEMBLER (REV 2.0)
  SCANNER MONITOR-PART 1-9 SEP 76-6:09
  LOC OBJECT ADDR LINE                 SOURCE STATEMENT

                   0544            EJECT
                   0545   *RAM STORE ROUTINES. R2 HOLDS FIRST THING TO STORE.
                   0546   *        FIRST ADDRESS.
                   0547   *
                   0548   *STORE CONSTANT.
                   0549   *
01D9 0F            0550   RMCN     LR DC,Q
01DA 70            0551            CLR
01DB 51            0552            LR R1,A        256 COUNTER.
01DC 42            0553            LR A,R2
01DD 17            0554   RMCNL    ST
01DE 31            0555            DS R1
01DF 94FD    01DD  0556            BNZ RMCNL
01E1 1C            0557            POP
                   0558   *
                   0559   *STORE CHECKERBOARD.
                   0560   *
01E2 0F            0561   RMCH     LR DC,Q
01E3 70            0562            CLR
01E4 51            0563            LR R1,A
01E5 42            0564            LR A,R2
01E6 17            0565   RMCHL    ST
01E7 18            0566            COM            SHUFFLE THE BITS.
01E8 31            0567            DS R1
01E9 94FC    01E6  0568            BNZ RMCHL
01EB 1C            0569            POP
                   0570   *
                   0571   *STORE ADDR IN DATA.
                   0572   *
01EC 0F            0573   RMAD     LR DC,Q
01ED 70            0574            CLR
01EE 17            0575   RMADL    ST
01EF 1F            0576            INC
01F0 94FD    01EE  0577            BNZ RMADL       ADDR IS USED AS THE 256 COU
01F2 1C            0578            POP
```

```
...R HUNIT F PART 1-9 SEP 76-6 00
... OBJECT ADDR LINE                  SOURCE STATEMENT

                    0579           EJECT
                    0580   *
                    0581   *ROUTINES TO OUTPUT TO A/D BUFFER MEMORY. THE FOLLOW
                    0582   *REGISTER ASSIGNMENTS ARE COMMON TO ALL:
                    0583   *
                    0584   *       R1 USED AS SCRATCH.
                    0585   *       R2 HOLDS FIRST VALUE TO OUTPUT.
                    0586   *       R4 HOLDS BASIC PORT 1 BITS.
                    0587   *       R5 HOLDS PORT 1 BITS TO CLEAR BUFFER.
                    0588   *       R6 HOLDS PORT 1 BITS TO LATCH PORT 0 DATA.
                    0589   *
                    0590   *STORE CONSTANT.
                    0591   *
01F3 45             0592   STCN    LR A,R5
01F4 B1             0593           OUTS PORT1
01F5 44             0594           LR A,R4
01F6 B1             0595           OUTS PORT1       PULSE TO CLEAR BUFFER.
01F7 70             0596           CLR
01F8 51             0597           LR R1,A          SET COUNTER TO 256.
01F9 42             0598           LR A,R2
01FA 18             0599           COM              PORT 0 DATA MUST BE COMPLEM
01FB B0             0600           OUTS PORT0       SET CONSTANT IN PORT 0.
01FC 46             0601   STCNL   LR A,R6
01FD B1             0602           OUTS PORT1
01FE 44             0603           LR A,R4
01FF B1             0604           OUTS PORT1       PULSE TO LATCH DATA.
0200 31             0605           DS R1
0201 94FA     01FC  0606           BNZ STCNL        LOOP FOR 256 TIMES.
0203 1C             0607           POP
                    0608   *
                    0609   *STORE CHECKER BOARD PATTERN.
                    0610   *
0204 45             0611   STCH    LR A,R5
0205 B1             0612           OUTS PORT1
0206 44             0613           LR A,R4
0207 B1             0614           OUTS PORT1       PULSE TO CLEAR BUFFER.
0208 70             0615           CLR
0209 51             0616           LR R1,A          SET COUNTER TO 256.
020A 42             0617           LR A,R2          OUTPUT ORIGINAL PATTERN
020B 18             0618           COM               (COMPLEMENTED).
020C B0             0619   STCHL   OUTS PORT0
020D 46             0620           LR A,R6
020E B1             0621           OUTS PORT1
020F 44             0622           LR A,R4
0210 B1             0623           OUTS PORT1       PULSE TO LATCH DATA.
0211 A0             0624           INS PORT0
0212 18             0625           COM
0213 31             0626           DS R1
0214 94F7     020C  0627           BNZ STCHL
0216 1C             0628           POP
                    0629   *
                    0630   *ROUTINE TO STORE ADDR IN DATA (R2 NOT USED).
                    0631   *
0217 45             0632   STAD    LR A,R5
0218 B1             0633           OUTS PORT1
0219 44             0634           LR A,R4
021A B1             0635           OUTS PORT1       PULSE TO CLEAR BUFFER.
021B 70             0636           CLR
021C 51             0637   STADL   LR R1,A
021D 18             0638           COM
021E B0             0639           OUTS PORT0
021F 46             0640           LR A,R6
```

```
FAIRCHILD MICROSYSTEMS DIVISION - F8 NATIVE ASSEMBLER (REV 2.0)
SMART SCANNER MONITOR-PART 1-9 SEP 76-6:00
ERRS  LOC OBJECT ADDR LINE                  SOURCE STATEMENT

      0220 51               0641          OUTS PORT1
      0221 44               0642          LR A,R4
      0222 B1               0643          OUTS PORT1      PULSE TO LATCH DATA.
      0223 41               0644          LR A,R1
      0224 1F               0645          INC
      0225 94F6      021C   0646          BNZ STADL1      LOOP TIL BACK TO 0.
      0227 1C               0647          POP

FAIRCHILD MICROSYSTEMS DIVISION - F8 NATIVE ASSEMBLER (REV 2.0)
SMART SCANNER MONITOR-PART 1-9 SEP 76-6:00
ERRS  LOC OBJECT ADDR LINE                  SOURCE STATEMENT

                            0648          EJECT
                            0649   *ROUTINES TO CHECK A BANK OF MEMORY (256 BYTES OF A/
                            0650   * OR OF RAM) FOR A SPECIFIC PATTERN.
                            0651   *THE FOLLOWING REGISTER ASSIGNMENTS ARE COMMON TO AL
                            0652   *
                            0653   *          Q-REGS POINT TO MEMORY BANK.
                            0654   *          R1 USED FOR COUNTER.
                            0655   *          R2 HOLDS ORIGINAL PATTERN.
                            0656   *
                            0657   *CHECK CONSTANT.
                            0658   *
      0228 0F               0659   CHCN   LR DC,Q
      0229 70               0660          CLR
      022A 51               0661          LR R1,A         256 COUNTER.
      022B 42               0662          LR A,R2
      022C 8D               0663   CHCNL  CM
      022D 9427      0255   0664          BNZ MEMERR
      022F 31               0665          DS R1
      0230 94FB      022C   0666          BNZ CHCNL       LOOP.
      0232 1C               0667          POP
                            0668   *
                            0669   *CHECK CHECKERBOARD.
                            0670   *
      0233 0F               0671   CHCH   LR DC,Q
      0234 70               0672          CLR
      0235 51               0673          LR R1,A
      0236 42               0674          LR A,R2
      0237 8D               0675   CHCHL  CM
      0238 941C      0255   0676          BNZ MEMERR
      023A 18               0677          COM             COMPLEMENT CHECKERBOARD PAT
      023B 31               0678          DS R1
      023C 94FA      0237   0679          BNZ CHCHL
      023E 1C               0680          POP
                            0681   *
                            0682   *CHECK FOR DECREMENTING PATTERN.
                            0683   *
      023F 0F               0684   CHDC   LR DC,Q
      0240 70               0685          CLR
      0241 51               0686          LR R1,A
      0242 42               0687          LR A,R2
      0243 8D               0688   CHDCL  CM
      0244 9410      0255   0689          BNZ MEMERR
      0246 24FF             0690          AI H'FF'        DECREMENT PATTERN.
      0248 31               0691          DS R1
      0249 94F9      0243   0692          BNZ CHDCL
      024B 1C               0693          POP
                            0694   *
                            0695   *CHECK ADDR IN DATA. (R1,R2 NOT USED).
                            0696   *
      024C 0F               0697   CHAD   LR DC,Q
      024D 70               0698          CLR
      024E 8D               0699   CHADL  CM
      024F 9405      0255   0700          BNZ MEMERR
      0251 1F               0701          INC
      0252 94FB      024E   0702          BNZ CHADL
      0254 1C               0703          POP
```

```
... MICROSYSTEMS DIVISION - F8 NATIVE ASSEMBLER (REV 2.0)
... MONITOR-PART 1-9 SEP 76-6:00
..S  LOC OBJECT ADDR LINE              SOURCE STATEMENT

                                        EJECT
                           *
                           *MEMORY ERROR: R21 HOLDS ERROR CODE (TO BE DISPLAYED
                           * DC0 POINTS ONE PAST BAD LOCATION. USE H REGS AS SC
                           * ACTUAL ERROR ADDRESS. DISPLAY THIS IN LOW-ORDER DI
                           *
                           *IF R21 AND R22 ARE SET UP ENTER AT HALTR.
                           *
                           *MEMERR LEAVES ACC AS IS AT HALT, HALTR PUTS QL INTO
                           * ACC AT HALT (QL MUST BE SET UP BEFORE JMP HALTR).
                           *
 0255 07                   MEMERR   LR QL,A
 0256 11                            LR H,DC
 0257 20FF                          LI H'FF'
 0259 CB                            AS HL              DECREMENT LOW ORDER DIGITS
 025A 6A                            LISL LOORL
 025B 5C                            LR S,A
 025C 25CC                          CI SYNC
 025E 9403       0262               BNZ HALTR
 0260 70                            CLR
 0261 5C                            LR S,A             LOAD ZEROES INSTEAD OF SYNC
 0262 68                   HALTR    LISL CONTL
 0263 2080                          LI H'80'           SET RED LIGHT.
 0265 5C                            LR S,A
 0266 2802C0     02C0               PI LDISP           SEND ERROR TO LOCAL DISPLAY
 0269 280280     0280               PI RDISP           REMOTE DISPLAY.
 026C 03                            LR A,QL            LOAD ADD WITH OFFENDING PAT
 026D 90FF       026D               BR *               GIVE UP.
                           *

... MICROSYSTEMS DIVISION - F8 NATIVE ASSEMBLER (REV 2.0)
... MONITOR-PART    9 SEP 76-6:00
S.  LOC OBJECT ADDR LINE               SOURCE STATEMENT

                                        EJECT
                                        ORG RDISP0
                           *REMOTE DISPLAY ROUTINE. R20-22 SET UP AS FOR
                           * LOCAL DISPLAY. WAIT AT LEAST 11*128 MICRO-SECS BET
                           * R0 USED FOR SCRATCH.
                           *
 0280 08                   RDISP    LR K,P
 0281 20CC                          LI SYNC            PICK UP SYNC.
 0283 2740                          OUT PRT40
 0285 2096                                LI 150
 0287 50                                  LR R0,A
 0288 30                                  DS R0
 0289 94FE       0288                     BNZ *-1      APP. 128 MICRO-SEC.
 028B 20CC                          LI SYNC
 028D 2740                          OUT PRT40
 028F 2096                                LI 150
 0291 50                                  LR R0,A
 0292 30                                  DS R0
 0293 94FE       0292                     BNZ *-1
 0295 62                            LISU LEDBNK
 0296 6A                            LISL LOORL
 0297 4E                            LR A,D             SEND LOW ORDER.
 0298 2740                          OUT PRT40
 029A 2096                                LI 150
 029C 50                                  LR R0,A
 029D 30                                  DS R0
 029E 94FE       029D                     BNZ *-1
 02A0 4E                            LR A,D             SEND HIGH ORDER.
 02A1 2740                          OUT PRT40
 02A3 2096                                LI 150
 02A5 50                                  LR R0,A
 02A6 30                                  DS R0
 02A7 94FE       02A6                     BNZ *-1
 02A9 4C                            LR A,S
 02AA 2740                          OUT PRT40          SEND CONTROL.
 02AC 2096                                LI 150
```

```
02AE 50             0769           LR R0,A
02AF 30             0770           DS R0.
02B0 94FE     02AF  0771           BNZ *-1
02B2 0C             0772           PK

FAIRCHILD MICROSYSTEMS DIVISION - F8 NATIVE ASSEMBLER (REV 2.0)
SMART SCANNER MONITOR-PART 1-9 SEP 76-6:00
ERRS  LOC OBJECT ADDR LINE                 SOURCE STATEMENT

                    0773           EJECT
                    0774 *
                    0775           ORG LDISPO
                    0776 *
                    0777 *LOCAL DISPLAY ROUTINE.
                    0778 *
                    0779 *         DIGITS AND CONTROL ARE HELD IN SCRATCHPAD R
                    0780 *ON EXIT ISAR POINTS AT CONTROL BITS.
                    0781 *
02C0 08             0782 LDISP     LR K,P
02C1 62             0783           LISU LEDBNK
02C2 6A             0784           LISL LOORL
02C3 4E             0785           LR A,D
02C4 18             0786           COM           DIGITS MUST BE COMPLEMENTED
02C5 2724           0787           OUT LED
02C7 2625           0788           IN LEDC
02C9 2301           0789           XI BIT0       SET BIT 0.
02CB 2725           0790           OUT LEDC
02CD 2301           0791           XI BIT0       TOGGLE BIT 0.
02CF 2725           0792           OUT LEDC      PULSE BIT 0 TO LATCH DATA.
02D1 4E             0793           LR A,D
02D2 18             0794           COM           COMPLEMENT HIGH-ORDER DIGIT
02D3 2724           0795           OUT LED
02D5 2625           0796           IN LEDC
02D7 2302           0797           XI BIT1       SET BIT 1.
02D9 2725           0798           OUT LEDC      PULSE BIT 1.
02DB 4C             0799           LR A,S         (BITS 0 AND 1 ALWAYS OFF).
02DC 2725           0800           OUT LEDC     SEND CONTROL BITS.
02DE 0C             0801           PK

FAIRCHILD MICROSYSTEMS DIVISION - F8 NATIVE ASSEMBLER (REV 2.0)
SMART SCANNER MONITOR-PART 1-9 SEP 76-6:00
ERRS  LOC OBJECT ADDR LINE                 SOURCE STATEMENT

                    0802           EJECT
                    0803 *
                    0804           ORG DLAYO
                    0805 *
                    0806 *DELAY ROUTINE. DELAY IS 1 MILLISECOND * # IN R6.
                    0807 *         R0 USED FOR SCRATCH.
                    0808 *
02F0 08             0809 DLAY      LR K,P
02F1 2064           0810           LI 100
02F3 50             0811           LR R0,A
02F4 30             0812           DS R0
02F5 94FE     02F4  0813           BNZ *-1       10 MICRO INNER LOOP.
02F7 36             0814           DS R6
02F8 94F8     02F1  0815           BNZ *-7       1000 MICRO OUTER LOOP.
02FA 0C             0816           PK
                    0817 *
                    0818           END           END FIRST TAPE.

FAIRCHILD MICROSYSTEMS DIVISION - F8 NATIVE ASSEMBLER (REV 2.0)
SMART SCANNER MONITOR-PART 1-9 SEP 76-6:00
SYMBOL TYP RL  VAL        REFERENCES

BEG      L 01 0102
BMEM     A 00 3000  0337
BIT0     A 00 0001  0791  0789
BIT1     A 00 0002  0797
CHAD     L 01 024C  0508  0388
CHADL    L 01 024E  0702
CHCH     L 01 0233  0500  0490  0381  0372
CHCHL    L 01 0237  0679
```

```
CHCN      L 01 0228  0480  0470  0420  0363  0354
CHCNL     L 01 022C  0666
CHDC      L 01 023F  0438  0429
CHDCL     L 01 0243  0692
CHKDIG    A 00 0011  0163  0158  0153  0148  0142  0137  0132
CHKHL     L 01 005F  0164  0159  0154  0149  0143  0138  0133
CHKSUMD   L 01 0015
CHR0      L 01 0063  0162  0157  0152  0147  0141  0136  0131
CHR0L     L 01 0068  0183  0181
COMPDIA   A 00 0015
COMPEDGE  A 00 0014
CONTL     A 00 0000  0725
DLAYO     A 00 02F0  0804
DLAY      L 01 02F0  0299
EXTSW     A 00 0028  0533
HALTR     L 01 0262  0722  0341  0278  0168
HIORL     A 00 0001  0454  0345  0191  0125
HL        A 00 000B  0718
HU        A 00 000A
ICONT     A 00 000E
IHIADD    A 00 000C
ILOADD    A 00 000D
IOPDG     L 01 0072  0165  0124
ITIME     A 00 000F
JREG      A 00 0009
LDISPO    A 00 02C0  0775
LDISP     L 01 02C0  0728  0319  0295
LED0      L 01 00DC  0309
LED1      L 01 00E2
LEDBNK    A 00 0002  0783  0752  0536  0283  0118
LED       A 00 0024  0795  0787
LEDC      A 00 0025  0800  0798  0796  0792  0790  0788
LEDDG     L 01 00D3  0273
LOORL     A 00 0002  0784  0753  0719  0537  0313  0300  0284
MEMERR    L 01 0255  0700  0689  0676  0664
MRKBIT    A 00 0080  0534
MRKSYS    A 00 0001  0531
PORT0     A 00 0000  0639  0624  0619  0600  0265  0212  0211  0207
                     0206
PORT1     A 00 0001  0643  0641  0635  0633  0623  0621  0614  0612
                     0604  0602  0595  0593  0266  0228  0227  0222  0221
                     0199
PORT4     A 00 0004  0267
PORT5     A 00 0005  0268
PORT6     A 00 0006  0103
PORT7     A 00 0007  0108
PORT8     A 00 0008  0269  0244  0243  0239  0238
PORT9     A 00 0009  0270  0259  0258  0254  0253
PORTC     A 00 000C
PORTD     A 00 000D
FOPTE     A 00 000E  0104
ORTF      A ( 30 000F  0109
PRECBI    A 00 0403  0543
PRECB     L 01 01C0  0453

   ...ILD MICROSYSTEMS DIVISION - F8 NATIVE ASSEMBLER (REV 2 0)
   ...ER MONITOR-PART    9 SEP 76-6:00
   ...L TYP RL  VAL            REFERENCES

..ERI     L 01 00B0  0231  0225  0214  0209
..ERR     L 01 00CF  0261  0256  0246  0241
.ROM0     A 00 0000  0099  0024
.ROM1     A 00 4000  0144
..OMINKI  A 00 0200  0130
.RT14     A 00 0014
.RT15     A 00 0015
.RT20     A 00 0020
.RT21     A 00 0021
PRT24     A 00 0024  0271
.RT25     A 00 0025  0272  0105
.RT40     A/ 00 0040  0767  0761  0755  0747  0741  0106
PRT44     A 00 0044
PRT45     A 00 0045
```

```
R0          A 00 0000  0812  0811  0770  0769  0764  0763  0758  0757
                       0750  0749  0744  0743  0518  0456  0252  0237  0205
                       0195  0182  0173
R1          A 00 0001  0691  0686  0678  0673  0665  0661  0644  0637
                       0626  0616  0605  0597  0567  0563  0555  0552  0257
                       0242  0226  0210  0197  0180  0175
R2          A 00 0002  0687  0674  0662  0617  0598  0564  0553  0498
                       0488  0478  0468  0436  0427  0419  0379  0370  0361
                       0352  0308  0291
R3          A 00 0003  0517  0515  0505  0495  0485  0475  0465  0460
R4          A 00 0004  0642  0624  0622  0613  0603  0594  0407  0340
R5          A 00 0005  0632  0611  0592  0409  0342
R6          A 00 0006  0814  0640  0620  0601  0411  0344  0298
R7          A 00 0007
R8          A 00 0008  0529  0179  0178  0176
RAM         A 00 0800  0457
RFMCT       A 00 0004  0455
RAMDG       L 01 0171
RDIAN       A 00 0045
RDISPO      A 00 0280  0734
RDISP       L 01 0280  0729  0320  0296
RECAB       A 00 0020
RECALJ      L 01 01D6  0535  0532
RDOSE       A 00 0014
RLED        A 00 0040
RMAD        L 01 01EC  0507
RMADL       L 01 01EE  0577
RMCH        L 01 01E2  0499  0489
RMCHL       L 01 01E6  0568
RMCN        L 01 01D9  0479  0469
RMCNL       L 01 01DD  0556
RMDGL       L 01 017A  0519
SBMDG       L 01 0145
STABNK      A 00 0005  0113
STAD        L 01 0217  0417  0387
STADL       L 01 021C  0646
START       L 01 0000
STCH        L 01 0204  0380  0371
STCHL       L 01 020C  0627
STCN        L 01 01F3  0437  0428  0362  0353
STCNL       L 01 01FC  0606
SYNC        A 00 00CC  0746  0740  0721
SYNCPORT    A 00 0005  0530
UPOK        A 00 0050
00 ERRORS

  MICROSYSTEMS DIVISION - F8 NATIVE ASSEMBLER (REV 2.0)
  SMART SCANNER MONITOR-PART 2-10 SEP 76-9:00
  ERS  LOC OBJECT ADDR LINE                 SOURCE STATEMENT

                0001             TITLE 'SMART SCANNER MONITOR-PART 2-10 SEP
                0002  *
                0003  *THIS TAPE CONTAINS THE REAL-TIME ROUTINES OF THE SY
                0004  * (CALIBRATION, LOG READS, DIAMETER LOOKUP).
                0005  *
           0001 0006  FDIA      EQU    1              DIFF TO AVOID REDISPLAY.
           001F 0007  HIBO      EQU    31
                0008  *
                0009  *ROUTINES IN THIS TAPE: -
                0010  *
           0400 0011  PRECBO    EQU    H'0400'
           0500 0012  LOGRDT    EQU    H'0500'     LOG READ TIMER ADDRESS.
           0504 0013  DKCURT    EQU    LOGRDT+H'04' DARK CURRENT TIMER ADDRE
           0508 0014  DK2T      EQU DKCURT+H'04'DARK CURRENT THROW-AWAY RO
           050C 0015  CALIBT    EQU    DK2T+H'04'     CALIBRATION TIMER ADDRE
           0580 0016  LOGRDR    EQU    LOGRDT+H'80'     LOG READ ROUTINE.
           0584 0017  DKCURR    EQU    DKCURT+H'80'DARK CURRENT ROUT INE.
           0588 0018  DK2R      EQU    DK2T+H'80'
           058C 0019  CALIBR    EQU    CALIBT+H'80'     CALIBRATION ROUTINE.
           0500 0020  CALSTRT   EQU    H'0500'   SEPARATE FROM.
           0590 0021  SUBS      EQU    CALIBR+H'04'
                0022  *
                0023  *
           0005 0024  CALIBH    EQU    CALIBR/256
```

```
008C   CALIBL   EQU   CALIBR-(CALIBH*256)
0005   DKCURH   EQU   DKCURR/256
0084   DKCURL   EQU   DKCURR-(DKCURH*256)
0005   DK2H     EQU   DK2R/256
0088   DK2L     EQU   DK2R-(DK2H*256)
0005   LOGRDH   EQU   LOGRDR/256
0050   LOGRDL   EQU   LOGRDR-(LOGRDH*256)
       *
       *THESE ADDRESSES ARE IN OTHER TAPES.
       *
0280   RDISP    EQU   H'0280'
02C0   LDISP    EQU   H'02C0'
02F0   DLAY     EQU   H'02F0'
4400   PROCL    EQU   H'4400'
45E0   RDSW     EQU   H'45E0'
0300   CONVTAB  EQU   H'0300'
0003   CONVH    EQU   CONVTAB/256
4288   TIMTABM  EQU   H'4288'
4600   DTAB     EQU   H'4600'
0046   DTABH    EQU   DTAB/256
0080   FAIRBUG  EQU   H'8080'
4200   INTTIMTB EQU   H'4200'
4210   SIGDIFTB EQU   H'4210'
4230   LIGLEVTB EQU   H'4230'
```

```
FAIRCHILD MICROSYSTEMS DIVISION - F8 NATIVE ASSEMBLER (REV 2.0)
CARPET MONITOR-PART 2-10 SEP 76-9:03
PAGE  LOC OBJECT ADDR LINE              SOURCE STATEMENT

              EJECT
       *
0001   BIT0     EQU   1
0002   BIT1     EQU   2
0004   BIT2     EQU   4
       *
0000   R0       EQU   0
0001   R1       EQU   1
0002   R2       EQU   2
0003   R3       EQU   3
0004   R4       EQU   4
0005   R5       EQU   5
0006   R6       EQU   6
0007   R7       EQU   7
0008   R8       EQU   8
0009   JREG     EQU   9
000A   HU       EQU   10
000B   HL       EQU   11
       *
0002   LEDBNK   EQU   2          LED CONTROL BANK (SCRATCHPA
0000   CONTL    EQU   0
0001   HIORL    EQU   1
0002   LOORL    EQU   2
0003   DIAPTR   EQU   3
0005   GOODA    EQU   5
0006   DIMA     EQU   6
0007   ZCON     EQU   7          COUNT OF ZEROES NEEDED TO R
       *
0003   PROCLB   EQU   3          UPPER ISAR DIGIT.
0004   NSDIF    EQU   4
0005   PSDIF    EQU 5
0006   NSJMP    EQU   6          NEGATIVE LOG JUMP.
0007   PSJMP    EQU   7          POSITIVE LOG JUMP.
       *
0004   DIFBNK   EQU   4          AVERAGE DIAMETER BANK.
0007   INITPTR  EQU   7          INITIAL POINTER.
       *
0005   STABNK   EQU   5
0000   SWWRD    EQU   0
0001   SLBGDB   EQU   H'01'      SAVE BGD BIT.
0002   SLRDB    EQU   H'02'      SAVE LAST READ BIT.
0001   SPORT1   EQU   1
0002   SPORT4         EQU      2
0003   SPORT40        EQU      3
0004   SPORT5   EQU   4
```

```
0005 0094  SAVBG      EQU   5
0800 0095  SLBGD      EQU   H'800'
0900 0096  SLRD       EQU   H'900'

      IPOSYSTEMS DI   ION - F8 NATIVE ASSEMBLER   REV 2.0)
      MONITOR-PART 2-10 SEP 76-9:00
      OBJECT ADDR LINE               SOURCE STATEMENT

          0097             EJECT
0000 0098  PORT0      EQU   0
0001 0099  PORT1      EQU   1
0002 0100  IBIT       EQU   H'02'
0008 0101  NOBGD      EQU   H'08'
000A 0102  CIB IT       EQU   IBIT+NOBGD
0080 0103  WROK       EQU    H'80'
0004 0104  EXTSN      EQU   4
0005 0105  SYNCPORT     EQU   5
0001 0106  MRKSYS     EQU   H'01'
0080 0107  SYNCBIT      EQU   H'80'
     0108  *
0040 0109  AUTOR      EQU   H'40'      AUTO-RECALIBRATE.
0010 0110  AUTOD      EQU   H'10'      AUTO-DISPLAY.
0020 0111  RECAB      EQU   H'20'      RECALIBRATE NOW.
0008 0112  DISPNOW    EQU   H'08'      DISPLAY NOW.
     0113  *
0008 0114  PORT8      EQU   8
0040 0115  ENDCH      EQU H'40'
0009 0116  PORT9      EQU   9
000C 0117  IHIADD     EQU   H'0C'
000D 0118  ILOADD     EQU   H'0D'
000E 0119  ICONT      EQU   H'0E'
000F 0120  ITIME      EQU   H'0F'
0014 0121  COMPEDGE EQU     H'14'
0015 0122  COMPDIA    EQU   H'15'
0040 0123  PRTSW      EQU   H'40'
0080 0124  MRKBIT     EQU   H'80'
0040 0125  MANBIT     EQU   H'40'
0038 0126  SIGDIF     EQU   H'38'
0007 0127  LIGHTLEV EQU     H'07'
     0128  *
5000 0129  ADMEM      EQU   H'5000'
5040 0130  SGMEM      EQU   ADMEM+64

      MICROSYSTEMS DIVISION - F8 NATIVE ASSEMBLER (REV 2.0)
      MONITOR-PART 2-10 SEP 76-9:00
      OBJECT ADDR LINE               SOURCE STATEM

                   0131            EJECT
                   0132            ORG PRECEO
                   0133  *RE-CALIBRATION SET UP.
                   0134  *
0400 1A            0135  RECAL     DI
0401 71            0136            LIS 1
0402 53            0137            LR F8,A          SET FLAG=1 FOR RECAL.
0403 2005          0138  PRECB1     LI 5
0405 50            0139            LR F0,A          COUNT FOR COMP BOARD WAIT.
0406 A1            0140  PRECB2    INS PORT1
0407 2180          0141            NI WROK
0409 8404     040E 0142            BZ PRECB3        OK TO WRITE.
040B 30            0143            DS R0
040C 94F9     0406 0144             BNZ PRECB2       WAIT ONLY 124 MICROS.
040E 70            0145  PRECB3    CLR              WRITE OUT ANYWAY.
040F 2715          0146            OUT  COMPDIA
0411 2080          0147            LI H'80'         SEND LARGEST EDGE.
0413 2714          0148            OUT  COMPEDGE    OUTPUT ZERO DIAMETER.
0415 78            0149            LIS NOBGD
0416 B1            0150            OUTS PORT1        SET TO USE ZERO BACKGROUND
                   0151  *
0417 62            0152            LISU LEDBNK
0418 6A            0153            LISL LOORL
0419 70            0154            CLR
041A 5E            0155            LR D,A
041B 5E            0156            LR D,A
041C 2260          0157            LI H'60'         YELLOW AND GREEN.
```

```
041E 5C                          LR S,A
041F 2802C0 02C0                 PI LDISP
0422 280280 0280                 PI RDISP
                         *
0425 64                          LISU DIABNK
0426 6F                          LISL INITPTR
0427 70                          CLR
0428 5E                  AVDLI   LR D,A
0429 8FFE   0428                 BR7 AVDLI          INIT D/A BANK TO ALL ZEROES
042B 0A                          LR A,IS
042C 62                          LISU LEDBNK
042D 6B                          LISL DIAPTR
042E 5C                          LR S,A             SAVE POINTER.
                         *
042F 2640                        IN PRTSN           CHECK FOR MANUALLY SET TIME
0431 65                          LISU STABNK
0432 6B                          LISL SPORT40
0433 5C                          LR S,A             SAVE SWITCH SETTINGS.
0434 2140                        NI MANBIT
0436 9433   046A                 BNZ MANTIM         MANUAL TIME.
                         *
0438 2A4230 4230                 DCI LIGLEVTB       LOOKUP LIGHT LEVEL REQUIRED
043B 62                          LISU LEDBNK
043C 6D                          LISL GOODA
043D 2640                        IN PRTSN
043F 2107                        NI LIGHTLEV
0441 8E                          ADC                  INDEX TABLE
0442 16                          LM
0443 5D                          LR I,A             GOODA
0444 12                          SR 1
0445 5C                          LR S,A             DIM AVG.
                         *
0446 48                          LR A,R8
0447 F8                          NS R8
0448 9431   047A                 BNZ   RECALS       THIS IS A RECAL.

... MICROSYSTEMS DIVISION - F8 NATIVE ASSEMBLER (REV 2.0)
... -PART ... 76-9 00
... OBJECT CODE LINE              SOURCE STATEMENT

[illegible] 70                   CLR
[illegible] 51                   LR R1,A            0-4 MS CHUNKS.
[illegible] 53                   LR R3,A            THIS IS DECREMENTED BY TIME
044D 20F4                        LI H'F4'           256 MICROS:
044F 52                          LR R2,A
0450 78                  FULCAL  LIS 8
0451 50                          LR R0,A            BINARY SEARCH FACTOR.
0452 2018                        LI 24
0454 55                          LR R5,A            COUNT OF CALIB TIMES.
                         *
0455 42                          LR A,R2
0456 BF                          OUTS ITIME         OUTPUT TIMER INTERVAL.
0457 2005                        LI  CALIBH
0459 BC                          OUTS IHIADD
045A 208C                        LI CALIBL
045C BD                          OUTS ILOADD        SET UP INTERRUPT VECTOR.
045D 73                          LIS H'03'
045E BE                          OUTS ICONT         ENABLE TIMER INTERRUPTS.
                         *
                         *WAIT FOR CHARGE CYCLE AND ENABLE INTERRUPTS WHEN IT
                         *
045F 70                          CLR
0460 B8                          OUTS PORT8
0461 B9                          OUTS PORT9         CLEAR VIDEO PORTS.
0462 A9                  PRE2    INS PORT9
0463 2101                        NI BIT0
0465 84FC   0462                 BZ PRE2
0467 1B                          EI
0468 90FF   0468                 BR *               INTERRUPT WILL START CALIB
                         *
046A 2A4200 4200         MANTIM  DCI INTTIMTB
046D 2640                        IN PRTSN
046F 2107                        NI LIGHTLEV        PICK UP INDEX.
0471 13                          SL 1               2 WORD ENTRIES.
```

```
0472 8E                      ADC                        4 MS CHUNKS.
0473 16                      LM
0474 51                      LR R1, A
0475 53                      LR R3,A
0476 16                      LM
0477 52                      LR R2,A                    FRACTIONAL PART.
0478 90D7     0450           BR FULCAL                  TIMES SET.
                     *
047A 41             RECALS   LR A,R1
047B 53                      LR R3,A                    USE OLD VALUES.
047C 90D3     0450           BR FULCAL

    ISION - F8 NATIVE ASSEMBL.   (REV 2 0)
    NITOR-PART 2-10 SEP 76-9:00
    OBJECT ADDR LINE                 SOURCE STATEMENT

                             EJECT
                     *DARK CURRENT TIMER ROUTINE.  THIS ROUTINE IS ESSENT
                     *SAME AS THE TIMER USED BY CALIBRATION AND LOG READS
                     *DIFFERENCE IS A WAIT OF 100 MICRO-SECS AFTER ASSERT
                     *2,3,AND 6 OF PORT 8 TO END THE CHARGE CYCLE.
                     *
047E 1E             DTIMER   LR J,W
047F 33                      DS R3
0480 9103     0484           BM DTIMED                  DONE.
0482 901D     04A0           BR DTIMEX                  EXIT.
                     *
0484 71             DTIMED   LIS BIT0
0485 BE                      OUTS ICONT                 DISABLE TIMER, ENABLE VIDEO
0486 A1                      INS PORT1
0487 2102                    NI IBIT
0489 940A     0494           BNZ DTIMEB                 BUFFER INTERLOCKED.
048B A1                      INS PORT1
048C 2301                    XI BIT0
048E 210F                    NI H'0F'                   DON'T TOUCH LEFT HALF.
0490 B1                      OUTS PORT1
0491 2301                    XI BIT0
0493 B1                      OUTS PORT1                 PULSE TO CLEAR A/D BUFFER.
                     *
0494 204C           DTIMEB   LI H'4C'                   BITS 2,3,6.
0496 B8                      OUTS PORT8
0497 200D                    LI 13
0499 50                      LR R0,A
049A 30                      DS R0
049B 94FE     049A           BNZ *-1                    DELAY 130 MICROS.
049D 290526   0526           JMP TIMEE                  TIMER EXIT CODE.
04A0 4B             DTIMEX   LR A,HL
04A1 1D                      LR W,J                     RESTORE STATUS.
04A2 1B                      EI
04A3 1C                      POP

    SYSTEMS DIVISION - F8 NATIVE ASSEMBLER (REV 2 0)
    MONITOR-PART 2-10 SEP 76-9:00
    OBJECT ADDR LI                   SOURCE STA    MENT

                             EJECT
                     *ROUTINE TO PROCESS DARK CURRENT. RESET INTERRUPT
                     * NEXT READING WILL BE PROCESSED BY DK2 (THROWN-AWAY
                     * DARK CURRENT HAS BEEN READ IN AS A DIFFERENCE FROM
                     * BACKGROUND. COMPARE THIS WITH THE SIG JUMP ASKED F
                     * BY THE SWITCHES. IF THE JUMP EXTENDS DOWN INTO THE
                     * DARK CURRENT LEVEL THEN EXIT WITH A '7777' ERROR.
                     *
04A4 41             DKCUR    LR A,R1
04A5 53                      LR R3,A
04A6 42                      LR A,R2                    RESET TIMER COUNTS.
04A7 BF                      OUTS ITIME
04A8 2005                    LI DK2H
04AA BC                      OUTS IHIADD                NEXT INTERRUPT WILL GO TO DK
04AB 2088                    LI DK2L
04AD BD                      OUTS ILOADD
04AE 73                      LIS H'03'
04AF BE                      OUTS ICONT                 ENABLE TIMER.
```

```
04B0 2002          0290          LI IBIT
04B2 B1            0291          OUTS PORT1      SET INTERLOCK
04B3 1B            0292          EI
                   0293  *
04B4 2804C9 04C9   0294          PI    DKCURAV   RETURNS AVG VALUE IN R7.
04B7 63            0295          LISU PROCLB
04B8 6E            0296          LISL N5JMP
04B9 47            0297          LR A,R7
04BA CC            0298          AS S
04BB 62            0299          LISU LEDBNK     RESTORE ISAR.
04BC 8104    04C1  0300          BP    DKERR
04BE 29079A  079A  0301          JMP WAITLOOP
                   0302  *
04C1 2077          0303  DKERR   LI H'77'
04C3 6A            0304          LISL LOOPL
04C4 5E            0305          LR D,A
04C5 5E            0306          LR D,A
04C6 290699  0699  0307          JMP CALERE      ERROR EXIT.
                   0308  *
                   0309  *AVERAGING ROUTINE. DO A DOUBLE PRECISION SIGN [illegible]
                   0310  *ADD IN REGS 4 AND 5.  ADD UP 64 VALUES, SO THAT
                   0311  *FINAL HIGH-BYTE IS AVERAGE/4. SHIFT LEFT 2 PLACES
                   0312  *TO CORRECT THIS.
                   0313  *
04C9 08            0314  DKCURAV LR K,P
04CA 2A5002  5002  0315          DCI ADMEM+2
04CD 2040          0316          LI 64
04CF 50            0317          LR F0,A         R0 IS COUNTER.
04D0 70            0318          CLR
04D1 54            0319          LR R4,A
04D2 55            0320          LR R5,A         CLEAR SUMS.
                   0321  *
04D3 16            0322  DKCL    LM
04D4 57            0323          LR R7,A
04D5 C5            0324          AS R5
04D6 55            0325          LR R5,A         GENERATE LOW-BYTE.
04D7 44            0326          LR A,R4
04D8 19            0327          LNK
04D9 54            0328          LR R4,A         ADD CARRY TO HIGH-BYTE.
04DA 47            0329          LR A,R7
04DB F7            0330          NS R7
04DC 70            0331          CLR
04DD 8103    04E1  0332          BP DKAD         EXTEND SIGN.
04DF 20FF          0333          LI H'FF'

   [illegible] SYSTEMS DIVISION - F8 NATIVE ASSEMBLER (REV 2.0)
   [illegible] MONITOR-PART  10 SEP 79 [illegible]
   [illegible] OBJECT ADDR LINE                SOURCE STATEMENT

04E1 C4            0334  DKAD    AS F4
04E2 54            0335          LR R4,A         GENERATE HIGH BYTE.
04E3 73            0336          LIS 3
04E4 8E            0337          ADC             MOVE DC UP 4.
04E5 30            0338          DS R0
04E6 94EC    04D3  0339          BNZ DKCL        LOOP.
                   0340  *
                   0341  *R4 NOW HOLDS AVERAGE/4.
                   0342  *
04E8 44            0343          LR A,R4
04E9 13            0344          SL 1
04EA 13            0345          SL 1            MULTIPLY BY 4
04EB 57            0346          LR R7,A         RETURN RESULT IN R7.
04EC 0C            0347          PK
                   0348  *ROUTINE TO THROW AWAY THE FIRST READING AFTER DARK
                   0349  *IF BUFFER IS STILL INTERLOCKED, THEN JUST POP BACK
                   0350  *ELSE CHANGE INTERRUPT VECTOR TO GO TO LOGRD.
                   0351  *
04ED 1E            0352  DK2RR   LR J,W
04EE 41            0353          LR A,R1
04EF 53            0354          LR R3,A
04F0 42            0355          LR A,R2
04F1 BF            0356          OUTS ITIME
04F2 73            0357          LIS H'03'
04F3 BE            0358          OUTS ICONT
```

```
04F4 A1             0359            INS PORT1
04F5 2102           0360            NI IBIT
04F7 9437    052F   0361            BNZ    TIMEX      D C HAS NOT BEEN PROCESSED
04F9 2906FF  06FF   0362            JMP LOGRDP

    ... SYSTEMS DIVISION - F8 NATIVE ASSEMBLER (REV 2.0)
    ... MONITOR-PART 7-10 SEP 76-9:00
    ... OBJECT ADDR LINE                SOURCE STATEMENT

                    0363            EJECT
                    0364            ORG   LOGRDT     LOG READ TIMER-USE CALIB TI
0500 5B             0365            LR HL,A
0501 29050D  050D   0366            JMP TIMER
                    0367            ORG DKCURT
0504 5B             0368            LR HL,A
0505 29047E  047E   0369            JMP DTIMER        DARK CURRENT TIMER.
                    0370            ORG DK2T
0508 5B             0371            LR HL,A
0509 29050D  050D   0372            JMP TIMER
                    0373            ORG   CALIBT      CALIBRATION TIMER CODE.
050C 5B             0374            LR HL,A           FALL THROUGH TO TIMER CODE.
                    0375     *
                    0376     *TIMER INTERRUPT CODE.. R3 CONTAINS A COUNT OF FULL
                    0377     * (TIMER WAS INITIALIZED WITH A FRACTIONAL PORTION,
                    0378     * DECREMENT R3 UNTIL IT = -1).
                    0379     * WHEN COUNT EXPIRES, END CHARGE CYCLE, INITIALIZE A
                    0380     * AND ENABLE EXTERNAL INTERRUPTS.
                    0381     *
                    0382     ****NOTE-J AND HL ARE USED TO STORE W AND ACC*******
                    0383     *
                    0384     * ACCESS TO BUFFER IS CONTROLLED BY PORT1, BIT 1. IF
                    0385     * BIT IS SET, DO NOT RESET BUFFER. (PREVIOUS LOAD IS
                    0386     * BEING PROCESSED).
                    0387     *
050D 1E             0388     TIMER  LR J,W
050E 33             0389            DS R3             DECREMENT COUNT OF FULL SEG
050F 9103    0513   0390            BM TIMED          DONE.
0511 901D    052F   0391            BR TIMEX          EXIT.
                    0392     *
0513 71             0393     TIMED  LIS BIT0
0514 BE             0394            OUTS ICONT        DISABLE TIMER,ENABLE VIDEO
0515 A1             0395            INS PORT1
0516 2102           0396            NI IBIT
0518 940A    0523   0397            BNZ TIMEB         BUFFER INTERLOCKED.
051A A1             0398            INS PORT1
051B 2301           0399            XI BIT0
051D 210F           0400            NI H'0F'          DON'T TOUCH LEFT HALF.
051F B1             0401            OUTS PORT1
0520 2301           0402            XI BIT0
0522 B1             0403            OUTS PORT1        PULSE TO CLEAR A/D BUFFER.
0523 2040           0404     TIMEB  LI ENDCH
0525 B8             0405            OUTS PORT8        FORCE END TO CHARGE CYCLE
0526 70             0406     TIMEE  CLR
0527 B8             0407            OUTS PORT8
0528 A5             0408            INS SYNCPORT
0529 2380           0409            XI SYNCBIT
052B B5             0410            OUTS SYNCPORT
052C 2380           0411            XI SYNCBIT
052E B5             0412            OUTS SYNCPORT       PULSE FOR EXTERNAL SYNC
052F 4B             0413     TIMEX, LR A,HL           RESTORE ACC.
0530 1D             0414            LR W,J            RESTORE STATUS.
0531 1B             0415            EI
0532 1C             0416            POP

    ... SYSTEMS DIVISION - F8 NATIVE ASSEMBLER (REV 2.0)
    ... MONITOR-PART 7-10 SEP 76-9:00
    ... OBJECT ADDR LINE                SOURCE STATEMENT

                    0417            EJECT
                    0418     *AVERAGE BACKGROUND ROUTINE.
                    0419     * LOOK AT 64 EVEN VALUES STARTING AT ADMEM+64.
                    0420     * RESULT SHOULD BE CLOSE TO 64*1/(GOODA/8) FULL=
                    0421     * =(GOODA)*256. CALC X=SUM OF VALUES/256.
                    0422     * RETURN R7=X-GOODA (A SIGNED DIFF FROM DESIRED AVG)
```

```
                        * RETURN R8=HIGH BYTE OF SUM (WILL BE AVG VALUE/4).
                        * R6,R8 USED FOR SCRATCH.
                        *
0533 08                 AVBG     LR K,P
0534 2A5040 5040                 DCI BGMEM
0537 2040                        LI 64
0539 56                          LR R6,A
053A 70                          CLR
053B 57                          LR R7,A        ; DOUBLE PRECISION ADDITION R
053C 58                          LR R8,A
                        *
053D 16                 AVBGL    LM
053E C8                          AS R8
053F 58                          LR  R8,A
0540 47                          LR A,R7
0541 19                          LNK
0542 57                          LR R7,A
0543 16                          LM             SKIP ODD CELLS.
0544 36                          DS R6          TEST COUNTER.
0545 94F7       053D             BNZ AVBGL
                        *
                        *NOW FIGURE OUT DIFFERENCE. R7=X.
                        *
0547 47                          LR A,R7
0548 65                          LISU STABNK
0549 6D                          LISL SAVBG
054A 5C                          LR S,A         SAVE THIS GOODIE.
054B 58                          LR R8,A        RETURN X IN R8.
054C 18                          COM
054D 62                          LISU LEDBNK
054E 6D                          LISL GOODA
054F CC                          AS S
0550 18                          COM
0551 57                          LR R7,A
0552 0C                          PK             RETURN.
```

FAIRCHILD MICROSYSTEMS DIVISION - F8 NATIVE ASSEMBLER (REV 2.0)
F8 MONITOR-PART -10 SEP 76-9.00.
LOC OBJECT ADDR LINE SOURCE STATEMENT

```
                                 EJECT
                        *LOGTB ROUTINE. DIAMETER COUNT(OUT OF 256) IS IN R8.
                        * TABLE IS STORED AT DTAB. EACH ENTRY IS 2 WORDS LON
                        * SET UP FOR DECIMAL DIAMETER LED DISPLAYS.
                        * USE Q-REGS AS SCRATCH.
                        * RETURN FEEE IF COUNT IS TOO BIG.
                        *
0553 08                 LOGTB    LR K,P
0554 2A056F 056F                  DCI EES        ADDRESS EES.
0557 48                          LR A,R8
0558 2402                        AI 2           IS R8 > 254.
055A 820D       0568             BC LOGT2       YES-SHOW EEEE.
055C 48                          LR A,R8
055D F8                          NS R8          SET PLUS OR MINUS FLAG.
055E 2046                        LI  DTABH
0560 8102       0563             BP LOGT1       TEST FLAG.
                                                VALUE IS IN 2ND HALF OF TAB
0562 1F                          INC
0563 06                 LOGT1    LR QU,A
0564 48                          LR A,R8
0565 13                          SL 1           SHIFT BECAUSE OF 2 WORD ENT
0566 07                          LR QL,A
0567 0F                          LR DC,Q
0568 62                 LOGT2    LISU LEDBNK
0569 69                          LISL HIORL
056A 16                          LM
056B 5D                          LR I,A         LOAD HIGH-ORDER DIGITS.
056C 16                          LM
056D 5D                          LR I,A         LOAD LOW-ORDER DIGITS.
056E 0C                          PK
                        *
056F EE                 EES      DC H'EE'
0570 EE                          DC H'EE'
```

```
                      SOURCE STATEMENT
                             EJECT
                             ORG LOGRDR      LOG READ CODE.
        1B                   LR HL,A
        290713 0713          JMP LOGRD
                             ORG DKCURR      DARK CURRENT PROCESSING.
        1B                   LR HL,A
        2904A4 04A4          JMP DKCUR
                             ORG DK2R
05F8 5B                      LR HL,A
05F9 2904ED 04ED             JMP DK2RR
                             ORG CALIBR
05FC 5B                      LR HL,A
05FD 290600 0600             JMP CALIB
                   *
                             ORG CALSTRT     PUT OFF IN SEPARATE PROM.
                   *
                   *CALIBRATION-DOCUMENTATION REMOVED TO SAVE ROOM ON T
                   *
0600 1E            CALIB     LR J,W
0601 41                      LR A,R1
0602 53                      LR R3,A         SET OF COUNT OF MAX CHUNKS.
0603 42                      LR A,R2
0604 BF                      OUTS ITIME      SET UP TIME INTERVAL.
0605 73                      LIS H'03'
0606 BE                      OUTS ICONT      ENABLE TIMER INTERRUPTS.
0607 A1                      INS PORT1
0608 2102                    NI IBIT         SEE IF PREVIOUS HAS BEEN PR
060A 8405    0610            BZ CAL0
060C 4B                      LR A,HL         RETURN IF NOT DONE WITH
060D 1D                      LR W,J
060E 1B                      EI
060F 1C                      POP
0610 200A          CAL0      LI CIBIT
0612 B1                      OUTS PORT1
                   *
                   *NOW PROCESS THE PREVIOUS.
                   *
0613 35                      DS R5
0614 915F    0674            BM DECALB       DECIDE WHAT TO DO NEXT.
0616 1B                      EI              ELSE CONTINUE CALIBRATING
0617 845E    0676            BZ CATLIMB       END OF CALIBRATION.
0619 45                      LR A,R5
061A 2512                    CI 18
061C 9138    0655            BM CALWT0               E FIRST FEW.
061E 2101                    NI H'01'
0620 942A    064B            BNZ CALWT
                   *
0622 280533 0533             PI AVRG
0625 45                      LR A,R5
0626 2506                    CI 6
0628 8415    063E            BZ
0629 817A    06A5            BP
                   *
                   *PROCESS 4 MS. CHUNKS.
                   *
062C 47                      LR A,R7
062D F7                      NS R7
062E 8449    0678            BZ
0630 40                      LR
0631 8108    063A            BP
0633 C1            CAEND                     ELSE
0634 51                                      STORE
```

[illegible]

```
0635 40                CAENI    LR A,R0
0636 12                         SR 1                    STORE NEW FACTOR.
0637 50                         LR R0,A
0638 9012      064B             BR CALWT
                       *
0639 18                CASUB    COM
063A 1F                         INC
063B 90F6      0633             BR CAEND
                       *
                       *END 4 MS PROCESSING.
                       *
063E 47                CA4DN    LR A,R7
063F F7                         NS R7
0640 9102      0643             BM CATEI
0642 31                         DS R1                   ROUND DOWN
                       *
                       *SET UP Q-REGS TO POINT INTO TIMER TABLE. THESE MUST
                       * REMAIN POINTED THERE THROUGH THE REST OF CALIBRATI
                       *
0643 2A4288    4288    CATEI    DCI TIMTABM
0646 0E                         LR Q,DC                 POINT FIRST AT MIDDLE ELT.
0647 16                         LM                      PICK UP VALUE FROM TABLE.
0648 52                         LR R2,A                 SAVE IN R2.
0649 74                         LIS 4
064A 50                         LR R3,A                 RESET FACTOR TO ADD/SUB.
064B A9                CALWT    INS PORT9
064C 2101                       NI BIT0
064E 84FC      064B             BZ CALWT                WAIT FOR CHARGE CYCLE.
0650 2008                       LI NOBGD
0652 B1                         OUTS PORT1
0653 90FF      0653             BR *
                       *
0655 2514              CALWT0   CI 20
0657 94F3      064B             BNZ CALWT               NOT A CRUCIAL READING.
0659 65                         LISU STRENK
065A 68                         LISL SPORT40
065B 4C                         LR A,S                  NO-SEEK CAL?
065C 2140                       NI NANBIT
065E 2419      0678             BNZ CADONEB             IF SO THEN WE'RE DONE.
0660 48                         LR A,R8
0661 F8                         NS R8
0662 8408      066B             BZ CALWT1               WAS THIS RECAL?
0664 280533    0533             PI AVBG                 IF SO SEE IF THIS BGD IS OK
0667 47                         LR A,R7
0668 F7                         NS R7
0669 840E      0678             BZ CADONEB              YES-WE'VE SAVED TIME.
066B 2010              CALWT1   LI 16                   SET UP FOR 64 MS.
066D 51                         LR R1,A
066E 20F4                       LI H'F4'
0670 2002                       LI R2,A                 AND A SMALL FRACTION.
0672 90D8      064B             BR CALWT
                       *
0674 9067      06DC    DECALB   BR DECAL
0676 9044      06BB    CATLIMB  BR CATLIM
0678 904E      06C7    CADONEB  BR CADONE
                       *
                       *
                       *CALIBRATION ERRORS. 88 IF LIGHT LEVEL TOO HIGH,
                       * 99 IF LIGHT LEVEL TOO LOW. SEND CODE TO
                       * BOTH DISPLAYS.
                       * LIGHT YELLOW LIGHT IF AVERAGE BETWEEN 1/4 AND 1/2
                       * AT THE LONGEST CALIBRATION TIME.
```

```
[illegible]
LOC  OBJ    ADDR LINE        SOURCE STATEMENT

                 0614  *
067A 47          0615  CALERH  LR A,R7        DIFF FROM AVG.
067B F7          0616          NS R7
067C 913A   06C7 0617          BM CADONE      OK IF BELOW.
067E 48          0618          LR A,R8        AVG VALUE/4.
067F 253F        0619          CI H'3F'
0681 2066        0620          LI H'66'       ERROR CODE FOR ALL ONES.
0683 8411   0695 0621          BZ CALER
0685 2088        0622          LI H'88'
0687 900D   0695 0623          BR CALER
0689 6E          0624  CALERL  LISL DIMA
068A 62          0625          LISU LEDBNK
068B 4C          0626          LR A,S         LOAD DIM AVERAGE (POS NUMB
068C C7          0627          AS R7          ADD NEGATIVE DIFF FROM GOOD
068D 2099        0628          LI H'99'       LOAD ERROR CODE.
068F 9105   0695 0629          BM CALER       NOT ENOUGH LIGHT.
                 0630  *
0691 2054        0631          LI H'54'       YELLOW LIGHT FOR DIM.
0693 9035   06C9 0632          BR CADON
0695 6A          0633  CALER   LISL LOORL
0696 62          0634          LISU LEDBNK
0697 5E          0635          LR D,A
0698 5E          0636          LR D,A
0699 1A          0637  CALERE  DI
069A 2080        0638          LI H'80'        RED LIGHT.
069C 5C          0639          LR S,A
069D 2802C0 02C0 0640          PI LDISP
06A0 280290 0290 0641          PI RDISP
06A3 9035   06D9 0642          BR WJUMP
                 0643  *
                 0644  *CALIBRATE QUARTERS.
                 0645  *
06A5 47          0646  CAQMS   LR A,R7        TEST DIFF FROM DESIRED.
06A6 F7          0647          NS R7
06A7 841F   06C7 0648          BZ CADONE      RIGHT ON.
06A9 40          0649          LR A,R0
06AA 8109   06B4 0650          BP CAQSB
06AC 03          0651          LR A,QL
06AD C8          0652          AS R8
06AE 07          0653  CAQE1   LR QL,A
06AF 0F          0654          LR DC,Q
06B0 16          0655          LM
06B1 52          0656          LR R2,A
06B2 9082   0635 0657          BR CAEN1       EXIT THROUGH 4 NS CODE.
06B4 18          0658  CAQSB   COM
06B5 1F          0659          INC
06B6 58          0660          LR R8,A
06B7 03          0661          LR A,QL
06B8 C8          0662          AS R8
06B9 90F4   06AE 0663          BR CAQE1
                 0664  *
                 0665  *CHECK AGAINST YELLOW AND RED LIMITS.
                 0666  *
06BB 280533 0533 0667  CATLIM  PI AVBG
06BE 41          0668          LR A,R1
06BF 2500        0669          CI 0
06C1 84B8   067A 0670          BZ CALERH      TEST FOR TOO HIGH.
06C3 251F        0671          CI H1B0
06C5 84C3   0689 0672          BZ CALERL      TEST FOR TOO LOW.
06C7 2034        0673  CADONE  LI H'34'       LIGHT GREEN IF DONE EARLY.
06C9 68          0674  CADON   LISL CONTL
06CA 62          0675          LISU LEDBNK
```

```
FAIRCHILD MICROSYSTEMS DIVISION - F8 NATIVE ASSEMBLER (REV 2.0)
ORT SCANNER MONITOR-PART 2-10 SEP 76-9:00
ERRS  LOC OBJECT ADDR LINE                 SOURCE STATEMENT

 06CB 5C              0676          LR S,A
 06CC 2802C0 02C0     0677          PI LDISP
 06CF 280280 0280     0678          PI RDISP
 06D2 2845D0 45D0     0679          PI SAVBGD         SAVE BGD ROUTINE.
 06D5 70              0680          CLR
 06D6 7A              0681          LR HU,A           ZERO RECAL SWITCH.
 06D7 58              0682          LR R8,A           R8=PREVIOUS DIAMETER.
 06D8 55              0683          LR R5,A           THIS WILL FORCE IT TO GO TO
 06D9 ...             0684 WJUMP    JMP WAITLOOP      **THIS WILL ...

FAIRCHILD MICROSYSTEMS DIVISION - F8 NATIVE ASSEMBLER (REV 2.0)
... MONITOR-PART 2-10 SEP 76-9:00
ERRS  LOC OBJECT ADDR LINE                 SOURCE STATEMENT

                      0685          EJECT
                      0686 *DECISION TIME!!! IF THE SWITCHES INDICATE A ...
                      0687 * HALF OF SATURATION THEN DO NOT CHECK DARK CURRENT
                      0688 * DIRECTLY TO LOG READS. OTHERWISE PROCESS DARK CUR
                      0689 * TO SEE THAT IT DOES NOT INTERFERE WITH SIG DIFFS.
                      0690 *
 06DC 65              0691 DECAL    LISU STABNK
 06DD 6B              0692          LISL SPORT49
 06DE 4C              0693          LR A,S
 06DF 2140            0694          NI MANBIT         IF NO-SEEK DON'T CHECK D.C
 06E1 941D    06FF    0695          BNZ LOGRDP
 06E3 62              0696          LISU LEDBNK
 06E4 6D              0697          LISL GOODA
 06E5 4C              0698          LR A,S
 06E6 18              0699          COM
 06E7 2410            0700          AI 16             HALF OF SATURATION.
 06E9 8215    06FF    0701          BC LOGRDP         GO ON TO LOG READS IF LESS
                      0702 *
                      0703 *SET UP FOR DARK CURRENT.
                      0704 * FINISH UP A DELAY OF 128 BEFORE SETTING BITS 2 AND
                      0705 * OF PORT 8 IN ORDER TO PREVENT SHIFTING AND TRANSFE
                      0706 *
 06EB 2005            0707          LI DKCURH
 06ED BC              0708          OUTS IHIADD
 06EE 2024            0709          LI DKCURL
 06F0 BD              0710          OUTS ILOADD       SET UP INTERRUPT VECTOR.
 06F1 1B              0711          EI
 06F2 2004            0712          LI 4              **NOTE-CHANGE IF ABOVE CODE
 06F4 50              0713          LR R0,A
 06F5 30              0714          DS R0
 06F6 94FE    06F5    0715          BNZ *-1
                      0716 *
 06F8 7C              0717          LIS H'0C'
 06F9 B8              0718          OUTS PORT8        SET BITS 2 AND 3.
 06FA 2805C1 05C1     0719          PI RDSIG          READ SIG DIF SWITCHES.
 06FD 90DB    06D9    0720          BR WJUMP          WAITLOOP.
                      0721 *
 06FF A5              0722 LOGRDP   INS SYNCPORT
 0700 2101            0723          NI MRKSYS
 0702 940F    0712    0724          BNZ LOGRDP1       QUIT CAL IF NO MARKERS.
 0704 A4              0725          INS EXTSW
 0705 2140            0726          NI EJTOR
 0707 840A    0712    0727          BZ LOGRDP1        QUIT IF NOT AUTO-RECAL.
 0709 2640            0728          IN PRTSW
 070B 2180            0729          NI MRKBIT
 070D 8404    0712    0730          BZ LOGRDP1        QUIT IF LOG IN AREA.
 070F 290400 0400     0731          JMP RECAL         ELSE CALIBRATE AGAIN.
 0712 2005            0732 LOGRDP1  LI LOGRDH
 0714 BC              0733          OUTS IHIADD
 0715 2080            0734          LI LOGRDL
 0717 BD              0735          OUTS ILOADD
 0718 1B              0736          EI
 0719 90BF    06D9    0737          BR WJUMP          WAITLOOP.
```

```
                                EJECT
                 *LOGRD. ENTER HERE AT THE BEGINNING OF A CHARGE CY
                 * CONTROL). START TIMER WITH CALIBRATED VALUES.
                 * DURING EACH VIDEO CYCLE PROCESS THE RESULTS OF THE
                 *
071B 1E          LOGRD    LR J,W          SAVE STATUS.
071C 41                   LR A,R1
071D 53                   LR R3,A         INITIALIZE TIMER.
071E 42                   LR A,R2
071F BF                   OUTS ITIME      SET UP FOR FRACTIONAL PART
0720 73                   LIS H'03'       ENABLE TIMER INTERRUPTS.
0721 BE                   OUTS ICONT
0722 A1                   INS PORT1
0723 2102                 NI IBIT
0725 8405      072B       BZ LG1          OK TO PROCESS.
0727 4B                   LR A,HL
0728 1D                   LR W,J
0729 1B                   EI              ELSE CONTINUE PREVIOUS.
072A 1C                   POP
072B 2002        LG1      LI IBIT
072D B1                   OUTS PORT1      SET INTERLOCK BIT.
072E 1B                   EI
                 *
072F 2805C1 05C1          PI RDSIG        READ SIG DIF SWITCHES.
0732 2845E9 45E9          PI SAVCUR       SAVE THIS READING.
0735 284400 4400          PI PROCL        PROCESS PREVIOUS READING.
0738 2807C4 07C4          PI ONCONV       CONVERT TO OLD CNTS IN R4,R
073B 2005                 LI 5
073D 50                   LR R0,A         SET UP 124 MICRO WAIT.
073E A1          LCOM     INS PORT1
073F 2120                 NI KROK
0741 8404      0746       BZ LCOM1        OK TO WRITE.
0743 30                   DS R0
0744 94F9      073E       BNZ LCOM        DON'T WAIT TOO LONG.
0746 44          LCOM1    LR A,R4
0747 2714                 OUT COMPEDGE    OUTPUT EDGE (OUT OF
0749 A1                   INS PORT1
074A 2140                 NI H'40'        BIT 6=1 IF OUT OF 128.
074C 45                   LR A,R5
074D 9402      0750       BNZ LCOM2       TEST FLAG
074F 13                   SL 1
0750 2715        LCOM2    OUT COMPDIA     OUTPUT DIAMETER.
                 *
                 *
                 *PERFORM SWITCH TESTS
                 *
0752 A4                   INS EXTSW       READ CONSOLE SWITCHES.
0753 2140                 NI AUTOR
0755 8422      0778       BZ LCOM4        AUTO-RECAL OFF.
0757 47                   LR A,R7
0758 F7                   NS R7
0759 9466      07C0       BNZ LCOM6       NON-ZERO DIAMETER.
075B 48                   LR A,R8
075C F8                   NS R8
075D 8406      0764       BZ    LCOM3A    PREVIOUS ALSO ZERO.
075F 20FE                 LI -2           GET 2 MORE TO BE SURE LOG I
0761 5A                   LR HU,A         SET FLAG TO NON-ZERO VALUE.
0762 9015      0778       BR LCOM4
                 *
0764 4A          LCOM3A   LR A,HU
0765 21FF                 NI H'FF'
0767 8410      0778       BZ LCOM4        FLAG NOT SET.
```

```
... MICROSYSTEMS DIVISION - F8 NATIVE ASSEMBLER (REV 2.0)
... MONITOR-PART 2-10 SEP 75-9:00
... OBJECT ADDR LIN             SOURCE STATE

0764 1F           0800            INC
0765 39           0801            LR HU,A
0766 940C    0778 0802            BNZ LCOM4        NOT SURE YET.
076D A5           0803            INS SYNCPORT
076E 2101         0804            NI MRKSYS
0770 944C    07BD 0805            BNZ PRECBJ        RECAL IF NO MARKERS.
0772 2640         0806            IN PRTSN
0774 2180         0807            NI MRKBIT
0775 9446    07BD 0808            BNZ PRECBJ       ELSE ONLY IF AREA IS FREE.
                  0809  *
0778 A4           0810  LCOM4     INS EXTSN
0779 2110         0811            NI AUTOD
077B 940B    0787 0812            BNZ LCOM4A       IN AUTO-DISPLAY MODE.
077D A4           0813            INS EXTSW
077E 2108         0814            NI DISPNOW
0780 940D    078E 0815            BNZ LCOM5        DISPLAY NOW SET.
0782 280590  0590 0816            PI FL2
0785 9014    079A 0817            BR WAITLOOP      ENTER SELF-LOOP.
                  0818  *
0787 280590  0590 0819  LCOM4A    PI FL2          DO FLICKER CONTROL.
078A 820F    079A 0820            BC WAITLOOP      IF NO DIFF-DON'T UPDATE DIS
078C 9004    0791 0821            BR LCOM5A
                  0822  *
078E 280590  0590 0823  LCOM5     PI FL2
0791 280553  0553 0824  LCOM5A    PI LOGTB         LOOK UP DECIMAL DIAMETER.
0794 2802C0  02C0 0825            PI LDISP         SEND TO LOCAL DISPLAYS.
0797 280280  0280 0826            PI RDISP         SEND TO REMOTE DISPLAYS.
079A A9           0827  WAITLOOP  INS PORT9
079B 2101         0828            NI BIT0
079D 84FC    079A 0829            BZ WAITLOOP      WAIT FOR CHARGE CYCLE.
079F 70           0830            CLR
07A0 B1           0831            OUTS PORT1       CLEAR INTERLOCK FLAG.
07A1 65           0832            LISU STABNK
07A2 69           0833            LISL SPORT1
07A3 A1           0834            INS PORT1
07A4 5D           0835            LR I,A           SAVE PORT 1.
07A5 A4           0836            INS EXTSW
07A6 5D           0837            LR I,A           SAVE PORT 4.
07A7 2640         0838            IN PRTSN
07A9 5D           0839            LR I,A           PORT 40.
07AA A5           0840            INS SYNCPORT
07AB 5D           0841            LR I,A           PORT 5.
07AC A4           0842  CHECKR    INS EXTSN
07AD 2120         0843            NI RECRB         CHECK IF RECALIBRATION ...
07AF 940D    07BD 0844            BNZ PRECBJ       IF SO, DO IT.
07B1 A4           0845            INS EXTSW
07B2 81F9    07AC 0846            BP CHECKR        LOOP IF NO TTY ACTIVITY.
07B4 2064         0847            LI 100           ELSE DELAY 100 MS
07B6 56           0848            LR R6,A
07B7 2802F0  02F0 0849            PI DLAY
07BA 290080  0080 0850            JMP FAIRBUG      AND THEN GO TO FBUG.
07BD 290400  0400 0851  PRECBJ    JMP RECAL        RECALIBRATE.
                  0852  *
07C0 70           0853  LCOM6     CLR
07C1 5A           0854            LR HU,A
07C2 9083    0778 0855            BR LCOM4

... MICROSYSTEMS DIVISION - F8 NATIVE ASSEMBLER (REV 2.0)
... MONITOR-PART 2-10 SEP 75-9:00
.S  LOC OBJECT ADDR LINE            SOURCE STATEMENT

                  0856            EJECT
                  0857  *CONVERT NEW TO OLD COUNTS.
                  0858  * NEW EDGE(R5) AND DIAMETER(R7) CHANGED TO OLD (R4,R
                  0859  *
07C4 08           0860  ONCONV    LR K,P
07C5 2003         0861            LI CONVH
07C7 06           0862            LR QU,A
07C8 46           0863            LR A,R6
```

```
07C9 07              LR DL,A
07CA 0F              LR DC,Q
07CB 16              LM                  GET VALUE FROM TABLE.
07CC 54              LR R4,A
07CD 47              LR A,R7
07CE 07              LR DL,A
07CF 0F              LR DC,Q
07D0 16              LM
07D1 55              LR R5,A
07D2 0C              PK

        ...DIVISION - F8 NATIVE ASSEMBLER (REV 2.0)
        ...MONITOR-PART 3-10 SEP 76-9:00
        ...OBJECT ADDR LINE          SOURCE STATEMENT

                     EJECT
                     ORG   SUBS      USE UP SPACE IN TIMER FROM
               *FLICKER ROUTINE WHICH FIRST DOES AN AVERAGE OF THE
               *
               * THESE READINGS ARE KEPT IN A RING BUFFER, AND ARE
               * TO BY DIAPTR. FIRST STORE CURRENT READING, THEN DO
               * PRECISION ADD OF EIGHT, AND THEN DIVIDE THE RESUL
               * FOLLOW THIS BY THE USUAL FLICKER TEST.
               *
0590 08        FL2   LR K,P
0591 62              LISU LEDBNK
0592 6B              LISL DIAPTR
0593 4C              LR A,S
0594 0B              LR IS,A             GET PTR.
0595 47              LR A,R7
0596 5E              LR D,A              SAVE THE LATEST.
0597 0A              LR A,IS
0598 62              LISU LEDBNK
0599 6B              LISL DIAPTR
059A 5C              LR S,A              SAVE UPDATED PTR.
               *
               *USE R5,R0 TO HOLD SUM.
               *
059B 70              CLR
059C 55              LR R5,A
059D 50              LR R0,A
059E 64              LISU DIABNK
059F 6F              LISL INITPTR
05A0 4E        AVDL2 LR A,D
05A1 C0              AS R0
05A2 50              LR R0,A             GENERATE LOW BYTE.
05A3 45              LR A,R5
05A4 19              LNK
05A5 55              LR R5,A             HIGH BYTE COMES FROM CARRIES
05A6 8FF9  05A0      BR7 AVDL2           DO THIS 8 TIMES.
               *
               *DIVIDE BY 8 BY SHIFTING R0 RIGHT 3, SHIFTING R5 L...
               * AND THEN ADDING THE TWO. (ZEROES ARE SHIFTED IN.)
               *
05A8 40              LR A,R0
05A9 12              SR 1
05AA 12              SR 1
05AB 12              SR 1
05AC 50              LR R0,A
05AD 45              LR A,R5
05AE 15              SL 4
05AF 13              SL 1
05B0 C0              AS R0
05B1 57              LR R7,A             RESULT IN R7.
               *
05B2 18              COM
05B3 1F              INC
05B4 C8              AS R8   ACC=OLD-NEW.
05B5 8103  05B9      BP FL21
05B7 18              COM
05B8 1F              INC
05B9 18        FL21  COM               ON ENTRY ACC HAS ABS VAL.
05BA 2402            AI FDIA+1         COMPARE WITH REQUIRED DIFF.
```

```
05BC 8203    05C0 0932          BC FL2P         NOT ENOUGH.
05BE 47           0933          LR A,R7
05BF 58           0934          LR R8,A
05C0 0C           0935  FL2P    PK              CARRY SET IF NO UPDATE DONE.

FAIRCHILD MICROSYSTEMS DIVISION - F8 NATIVE ASSEMBLER (REV 2.0)
SCANNER MONITOR-PART 2-10 SEP 76-9:00
PASS  LOC OBJECT ADDR LINE         SOURCE STATEMENT

                  0936          EJECT
                  0937  *READ SIG DIFFS ROUTINE.
                  0938  *
05C1 08           0939  RDSIG   LR K,P
05C2 2A4210 4210  0940          DCI SIGDIFTB    ADDRESS TABLE.
05C5 63           0941          LISU PROCLB     ADDRESS SCRATCHPAD.
05C6 6C           0942          LISL NSDIF
05C7 2540         0943          IN PRTSW
05C9 2138         0944          NI SIGDIF       READ SWITCHES.
05CB 12           0945          SR 1            TURN INTO INDEX.
05CC 8E           0946          ADC
05CD 16           0947          LM
05CE 5D           0948          LR I,A          NSDIF
05CF 16           0949          LM
05D0 5D           0950          LR I,A          PSDIF
05D1 16           0951          LM
05D2 5D           0952          LR I,A          NSJMP
05D3 16           0953          LM
05D4 5D           0954          LR I,A          PSJMP
                  0955  *
                  0956  *IF DIM-HALVE THE DIFFS REQUIRED.
                  0957  *
05D5 62           0958          LISU LEDENK
05D6 68           0959          LISL CONTL
05D7 4C           0960          LR A,S
05D8 2160         0961          NI H'60'
05DA 2540         0962          CI H'40'        SEE IF ONLY YELLOW IS ON.
05DC 940A    05E7 0963          BNZ RDPOP
05DE 63           0964          LISU PROCLB
05DF 6C           0965          LISL NSDIF
05E0 4C           0966          LR A,S
05E1 12           0967          SR 1
05E2 5C           0968          LR S,A
05E3 6E           0969          LISL NSJMP
05E4 4C           0970          LR A,S
05E5 12           0971          SR 1
05E6 5C           0972          LR S,A
05E7 0C           0973  RDPOP   PK

FAIRCHILD MICROSYSTEMS DIVISION - F8 NATIVE ASSEMBLER (REV 2.0)
SCANNER MONITOR-PART 2-10 SEP 76-9:00
PASS  LOC OBJECT ADDR LINE         SOURCE STATEMENT

                  0974          EJECT
                  0975          ORG   H'45D0'   PUT OUT IN LAST PROM******
                  0976  *
                  0977  *SAVE ROUTINES. CHOICE OF LAST BGD OR LAST READ.
                  0978  *
45D0 08           0979  SAVBGD  LR K,P          SAVE BGD ROUTINE.
45D1 65           0980          LISU STAENK
45D2 68           0981          LISL SWWRD      CHECK SWITCHES.
45D3 4C           0982          LR A,S
45D4 2101         0983          NI SLBGDB
45D6 8411    45E8 0984          BZ SAVBGP       NO SAVING REQUIRED.
45D8 2A0800 0800  0985          DCI SLBGD
45DB 2C           0986  SAVENT  XDC
45DC 70           0987          CLR
45DD 50           0988          LR R0,A         256 COUNTER.
45DE 2A5000 5000  0989          DCI ADMEM
45E1 16           0990  SAVBGL  LM
45E2 2C           0991          XDC
45E3 17           0992          ST
45E4 2C           0993          XDC
45E5 30           0994          DS R0
```

```
45E6 94FA   45E1      BNZ SAVBGL      LOOP.
45E8 0C          SAVBGP  PK              RETURN.
                 *
45E9 08          SAVCUR  LR K,P          SAVE LOG PROFILE.
45EA 65                  LISU STABNK
45EB 68                  LISL SWWRD
45EC 4C                  LR A,S
45ED 2102                NI SL  .RDB
45EF 84F8   45E8         BZ SAVBGP       NO SAVING REQUIRED.
45F1 2A0900 0900         DCI   SLRD
45F4 90E6   45DB         BR SAVENT       JOIN BGD CODE.
                 *
                         END
00 ERRORS
      MICROSYSTEMS DIVISION - F8 NATIVE ASSEMBLER (REV 2.0)
            SS MONITOR-PART 3-10 SEP 76-9:03
  LOC OBJECT ADDR LINE              SOURCE STATEMENT

                         TITLE 'SMART SCANNER MONITOR-PART 3-10 SEP
                 *
                 * THIS TAPE CONTAINS THE LOG PROCESSING ROUTINE.
                 * IT SCANS THE A/D BUFFER TO DETECT THE SHAPE OF A L
                 * AND RETURNS AN EDGE COUNT IN R6
                 *      AND A DIAMETER COUNT IN R7.
                 *
                 *
5000             ADMEM     EQU   H'5000'
                 *
                 *ROUTINES IN THIS TAPE.
                 *
4400             PROCLO    EQU   H'4400'
                 *
                 *
0000             R0        EQU   0
0001             R1        EQU   1
0002             R2        EQU   2
0003             R3        EQU   3
0004             R4        EQU   4
0005             R5        EQU   5
0006             R6        EQU   6
0007             R7        EQU   7
0008             R8        EQU   8
                 *
0002             LEDBNK    EQU   2
0000             CONTL     EQU   0
0001             HIORL     EQU   1
0002             LOORL     EQU   2
0003             DIAPTR    EQU   3
0005             GOODA     EQU   5
0006             DIMA      EQU   6
0007             KCON      EQU   7
                 *
0003             PROCLB    EQU   3          UPPER ISAR DIGIT.
0000             FRED      EQU   0          FORWARD EDGE.
0001             TED       EQU   1          BACKWARD EDGE.
0002             PROCT     EQU   2          TED-FRED.
0004             NSDIF     EQU   4          NEGATIVE LOG SIG DIFF.
0005             PSDIF     EQU   5          POSITIVE LOG SIG DIFF.
0006             NSJMP     EQU   6          NEGATIVE LOG JUMP.
0007             PSJMP     EQU   7          POSITIVE LOG JUMP
                 *
0008             PREEDGE   EQU   8          PRESCAN EDGE.
0008             PRESTEP   EQU   8          PRESCAN STEP.
0007             PREINC    EQU   PRESTEP-1
5008             PREBG     EQU   ADMEM+PREEDGE
001F             PRECT     EQU   ((256-(2*PREEDGE))/PRESTEP)+1
0004             PREFLICK  EQU   4          ALLOWED FLICKER FROM 0 BGD
                 *
0005             NUCONS    EQU   5          # OF CONSECUTIVE DIFFS NEED
FFFE             JFCOMP    EQU   -2         COMPENSATION NEEDED ON FORW
                                             (BACKWARD JUMP).
0000             JBCOMP    EQU   0
FFFB             DFCOMP    EQU   -5         COMP NEEDED ON FORWARD DIFF
0004             DBCOMP    EQU   4           (BACKWARD DIFF).
FFFD             DFMCOM    EQU   -3         COMP FOR FORWARD MIXED LOG.
```

```
0001   DEMCOM   EQU  1        COMP FOR BACKWARD MIXED LOG
0003   MNCCNS   EQU  3        MIXED LOG CONSECUTIVE DIFFS
0000   SMALLNUM EQU  0        CRITERIA FOR MIXED LOG.
       *
4300   MINLOG   EQU  H'4300'

  MICROSYSTEMS DIVISION - F8 NATIVE ASSEMBLER (REV 2 0)
  MONITOR-PART 3-10 SEP 76-3 C0
  OBJECT ADDR LINE               SOURCE STATEMENT

                   EJECT
                   ORG PROCLO
         *
         *PROCESS LOG SUBROUTINE.  CALLED DURING A CHARGE CYC
         * ANALYZE PREVIOUS BUFFER LOAD OF DATA.
         * RETURNS EDGE COUNT IN R6. DIAMETER IN R7.
         *  MUST NOT DISTURB R1,R2,R3, OR RE!.
         *
         *LOG PRESCAN ROUTINE. READ BACKGROUND AT COARSE INTE
         *TO DETERMINE IF LOG IS BELOW OR ABOVE BACKGROUND.
         * USE DIFFERENT ALGORITHMS FOR THESE 2 CASES.
         * R4,R5 ARE USED TO STORE DOUBLE PRECISION SUM.
         * R7 IS USED FOR ADDEND.
         * R0 IS LOOP COUNTER.
         * R6 IS ZERO BEFORE FRONT EDGE, THEN NON-ZERO.
         *
4400 08            PROCL    LR K,P
4401 63                     LISU PROCLB
4402 68                     LISL FRED
4403 70                     CLR
4404 5D                     LR I,A         FRONT EDGE.
4405 5D                     LR I,A         BACK EDGE.
4406 54                     LR R4,A
4407 55                     LR R5,A        ZERO SUM.
4408 56                     LR R6,A        ZERO FLAG.
4409 201F                   LI PRECT
440B 50                     LR R0,A        SET UP COUNT OF DIODES.
440C 2A5008 5008            DCI PREBG      ADDRESS FIRST DIODE.
         *
440F 16            PRNL     LM
4410 57                     LR R7,A
4411 21FF                   NI H'FF'
4413 8103     4417          BP PRNP
4415 18                     COM
4416 1F                     INC
4417 2504          PRNP     CI PREFLICK
4419 8122     443C          BP PRSK
441B 0E                     LR Q,DC
441C 46                     LR A,R6
441D F6                     NS R6
441E 03                     LR A,QL        LOAD DIODE NUMBER.
441F 8406     4426          BZ PRFR        FRONT EDGE.
4421 2406                   AI (PREINC-1)
4423 5C                     LR S,A         STORE BACK EDGE ESTIMATE
4424 9008     442D          BR PRADD
         *
4426 24F8          PRFR     AI -PRESTEP
4428 68                     LISL FRED
4429 5C                     LR S,A
442A 69                     LISL TED
442B 71                     LIS 1
442C 56                     LR R6,A        NON-ZERO SWITCH.
         *
442D 47            PRADD    LR A,R7
442E C5                     AS R5
442F 55                     LR R5,A        ADD LOW BYTES.
4430 44                     LR A,R4
4431 19                     LNK
4432 54                     LR R4,A        ADD CARRY.
4433 47                     LR A,R7
4434 F7                     NS R7
4435 70                     CLR
```

```
[illegible] SYSTEMS DIVISION - F8 NATIVE ASSEMBLER (REV 2.0)
[illegible] SVITOR-SAH [illegible]-10 SEP 76-9:00
[illegible] OBJECT ADDR LINE          SOURCE STATEMENT

[illegible] 8103    443A            BP PRADI
[illegible] 20FF                    LI H'FF'
443A C4                  PRADI      AS R4
443B 54                             LR R4,A
                         *
443C 27                  FRSK       LIS PREINC        ON TO NEXT DIODE.
443D 8E                             ADC
443E 30                             DS R0
443F 94CF       440F                BNZ PRNL
                         *
                         *END OF LOOP. THE SIGN BIT IN R4 INDICATES + OR - LO
                         *  (AS LONG AS NO MORE THAN 128 DIODES ARE TESTED).
                         * IF ABS(R4) IS VERY SMALL THEN THE LOG WAS PARTIA
                         * ABOVE AND PARTIALLY BELOW. USE A SEPARATE ROUTINE
                         * TO HANDLE SUCH MIXED LOGS.
                         *
                         *SET UP DC0 TO POINT AT FRONT EDGE AND
                         * PROCT=TED-FRED.
                         *
4441 68                             LISL FRED
4442 4C                             LR A,S
4443 FD                             NS I
4444 844C       4491                BZ NOLGB          NO FRONT EDGE SEEN.
4446 07                             LR QL,A
4447 0F                             LR DC,Q           POINT AT FRONT EDGE.
4448 4C                             LR A,S
4449 FE                             NS D
444A 8446       4491                BZ NOLGB          NO BACK EDGE SEEN.
444C 18                             COM
444D CC                             AS S              (ISAR POINTS AT FRED).
444E 18                             COM
444F 1F                             INC
4450 6A                             LISL PROCT
4451 5C                             LR S,A            SAVE TED-FRED.
                         *
4452 44                             LR A,R4
4453 F4                             NS R4
4454 8103       4458                BP FRSK2          X=ABS(X)
4456 18                             COM
4457 1F                             INC               -X=ABS(X)
4458 2500                FRSK2      CI SMALLNUM       ??SMALL NUMBER??
445A 816D       44C8                BP MLOGF          MIXED LOG.
445C 44                             LR A,R4
445D F4                             NS R4
445E 8104       4463                BP PLOGF          POSITIVE LOG.
4460 294515     4515                JMP   NLOGF

[illegible] SYSTEMS DIVISION - F8 NATIVE ASSEMBLER (REV 2.0)
[illegible] SVITOR PART 2-10 SEP 76-9:00
[illegible] OBJECT ADDR LINE          SOURCE STATEMENT

                                    EJECT
                         *POSLOG: SCAN POSITIVE LOGS FORWARD THEN BACKWARD [illegible]
                         * FOR RELATIVE DIFFERENCES FROM BACKGROUND AND [illegible]
                         * DIFFERENCES BETWEEN DIODES.
                         *
                         *          R0=COUNT OF DIODES WITH SIG DIFF NEEDED.
                         *          R4=COUNT OF DIODES TO LOOK AT.
                         *          R5=PREVIOUS-1 DIODE READING.
                         *          R6=PREVIOUS READING.
                         *          R7=CURRENT READING.
                         *
                         * ON ENTRY DC0 POINTS AT FRONT EDGE, ISAR AT PROCT.
                         *
                         * IN FORWARD DIRECTION ALLOW A SIG DIFF ABOVE OR BEL
                         *  THE BACKGROUND IN ORDER TO CATCH SHADOWY SHAPES.
                         *
4463 4C                  PLOGF      LR A,S
4464 54                             LR R4,A
4465 75                             LIS NUCONS
```

```
4466 50          0189          LR R0,A
4467 70          0190          CLR
4468 55          0191          LR R5,A          SET PREVIOUS = BGD.
4469 56          0192          LR R6,A
                 0193  *
446A 16          0194  PLOGFL  LM
446B 0E          0195          LR Q,DC
446C 57          0196          LR R7,A
446D 18          0197          COM
446E C5          0198          AS R5            CALCULATE D(N)-D(N-2).
446F 1F          0199          INC
4470 6F          0200          LISL FSJMP
4471 CC          0201          FS S
4472 9106   4479 0202          BM PLF1          NOT A JUMP.
4474 03          0203          LR A,QL
4475 24FE        0204          AI JFCOMP        ADD COMPENSATION.
4477 901E   4496 0205          BR PLF5
                 0206  *
4479 47          0207  PLF1    LR A,R7
447A F7          0208          NS R7
447B 8103   447F 0209          BP PLF1A         TAKE ABS VALUE.
447D 18          0210          COM
447E 1F          0211          INC
447F 6D          0212  PLF1A   LISL FSDIF
4480 CC          0213          FS S
4481 9106   4488 0214          BM PLF2          NOT A SIG DIFF.
4483 30          0215          DS R0
4484 840E   4493 0216          BZ PLF4          LOG EDGE FOUND.
4486 9003   448A 0217          BR PLF3          NOT ENOUGH.
                 0218  *
4488 75          0219  PLF2    LIS NUCONS
4489 50          0220          LR R0,A
448A 46          0221  PLF3    LR A,R6
448B 55          0222          LR R5,A          SAVE CURRENT AS PREVIOUS.
448C 47          0223          LR A,R7
448D 56          0224          LR R6,A
448E 34          0225          DS R4
448F 94DA   446A 0226          BNZ PLOGFL
                 0227  *
4491 9050   44E2 0228  NOLGB   BR NOLOGB        COUNT EXHAUSTED-NO LOG
                 0229  *                        EDGE FOUND.
4493 03          0230  PLF4    LR A,QL
4494 24FB        0231          AI DFCOMP

FAIRCHILD MICROSYSTEMS DIVISION - F8 NATIVE ASSEMBLER (REV 2.0)
PART SCANNER MONITOR-PART 3-10 SEP 76-9:00
ERS  LOC OBJECT ADDR LINE          SOURCE STATEMENT

4496 68          0232  PLF5    LISL FRED
4497 5D          0233          LR I,A           SAVE THE FRONT EDGE.
```

FAIRCHILD MICROSYSTEMS DIVISION - F8 NATIVE ASSEMBLER (REV 2.0)
PART SCANNER MONITOR-PART 3-10 SEP 76-9:00
OBJECT ADDR LINE SOURCE STATEMENT

```
                 0234          EJECT
                 0235  *
                 0236  *NOW SCAN BACKWARDS. USE SAME LOGIC AS FOSLOGF.
                 0237  * ON ENTRY ISAR POINTS AT TED.
                 0238  *
4498 4D          0239  PLOGB   LR A,I
4499 07          0240          LR QL,A
449A 0F          0241          LR DC,Q          START FROM ESTIMATED BACK.
449B 4C          0242          LR A,S           NOW ISAR POINTS AT PROCT.
449C 54          0243          LR R4,A
449D 75          0244          LIS NUCONS
449E 50          0245          LR R0,A
449F 70          0246          CLR
44A0 55          0247          LR R5,A
                 0248  *
44A1 16          0249  PLOGBL  LM
44A2 0E          0250          LR Q,DC
44A3 57          0251          LR R7,A
```

```
44A4 18                        COM
44A5 C5                        AS R5
44A6 18                        COM
44A7 6F                        LISL PSJMP
44A8 CC                        AS S
44A9 8118   44C2               BP PLE0        JUMP EDGE FOUND.
                       *
44AB 47                PLB1    LR A,R7
44AC 6D                        LISL PSDIF
44AD CC                        AS S
44AE 9106   44B5               BM PLB2        NOT A SIG DIFF.
44B0 30                        DS R0
44B1 8413   44C5               BZ PLB4        LOG EDGE FOUND.
44B3 9004   44B8               BR PLB3        NOT YET.
                       *
44B5 2005              PLB2    LI NUCONS
44B7 50                        LR R0,A        RESET COUNTER.
44B8 46                PLB3    LR A,R6
44B9 55                        LR R5,A
44BA 47                        LR A,R7
44BB 56                        LR R6,A
44BC 20FE                      LI -2
44BE 8E                        ADC            MOVE DC BACK 1.
44BF 34                        DS R4
44C0 94E0   44A1               BNZ PLOGBL     LOOP.
                       *
44C2 294559 4559       PLE0    JMP NLE0
44C5 29457A 457A       PLB4    JMP NLE4

     FAIRCHILD MICROSYSTEMS DIVISION - F8 NATIVE ASSEMBLER (REV 2.0)
          F8 MONITOR-PART 2-10 SEP 76-9.00
     LOC OBJ ADDR LINE                  SOURCE STATEMENT

                                EJECT
                       * MIXED LOG. TRANSLATE ALL DIFFS FROM THE BACK...
                       * ABSOLUTE VALUES. ONLY LOOK FOR 3 IN A ROW, AND ...
                       * CHECK FOR JUMPS.  THE LOGIC CLOSELY FOLLOWS THAT ...
                       * POSITIVE LOG.
                       *
                       * ON ENTRY DC0 POINTS AT FRED, ISAR AT PROCT.
                       *
44C8 4C                MLOGF    LR A,S
44C9 54                         LR R4,A        SET UP TOTAL COUNT.
44CA 73                         LIS MNCONS
44CB 50                         LR R0,A        CONSECUTIVE DIODES NEEDED.
44CC 16                MLOGFL   LM
44CD 0E                         LR Q,DC
44CE 57                         LR R7,A
44CF F7                         NS R7
44D0 8103   44D4                BP MLOGFS      TAKE ABS VALUE.
44D2 18                         COM
44D3 1F                         INC
44D4 6D                MLOGFS   LISL PSDIF
44D5 CC                         AS S
44D6 9106   44DD                BM MLF2        NOT A SIG DIFF.
44D8 30                         DS R0
44D9 840B   44E5                BZ MLF4        LOG EDGE.
44DB 9003   44DF                BR MLF3        NOT YET.
                       *
44DD 73                MLF2     LIS MNCONS
44DE 50                         LR R0,A
44DF 34                MLF3     DS R4
44E0 94EB   44CC                BNZ MLOGFL
                       *
44E2 294597 4597       NOLOGB   JMP NOLOG      COUNT EXHAUSTED.
                       *
44E5 03                MLF4     LR A,QL
44E6 24FD                       AI DFMCOM
44E8 68                         LISL FRED
44E9 5D                         LR I,A         NOW POINT TO TED.
```

```
      DIVISION - F8 NATIVE ASSEMBLER (REV 2.0)
      -PART 3-10 SEP 76-9:00
      ADDR LI                    SOURCE STATE   T

                        EJECT
               *MIXED LOG BACKWARDS SCAN. AGAIN TAKE ONLY
               * OF DIFFERENCES INTO CALCULATION OF SIG DIFF.
               * SEE ALSO THE POSLOGB LOGIC.
               *
               * ON ENTRY ISAR POINTS TO TED.
               *
44EA 4D        MLOGB    LR A,I
44EB 07                 LR QL,A
44EC 0F                 LR DC,Q          SET UP DATA COUNTERS.
44ED 4C                 LR A,S
44EE 54                 LR R4,A          LOAD UP FROCT.
44EF 73                 LIS MNCONS
44F0 50                 LR R0,A          CONSECUTIVE DIFFS NEEDED.
               *
44F1 16        MLOGBL   LM
44F2 0E                 LR Q,DC
44F3 57                 LR R7,A
44F4 F7                 NS R7
44F5 8103 44F9          BP MLOGBS        TAKE ABS VALUE.
44F7 18                 COM
44F8 1F                 INC
44F9 6D        MLOGBS   LISL PSDIF
44FA CC                 AS S
44FB 9106 4502          BM MLB2          NOT A SIG DIFF.
44FD 30                 DS R0
44FE 840E 450D          BZ MLB4          EDGE SEEN.
4500 9004 4505          BR MLB3          NOT YET.
               *
4502 2003      MLB2     LI MNCONS
4504 50                 LR R0,A
4505 20FE      MLB3     LI -2
4507 8E                 ADC              MOVE DC BACK ONE.
4508 34                 DS R4
4509 94E7 44F1          BNZ MLOGBL
               *
450B 90D6 44E2          BR NOLOGB        COUNT EXHAUSTED.
               *
450D 03        MLB4     LR A,QL
450E 2401               AI DAMCOM
4510 69                 LISL TED
4511 5E                 LR D,A
4512 294581 4581        JMP ANALOG       BOTH EDGES FOUND.

      SYSTEMS    ISION - F8 NATIVE ASSEMBL   (REV 2.0)
      MONITOR-PAR, 3-10 SEP 76-9:00
      OBJECT ADDR LINE                  SOURCE STATEMENT

                        EJECT
               *NEGATIVE LOG. USE SAME LOGIC AS FOR POSITIVE LOG
               * EXCEPT THAT REQUIRED COUNTS MAY CHANGE, AND SIGNS
               * ARE REVERSED.
               *
               * DC0 POINTS AT FRONT EDGE. ISAR POINTS AT COUNT.
               *
4515 4C        NLOGF    LR A,S
4516 54                 LR R4,A
4517 75                 LIS NUCONS
4518 53                 LR R3,A
4519 70                 CLR
451A 55                 LR R5,A
451B 56                 LR R6,A
               *
451C 16        NLOGFL   LM
451D 0E                 LR Q,DC
451E 57                 LR R7,A
451F 18                 COM
4520 C5                 AS R5            ACC=D(N)-D(N-2).
4521 18                 COM
4522 6E                 LISL NSJMP
```

```
4523 CC            0382            AS S
4524 8106     452B 0383            BP ( NLF1         NOT A JUMP.
4526 03            0384            LR A,QL
4527 24FE          0385            AI JFCOMP
4529 9019     4543 0386            BR NLF5
                   0387   *
452B 47            0388   NLF1     LR A,R7
452C 6C            0389            LISL NSDIF
452D CC            0390            AS S
452E 8106     4535 0391            BP NLF2           NOT A SIG DIFF.
4530 30            0392            DS R0
4531 840E     4540 0393            BZ NLF4
4533 9003     4537 0394            BR NLF3
                   0395   *
4535 75            0396   NLF2     LIS NUCONS        EDGE NOT FOUND.
4536 50            0397            LR R0,A           RESET COUNTER.
4537 46            0398   NLF3     LR A,R6
4538 55            0399            LR R5,A
4539 47            0400            LR A,R7
453A 56            0401            LR R6,A
453B 34            0402            DS R4
453C 94DF     451C 0403            BNZ NLOGFL
                   0404   *
453E 9058     4597 0405            BR  NOLOG         NO LOG
                   0406   *
4540 03            0407   NLF4     LR A,QL
4541 24FB          0408            AI DFCOMP
4543 68            0409   NLF5     LISL FRED
4544 5D            0410            LR I,A           SAVE LOC OF SIG DIFF.

        SYSTEMS DIVISION - F8 NATIVE ASSEMBLER (REV 2.0)
          MONITOR-PART 3-10 SEP 76-9.0 3
        LOC  ADDR LI                SOURCE STATEMENT

                   0411            EJECT
                   0412   *
                   0413   *SCAN BACKWARDS NOW.
                   0414   *  ISAR POINTS AT TED.
                   041 5  *
4545 4D            0416   NLOGB    LR A,I
4546 07            0417            LR QL,A
4547 0F            0418            LR DC,Q           START SCAN AT ESTIMATED EAC
4548 4C            0419            LR A,S            NOW IT POINTS AT PROCT.
4549 54            0420            LR R4,A           COUNT=TED-FRED.
454A 75            0421            LIS NUCONS
454B 50            0422            LR R0,A
454C 70            0423            CLR
454D 55            0424            LR R5,A
454E 56            0425            LR R6,A
                   0426   *
454F 16            0427   NLOGBL   LM
4550 0E            0428            LR Q,DC
4551 57            0429            LR R7,A
4552 18            0430            COM
4553 C5            0431            AS R5
4554 18            0432            COM
4555 6E            0433            LISL NSJMP
4556 CC            0434            AS S
4557 810A     4562 0435            BP NLB1           NO JUMP.
                   0436   *
                   0437   *ON A JUMP DC HAS MOVED TO MIDDLE OF 3 DIODES-NO COM
                   0438   *
4559 03            0439   NLB0     LR A,QL           POS LOG CODE ENTERS HERE.
455A 21FF          0440            NI H'FF'          SET STATUS.
455C 9420     457D 0441            BNZ NLB5          OK IF NON-ZERO.
455E 20FF          0442            LI H'FF'          ZERO MEANS DC=5100.
4560 901C     457D 0443            BR NLB5           SET IT BACK TO 50FF.
                   0444   *
4562 47            0445   NLB1     LR A,R7
4563 6C            0446            LISL NSDIF
4564 CC            0447            AS S.
4565 9106     456C 0448            BP NLB2           NOT A SIG DIFF.
4567 30            0449            DS R0
4568 8411     457A 0450            BZ NLB4          LOG EDGE FOUND.
```

```
455A 2003   456E 0451            BR NLB3          NOT YET.
                 0452  *
456C 75          0453  NLB2      LIS NUCONS
456D 50          0454            LR R0,A
456E 46          0455  NLB3      LR A,R6
456F 55          0456            LR R5,A
4570 47          0457            LR A,R7
4571 56          0458            LR R6,A
4572 20FE        0459            LI -2
4574 8E          0460            ADC              MOVE DC BACK 1.
4575 34          0461            DS R4
4576 94D8   454F 0462            BNZ NLOGBL
                 0463  *
4578 901E   4597 0464            BR  NOLOG        NO LOG FOUND.
                 0465  *
                 0466  *EDGE FOUND
                 0467  *
457A 03          0468  NLB4      LR A,QL          POS LOG CODE ENTERS HERE.
457B 2404        0469            AI DBCOMP
457D 69          0470  NLB5      LISL TED
457E 5E          0471            LR D,A           SAVE LOC OF BACK EDGE
457F 9001   4581 0472            BR ANALOG

... SYSTEMS DIVISION - F8 NATIVE ASSEMBLER (REV 2.0)
... MONITOR-PART 3-10 SEP 76-9:03
... OBJECT ADDR LINE                  SOURCE STATEMENT

                 0473            EJECT
                 0474  *ANALYZE LOG ROUTINE. FRED AND TED HOLD THE EDGES.
                 0475  *  ISAR POINTS AT FRED.
                 0476  *
                 0477  *         STORE FORWARD EDGE IN R6.
                 0478  *         STORE DIAMETER IN R7.
                 0479  *
4581 69          0480  ANALOG     LISL TED
4582 4E          0481            LR A,D
4583 18          0482            COM
4584 50          0483            LR R0,A
4585 4C          0484            LR A,S           LEAVE POINTING AT FRED.
4586 C0          0485            AS R0
4587 820E   4596 0486            BC ERRPK         WHOOPS!!!
4589 50          0487            LR R0,A          R0 HOLDS COMPLEMENTED DIAM
458A 18          0488            COM
458B 57          0489            LR R7,A          R7 HOLDS ACTUAL DIAM.
458C 2A4300 4300 0490            DCI MINLOG
458F 16          0491            LM               PICK UP SMALLEST DIAM FROM
4590 C0          0492            AS R0
4591 8205   4597 0493            BC NOLOG         TOO SMALL.
4593 4C          0494            LR A,S
4594 56          0495            LR R6,A          FRED = EDGE COUNT.
4595 0C          0496            PK               IF SO, RETURN.
4596 0C          0497  ERRPK     PK               FRED GREATER THAN TED.
                 0498  *
                 0499  *NOLOG-STORE LARGEST EDGE AND SMALLEST DIAMETER.
                 0500  *
4597 70          0501  NOLOG     CLR
4598 57          0502            LR R7,A
4599 2080        0503            LI H'80'
459B 56          0504            LR R6,A
459C 0C          0505            PK               RETURN.
                 0506  *
                 0507            END
```

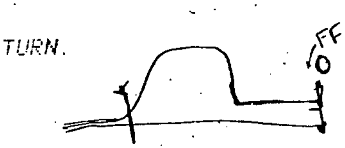

```
... SYSTEMS DIVISION - F8 NATIVE ASSEMBLER (REV 2.0)
... MONITOR-PART 3-10 SEP 76-9:09
... ... REFERENCES

      ? 00 5000  0047
...3  L 01 4381  0472  0339
...   A 00 0000
...P  A 00 0004  0469
...OM A 00 0001  0356
...OMP A 00 FFFB 0408  0231
```

```
[illegible]M   A 00 FFFD  0314
DIMFIR     A 00 0003
DIMA       A 00 0006
.ARPK      L 01 4596  0486
F.ED       A 00 0000  0409  0315  0232  0143  0103  0080
..DDA      A 02 0005
..DRL      A 00 0001
..COMP     A 00 0000
IFCOMP     A 00 FFFE  0385  0204
KCON       A 00 0007
LEDENK     A 00 0002
LCORL      A 00 0002
MINLOG     A 00 4300  0490
MLB2       L 01 4502  0341
MLB3       L 01 4505  0344
MLB4       L 01 450D  0343
MLF2       L 01 44DD  0301
MLF3       L 01 44DF  0304
MLF4       L 01 44E5  0303
MLOGB      L 01 44EA
MLOGBL     L 01 44F1  0351
MLOGBS     L 01 44F9  0336
MLOGF      L 01 44C8  0165
MLOGFL     L 01 44CC  0309
MLOGFS     L 01 44D4  0296
.NCONS     A 00 0003  0346  0329  0306  0290
NLB0       L 01 4559  0278
NLB1       L 01 4362  0435
NLB2       L 01 456C  0448
NLB3       L 01 456E  0451
NLB4       L 01 457A  0450  0279
NLB5       L 01 457D  0443  0441
NLF1       L 01 452B  0383
NLF2       L 01 4535  0391
NLF3       L 01 4537  0394
NLF4       L 01 4540  0393
NLF5       L 01 4543  0386
NLOGB      L 01 4545
NLOGBL     L 01 454F  0462
NLOGF      L 01 4515  0169
NLOGFL     L 01 451C  0403
NOLGB      L 01 4491  0151  0146
NOLOGB     L 01 44E2  0353  0228
.OLOG      L 01 4597  0493  0464  0405  0311
NSDIF      A 00 0004  0446  0389
..IMP      A 00 0006  0433  0381
..CONS     A 00 0005  0453  0421  0396  0369  0267  0244  0219  0188
PLB0       L 01 44C2  0257
PLB1       L 01 44AB
PLB2       L 01 44B5  0262
PLB3       L 01 44B8  0265
PLB4       L 01 44C5  0264
PLF1       L 01 4479  0202
PLF1A      L 01 447F  0209
PLF2       L 01 4488  0214
PLF3       L 01 448A  0217

        ... DIVISION - F8 NATIVE ASSEMBLER (REV 2.0)
        ...-PART 7-16 SEP 78-P 63
        ...    ...FERENCES

[illegible]  . 01 4493  0216
..I        L 01 4496  0205
..P        L 01 4498
..FL       L 01 44A1  0276
..F        L 01 4453  0168
..DFL      L 01 11EA  0226
..DI       L 01 443A  0124
..DD       L 01 442D  0106
..EG       A 00 5308  0089
..ECT      A 00 001F  0087
..DGE      A 00 0008  0048  0047
..FLICK    A 00 0004  0097
..INC      A 00 0007  0129  0104
```

```
[illegible]P  A 1 30 0008  0108  0048  0046
[illegible]RFR   L 01 4426  0103
PSNL     L 01 440F  0132
[illegible]FIRP   L 01 4417  0094
PROCLB   A 00 0003  0079
PROCLO   A 00 4400  0063
PROCL    L 01 4400
[illegible]POCT   A 00 0002  0156
[illegible]RSK    L 01 443C  0058
[illegible]K2     L 01 4458  0161
[illegible]ITE    A 00 0005  0339  0299  0260  0212
[illegible]IMP    A 00 0007  0255  0200
R0       A 00 0000  0492  0487  0485  0483  0454  0449  0422  0397
                    0292  0370  0347  0342  0330  0307  0302  0291  0268
                    0263  0245  0220  0215  0189  0131  0088
R1       A 00 0001
R2       A 00 0002
R3       A 00 0003
R4       A 00 0004  0461  0420  0402  03[illegible]  0350  0328  0308  0289
                    0275  0243  0225  0187  0167  0166  0160  0159  0127
                    0126  0120  0118  0084
R5       A 00 0005  0456  0431  0424  0399  0379  0372  0270  0253
                    0247  0222  0198  0191  0117  0116  0085
R6       A 00 0006  0[illegible]4  0495  0458  0455  0425  0401  0428  0373
                    0272  0269  0224  0221  0192  0113  0101  0100  0086
R7       A 00 0007  0[illegible]2  0433  0457  0445  0429  0400  0388  0377
                    0[illegible]5  0334  0295  0294  0271  0259  0251  0223  0208
                    0207  0196  0122  0121  0115  0092
R8       A 00 0008
SMALLNUM A 00 0000  0164
TED      A 00 0001  0480  0470  0357  0111
00 ERRORS
```

What is claimed is:

1. Structure comprising:

means for producing one measure of a field of view without an object present and for producing another measure of the field of view with an object present, said means for producing comprising:

photosensitive array means for receiving light representing the field of view without an object present and for producing from said light one set of intermediate signals representative of said field of view without an object present, said one set of intermediate signals comprising said one measure, and for receiving light representing the field of view with an object present and for producing from said light another set of intermediate signals representing said field of view with said object present, said another set of intermediate signals comprising said another measure;

means for controlling said photosensitive array means to produce in sequence said one set of intermediate signals and said another set of intermediate signals; and means for converting said one set and said another set of intermediate signals produced by said photosensitive array means to one set and another set of digital code words respectively, means for storing either said one set of digital code words representing said field of view without said object present, or said another set of digital code words representing said field of view with said object present, whichever set of digital code words is produced first in time;

means for processing said one set of digital code words and said another set of digital code words to produce an intermediate set of digital code words indicative of the change of the field of view between the time of producing said one measure and the time of producing said another measure, wherein said intermediate set of digital code words is also indicative of selected characteristics of said object;

means for storing said intermediate set of digital code words;

means for processing said intermediate set of digital code words to obtain a measure of a selected characteristic of said object in said field of view;

means for deriving from either said one set of digital code words or said another set of digital code words, whichever is produced first in time, and said intermediate set of digital code words, both an indication of the presence or absence of an object at a selected time, and a selected dimension of said object; and means for displaying said selected dimension of said object.

2. Structure as in claim 1 wherein said means for storing includes a programmable read-only memory for controlling the operation of said means for processing.

3. Structure as in claim 2 wherein said means for storing includes static memory interface means for interconnecting said programmable read-only memory and the other memory contained in said means for storing to said means for processing.

4. Structure as in claim 3 including means for interconnecting said means for controlling said photosensitive array means, said means for storing, and said means for processing thereby to allow data to be transmitted between each of said means in accordance with instructions from said programmable read-only-memory means and said means for controlling said photosensitive array means.

5. Structure as in claim 1 wherein said photosensitive array means comprises a line of light sensitive elements for producing said one set of intermediate signals representative of the field of view without said object present and said another set of intermediate signals representative of said field of view with said object present, respectively, and means for ampliyfing the signals produced by said line of light sensitive elements, and wherein said means for controlling said photosensitive array means comprises means for clearing said photosensitive array means of signals generated prior to a selected time, means for controlling the transfer of signals from the light sensitive elements of said photosensitive array means to said means for amplifying, and means for allowing said photosensitive array means to accumulate in each of said light sensitive elements an amount of charge proportional to the light incident upon said element over a selected time.

6. The method of detecting the presence of an object and of determining a selected dimension of said object which comprises:

(1) deriving a first set of signals representing the state of the field of view of an array of photosensitive elements without the object present;

(2) deriving a second set of signals representing the state of the field of view of said array of photosensitive elements;

(3) comparing said second set of signals to said first set of signals to generate a set of difference signals representing the difference between said second set of signals and said first set of signals;

(4) comparing the set of difference signals to a reference thereby to indicate the presence of an object when said set of difference signals bears a given relation to said reference;

(5) repeating steps (2) through (4) until said set of difference signals bears said given relation to said reference; and (6) calculating from said set of difference signals, said selected dimension of said object.

7. The method of setting the integration time of each of the light sensitive elements of an array of photosensitive elements comprising:

(1) integrating light incident upon each element in said photosensitive array for a first selected time comprising the integration time thereby to accumulate in each light sensitive element a charge packet proportional to the integral of the incident light on said element;

(2) transferring from each light sensitive element the charge packet accumulated therein during said integration time;

(3) measuring the amplitude of at least one charge packet from at least a selected one of the light sensitive elements and comparing the measured amplitude of said at least one charge packet to a reference amplitude thereby to generate a difference signal;

(4) adjusting the integration time in response to the amplitude of said difference signal provided the absolute value of said difference signal exceeds a minimum difference;

(5) repeating steps (1) through (4) until said measured difference signal has an absolute value within said specified minimum difference; and (6) selecting as the integration perior that time which was used to achieve a measured difference signal within said specified minimum difference of said reference amplitude.

8. The method of operating a photosensitive array of light sensing elements which comprises:

determining the optimum integration time to ensure that the amplitude of the charge packet accumulated in at least one light sensing element is within a selected magnitude of a given reference amplitude;

accumulating within each photosensitive element a charge packet proportional to the incident light upon said photosensitive element over said integration time;

reading out at the end of said integration time the charge packets accumulated within the photosensitive elements in said photosensitive array;

processing said charge packets thereby to generate in response to each readout of said photosensitive array, a set of signals representative of the field of view seen by said photosensitive array; and storing selected ones of said sets of signals for further processing for the purposes of detecting the presence of an object in said field of view and for providing information relating to a selected dimension of said object.

9. The method of claim 8 wherein the step of further processing selected sets of signals derived from said photosensitive array comprises:

calculating a set of difference signals from selected sets of signals produced by said photosensitive array;

comparing the set of difference signals to a selected reference to detect the presence of said object when a selected number of said difference signals exceed said reference; and calculating from said difference signals a selected dimension of said object.

10. The method of claim 9 wherein the step of calculating from said difference signals selected dimensions of said object comprises:

calculating from said difference signals at least one width of said object.

* * * * *